United States Patent
Morita et al.

(10) Patent No.: US 9,426,761 B2
(45) Date of Patent: Aug. 23, 2016

(54) WIRELESS COMMUNICATION DEVICE

(71) Applicant: PANASONIC CORPORATION, Osaka (JP)

(72) Inventors: Tadashi Morita, Kanagawa (JP); Takaaki Kishigami, Tokyo (JP); Hirohito Mukai, Tokyo (JP)

(73) Assignee: Panasonic Corporation, Osaka (JP)

( * ) Notice: Subject to any disclaimer, the term of this patent is extended or adjusted under 35 U.S.C. 154(b) by 164 days.

(21) Appl. No.: 14/009,743

(22) PCT Filed: Jan. 23, 2013

(86) PCT No.: PCT/JP2013/000334
§ 371 (c)(1),
(2) Date: Oct. 3, 2013

(87) PCT Pub. No.: WO2013/118439
PCT Pub. Date: Aug. 15, 2013

(65) Prior Publication Data
US 2014/0064264 A1    Mar. 6, 2014

(30) Foreign Application Priority Data

Feb. 8, 2012  (JP) ................. 2012-025492
Feb. 27, 2012 (JP) ................. 2012-040451
Mar. 29, 2012 (JP) ................. 2012-078307

(51) Int. Cl.
*H04W 56/00* (2009.01)
*H04L 7/04* (2006.01)
(Continued)

(52) U.S. Cl.
CPC ............. *H04W 56/00* (2013.01); *H04B 1/707* (2013.01); *H04J 13/0014* (2013.01); *H04B 7/0617* (2013.01)

(58) Field of Classification Search
CPC . H04L 1/0006; H04L 7/041; H04L 25/0202; H04L 27/2608; H04L 27/2613; H04J 13/0014; H04J 13/102; H04J 13/14
See application file for complete search history.

(56) References Cited

U.S. PATENT DOCUMENTS 5,381,444 A     1/1995  Tajima
6,724,815 B1 *  4/2004  Jepsen et al. ................. 375/225
(Continued)

FOREIGN PATENT DOCUMENTS

JP          3112746 B2      9/2000

OTHER PUBLICATIONS

Budisin, S.Z., "Efficient pulse compressor for Golay complementary sequences," Electronics Letters 27 (3):219-220, Jan. 31, 1991.
(Continued)

*Primary Examiner* — Scott M Sciacca
(74) *Attorney, Agent, or Firm* — Seed IP Law Group PLLC

(57) ABSTRACT

A WiGig wireless device partially performs a masking processing on a preamble of a transmission signal frame and generates a repetition pattern of the same pulse capable of being used in a correlation detection of a sensor. That is, a repetition pattern of a Golay code is output by intermittently performing the masking processing on the Golay code sequence. The sensor performs the correlation detection using a pulse compression technology, thereby detecting the antenna radiation pattern even in an environment where a reflected wave is generated, by separating the direct wave and the reflected wave.

3 Claims, 37 Drawing Sheets

(51) Int. Cl.
    *H04B 1/707* (2011.01)
    *H04J 13/00* (2011.01)
    *H04B 7/06* (2006.01)

(56) References Cited

U.S. PATENT DOCUMENTS

| | | | |
|---|---|---|---|
| 2006/0140249 A1* | 6/2006 | Kohno | 375/130 |
| 2010/0054235 A1* | 3/2010 | Kwon et al. | 370/350 |
| 2010/0080266 A1* | 4/2010 | Zhang | H04J 13/102 375/140 |
| 2011/0070850 A1* | 3/2011 | Kwon et al. | 455/129 |
| 2011/0319034 A1* | 12/2011 | Boe et al. | 455/67.14 |
| 2012/0106474 A1* | 5/2012 | Wu et al. | 370/329 |
| 2012/0309325 A1* | 12/2012 | Carbone et al. | 455/73 |
| 2013/0077722 A1* | 3/2013 | Pun et al. | 375/343 |
| 2013/0322583 A1* | 12/2013 | Doron et al. | 375/343 |

OTHER PUBLICATIONS

International Search Report, mailed Mar. 12, 2013, for PCT/JP2013/000334, 2 pages.

* cited by examiner

FIG. 3

Short Training Field (STF): $Ga_{128}$, $Ga_{128}$, $Ga_{128}$, $Ga_{128}$, ..., $Ga_{128}$, $Ga_{128}$, $-Ga_{128}$ Channel Estimation Field (CEF): $Gu_{512}$, $Gv_{512}$, $Gv_{128}$

FORMAT OF
SIGNAL FRAME OF
CONTROL-PHY

FIG. 14

| | BRANCH B1 | BRANCH B2 | BRANCH B3 | BRANCH B4 |
|---|---|---|---|---|
| INDEX 1<br>(CODE SEQUENCE F1)<br>(TRANSMISSION BEAM BM1) | 100 | 110 | 120 | 130 |
| INDEX 2<br>(CODE SEQUENCE F2)<br>(TRANSMISSION BEAM BM2) | 100 | 120 | 140 | 160 |
| INDEX 3<br>(CODE SEQUENCE F3)<br>(TRANSMISSION BEAM BM3) | 100 | 130 | 160 | 190 |
| ... | ... | ... | ... | ... |
| INDEX N<br>(CODE SEQUENCE FN)<br>(TRANSMISSION BEAM BMN) | 100 | 140 | 180 | 220 |

FIG. 18

| INDEX (CODE SEQUENCE) (TRANSMISSION BEAM) | BRANCH B1 | BRANCH B2 | BRANCH B3 | BRANCH B4 |
|---|---|---|---|---|
| INDEX 1 (CODE SEQUENCE F1) (TRANSMISSION BEAM BM1) | 100 | 110 | 120 | 100 |
| INDEX 2 (CODE SEQUENCE F2) (TRANSMISSION BEAM BM2) | 100 | 110 | 120 | 110 |
| INDEX 3 (CODE SEQUENCE F3) (TRANSMISSION BEAM BM3) | 100 | 110 | 120 | 120 |
| ... | ... | ... | ... | ... |
| INDEX N (CODE SEQUENCE FN) (TRANSMISSION BEAM BMN) | 100 | 110 | 120 | 180 |

FIG. 23

| Code Sequence F1 | | Branch 1 | Branch 2 | Branch 3 | Branch 4 |
|---|---|---|---|---|---|
| | INDEX 1 (TRANSMISSION INTERVAL L1) (TRANSMISSION BEAM BM1) | 100 | 110 | 120 | 100 |
| | INDEX 2 (TRANSMISSION INTERVAL L2) (TRANSMISSION BEAM BM2) | 100 | 110 | 120 | 120 |
| | INDEX 3 (TRANSMISSION INTERVAL L3) (TRANSMISSION BEAM BM3) | 100 | 110 | 120 | 130 |
| | ... | ... | ... | ... | ... |
| | INDEX N (TRANSMISSION INTERVAL LN) (TRANSMISSION BEAM BMN) | 100 | 110 | 120 | 180 |

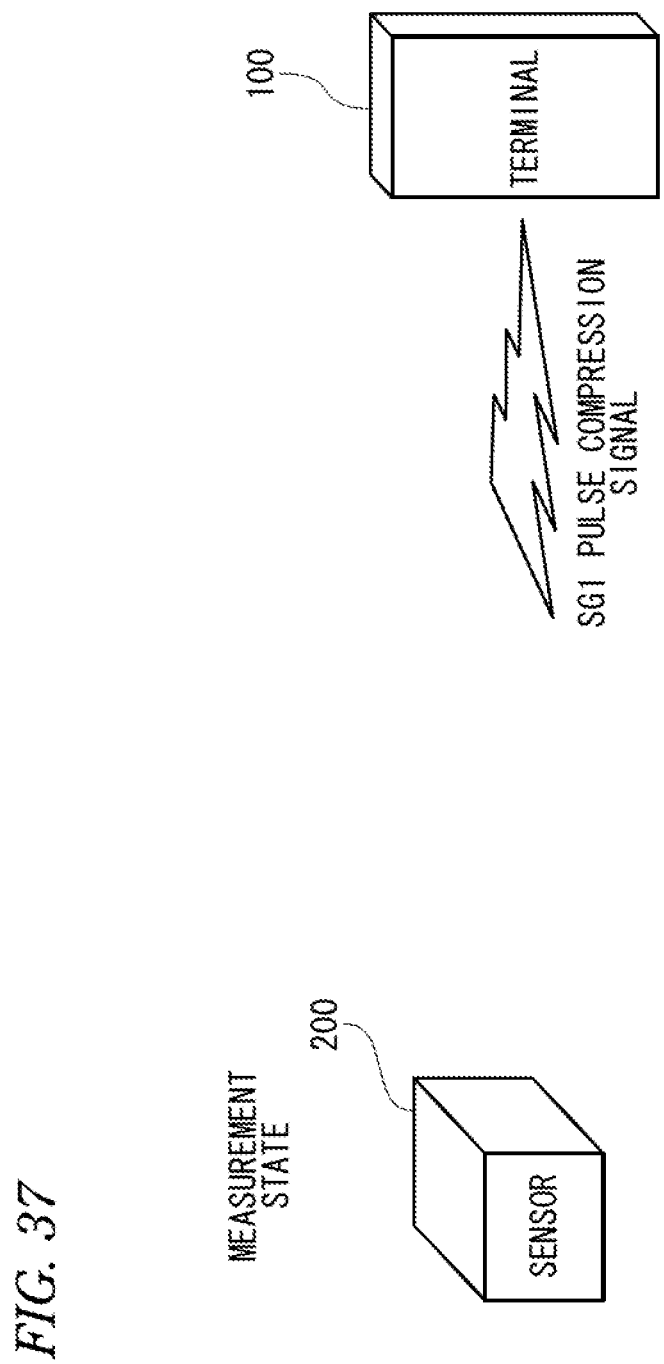

US 9,426,761 B2

WIRELESS COMMUNICATION DEVICE

TECHNICAL FIELD

The present disclosure relates to a wireless communication device which performs communication, for example, using frequencies of a millimeter-wave band.

BACKGROUND ART

WiGig wireless devices operate in accordance with a Wireless Gigabit (WiGig) specification that is a wireless communication standard of a frequency band of 60 GHz, that is, a millimeter-wave band. The WiGig specification is defined by the Wireless Gigabit Alliance. The communication distance of WiGig wireless devices is short, for example, about 10 m, but WiGig wireless devices can communicate a large capacity of data at high-speeds.

In order to design a wireless communication device (for example, the WiGig wireless device) or to test an operation of a wireless communication device, it is necessary to understand antenna radiation patterns, that is, radiation patterns of radio waves, by using an actual wireless communication device, for performance improvement.

In the related art, in order to measure the antenna radiation pattern of a WiGig wireless device, the WiGig wireless device is brought into an anechoic chamber and the antenna radiation pattern thereof is measured. If the antenna radiation pattern is measured in an environment other than an anechoic chamber, reflected waves are generated from objects in the vicinity of the WiGig wireless device. In particular, in short-range communication, a distinction between a direct wave and the reflected waves is difficult because a time difference between the direct wave and the reflected waves which are to be detected is small, such that it is difficult to measure a correct antenna radiation pattern.

For example, PTL 1 discloses a radio wave environment measuring device which can detect a radio wave condition in an environment other than an anechoic chamber, in which the direct wave and the reflected wave are mixed. In PTL 1, the direct wave and the reflected waves can be separated by a pulse compression technology.

In the pulse compression technology, a reception side which receives a wireless signal detects a correlation between a reception pulse and a reference pulse. A time width of a pulse to be detected can be compressed to a narrower range than the pulse width of a pulse signal that is actually transmitted, and time resolution is improved. In other words, the radio wave environment measuring device disclosed in PTL 1 can separately detect the direct wave and the reflected waves, which have a small time difference from each other.

CITATION LIST

Patent Literature

[PTL 1] Japanese Patent No. 3112746

SUMMARY OF INVENTION

Technical Problem

However, in PTL 1, since the pulse compression technology needs to be implemented in the WiGig wireless device for use, the circuit size becomes large and the development effort of the WiGig wireless device increases, leading to an increase in production cost.

The present disclosure has been made in view of the circumstances of the related art, and its object is to provide a wireless communication device which generates a pulse compression signal for measuring a radiation pattern from an antenna, by a simple configuration.

Solution to Problem

The present disclosure relates to a wireless communication device configured to transmit a signal frame in a time series including a data main body and a preamble, including: a signal masking section configured to intermittently perform a mask processing on a signal output in a specific position in the preamble of the signal frame; and a mask timing generation section configured to determine a control timing of the signal masking section.

Advantageous Effects of Invention

According to the present disclosure, it is possible to generate a pulse compression signal for measuring a radiation pattern from an antenna, by a simple configuration.

BRIEF DESCRIPTION OF DRAWINGS

FIG. 3 is a schematic diagram illustrating a format of a preamble of a signal transmitted by the WiGig wireless device in data communication.

FIG. 14 is a table illustrating an example of a phase parameter in a phase shifter of each branch which is given to a transmission beam of each index in the third embodiment.

FIG. 18 is a table illustrating an example of a candidate value of a phase parameter in a phase shifter of each branch which is given to a transmission beam of each index in a fourth embodiment.

FIG. 23 is a table illustrating an example of a phase parameter in a phase shifter of each branch which is given to a transmission beam of each index in a modification example of the fourth embodiment.

FIGS. 30A and 30B are graphs illustrating a specific example (2) of a change of P value, in which FIG. 30A illustrates a case where a state of being contacted continues for a predetermined time Tp or more, and FIG. 30B illustrates a case where a state of being contacted continues for less than a predetermined time Tp.

FIG. 37 is a schematic diagram conceptually illustrating a measurement state of the distance measurement system.

DESCRIPTION OF EMBODIMENTS

Figure 1:
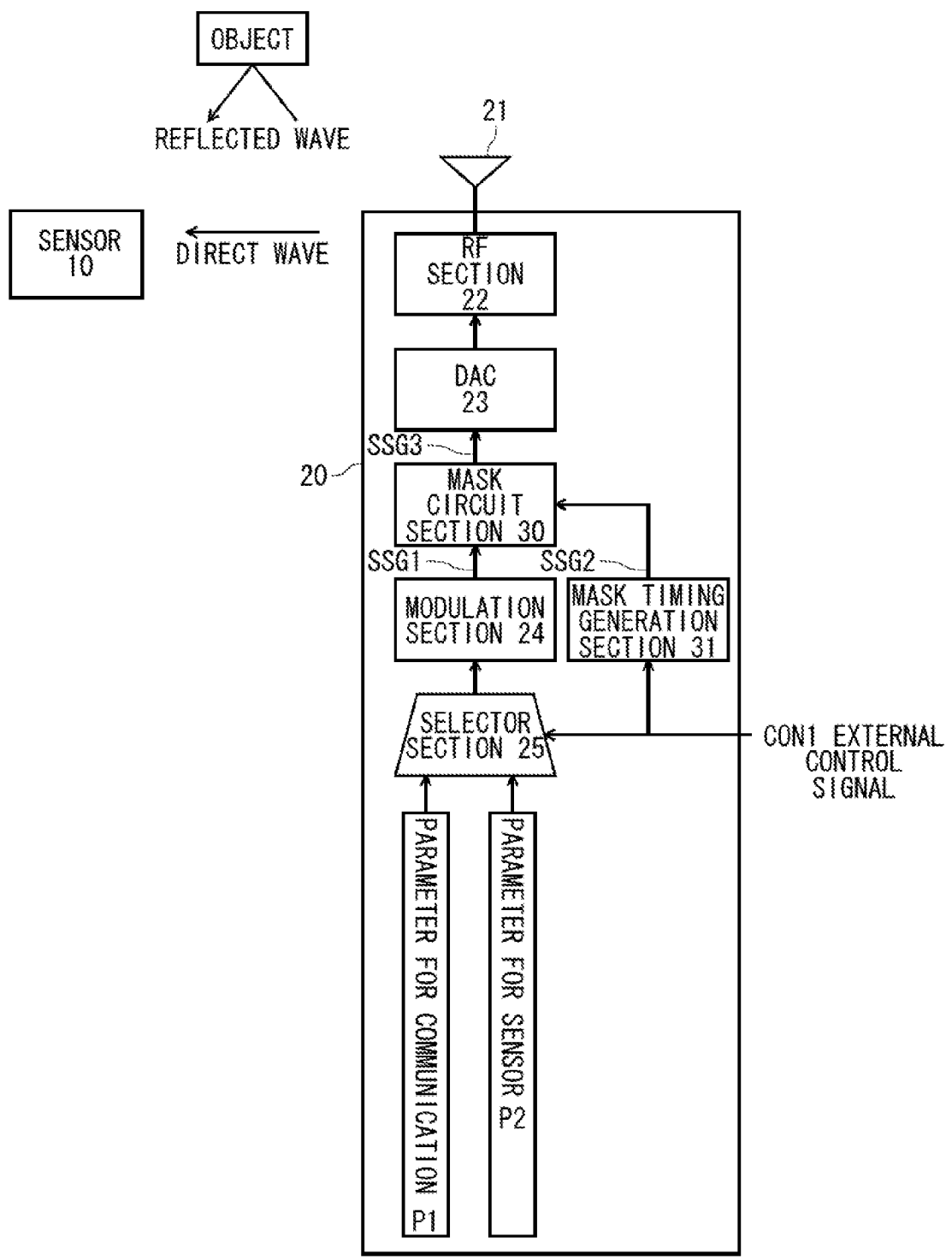
FIG. 1 is a block diagram illustrating an internal configuration of a WiGig wireless device as a wireless communication device of a first embodiment.

<Details Leading to Contents of Embodiments of the Present Disclosure>

First, before describing embodiments of a wireless communication device according to the present disclosure, the details leading to the contents of the embodiments of the wireless communication device according to the present disclosure will be described.

An antenna radiation pattern in an actual wireless communication device changes under the influence of the shape and the material of the case of the wireless communication device. Accordingly, even when the antenna radiation pattern is measured using a single antenna, it is difficult to understand a correct antenna radiation pattern.

If the antenna radiation pattern is not optimal, communication performance deteriorates. Even if a beam forming technique for controlling the directivity of the antenna is used, since each antenna radiation pattern is not optimal, high frequency characteristic varies, and communication performance deteriorates due to a change in the radiation pattern of the beam.

Therefore, in order to prevent deterioration of the communication performance of the actual wireless communication device, it is necessary to measure the radiation pattern of the radio wave radiated from the wireless communication device in its final shipping state.

However, in a case where a radio wave radiated from the wireless communication device is actually detected by the sensor, particularly in a WiGig wireless device that performs short distance communication, the separation of a direct wave and reflected waves reflected on a near object is difficult. Accordingly, in order not to be affected by the reflected waves, a WiGig wireless device must be brought into an anechoic chamber and a radiation pattern thereof must be measured.

In fact, when developers of a WiGig wireless device consider the design thereof, or, when the directivity is adjusted at the time of shipping from a factory, it is necessary to measure the antenna radiation pattern. In addition, for example, when the shape and the material of a case are changed, it is necessary to re-measure the antenna radiation pattern. On each measurement occasion, an anechoic chamber is prepared and the device is brought into the anechoic chamber, thereby leading to an increase in manufacturing cost and a prolonged development period.

Therefore, in order to measure the antenna radiation pattern while the WiGig wireless device is not brought into the anechoic chamber, adopting the pulse compression technology in PTL 1 is considered. However, in the pulse compression technology, a pulse compression signal needs to be radiated from the WiGig wireless device in order for a receiving side (sensor side) to detect the correlation of the received pulse signal. Since the pulse compression signal is not used in general wireless communication, a special circuit needs to be implemented in the WiGig wireless device. The special circuit has a relatively large size in general, such that the development effort for the WiGig wireless device increases and manufacturing cost increases.

Thus, in the following embodiments, a wireless communication device will be described which generates a pulse compression signal for measuring a radiation pattern from an antenna, by a simple configuration.

Specific embodiments relating to a wireless communication device of the present disclosure will be described below with reference to drawings.

<First Embodiment>

(Wireless Communication Device)

FIG. 1 is a block diagram illustrating an internal configuration of a WiGig wireless device 20 as a wireless communication device of a first embodiment. The WiGig wireless device 20 operates in accordance with a WiGig specification defined by the Wireless Gigabit Alliance. A frequency band used for wireless communication is a millimeter wave band, for example, 60 GHz band. A wireless communication distance is about 10 m. In addition, FIG. 1 illustrates the main part of the transmission system of the WiGig wireless device 20, and other circuits are omitted.

The WiGig wireless device 20 illustrated in FIG. 1 has a configuration that includes an antenna 21, an RF section 22, a Digital-Analog Converter (DAC) 23, a modulation section 24, a selector section 25, a mask circuit section 30, and a mask timing generation section 31.

The modulation section 24 generates a signal frame of the WiGig specification and outputs the generated signal frame as a modulation signal to the mask circuit section 30. The DAC 23 converts the digital modulation signal which is input from the modulation section 24 through the mask circuit section 30 to an analog signal and outputs the analog signal to the RF section 22.

The Radio Frequency (RF) section 22 converts the analog signal which is output from the DAC 23 to a high frequency signal and supplies the high frequency signal to the antenna 21. The high frequency signal which is output from the RF section 22 is radiated as an electromagnetic wave to airspace through the antenna 21.

In the present embodiment, the WiGig wireless device 20 uses a pulse compression signal in order to suppress the influence of reflected waves and to measure a correct radiation pattern of a radio wave, even in an environment in which the reflected waves occur, in measuring the radiation pattern of the radio wave radiated from the WiGig wireless device 20. In order to use the pulse compression signal, a reception side (a sensor 10 in FIG. 1) calculates a correlation value of a received pulse using a known correlator. Accordingly, in order for the reception side to detect a correlation, the WiGig wireless device 20 transmits a pulse compression signal different from that used at the time of data communication.

Specifically, the WiGig wireless device 20 transmits a signal in which signal pulses having a same time width repeatedly appear in a constant period as a pulse compression signal. Known codes are used in the pulse compression signal. The reception side extracts a pulse compression signal and calculates a self-correlation of a received pulse. The time width of the pulse compression signal extracted by the correlation detection of the reception side is shorter than the time width of the pulse transmitted by the WiGig wireless device 20. Thus, separation of the direct wave and the reflected waves having a small arrival time difference becomes easy.

The selector section 25 selects a parameter used in modulation of a signal generated by the modulation section 24 in response to an external control signal CON1. Specifically, the WiGig wireless device 20 prepares as parameters two kinds of parameters including a parameter P1 for communication and a parameter P2 for a sensor in advance, and the selector section 25 selects any one of them. For example, a value, which is contained in the signal frame transmitted by the WiGig wireless device 20 and for which a length of data body is shorter than that used at the time of data communication, is assigned to the parameter P2 for a sensor. Thus, the WiGig wireless device 20 can transmit a pulse compression signal which is more suitable for measurement of the antenna radiation pattern.

The external control signal CON1 is a control signal for switching between a data communication mode and a measurement mode for measuring the antenna radiation pattern in the WiGig wireless device 20. The state of the external control signal CON1 may be switched by a user's operation (for example, a button operation), or may be switched by a control command input from outside.

The mask circuit section 30 partially performs a mask processing on a modulation output signal SSG1 which is output by the modulation section 24 in response to a mask control signal SSG2. The mask circuit section 30 outputs a signal subjected to the mask processing as a mask circuit output signal SSG3. That is, the mask circuit section 30 partially performs the mask processing on the modulation output signal SSG1 and generates the mask circuit output signal SSG3 as a pulse compression signal.

The mask timing generation section 31 generates the mask control signal SSG2 for informing a control timing at which the mask circuit section 30 performs the mask processing. The mask timing generation section 31 outputs the mask control signal SSG2 for informing the control timing of the mask circuit section 30 in a case where the external control signal CON1 represents the measurement mode of measuring the antenna radiation pattern. The mask timing generation section 31 prohibits the mask circuit section 30 from performing the mask processing in a case where the external control signal CON1 represents the data communication mode.

(Sensor 10)

Figure 2:
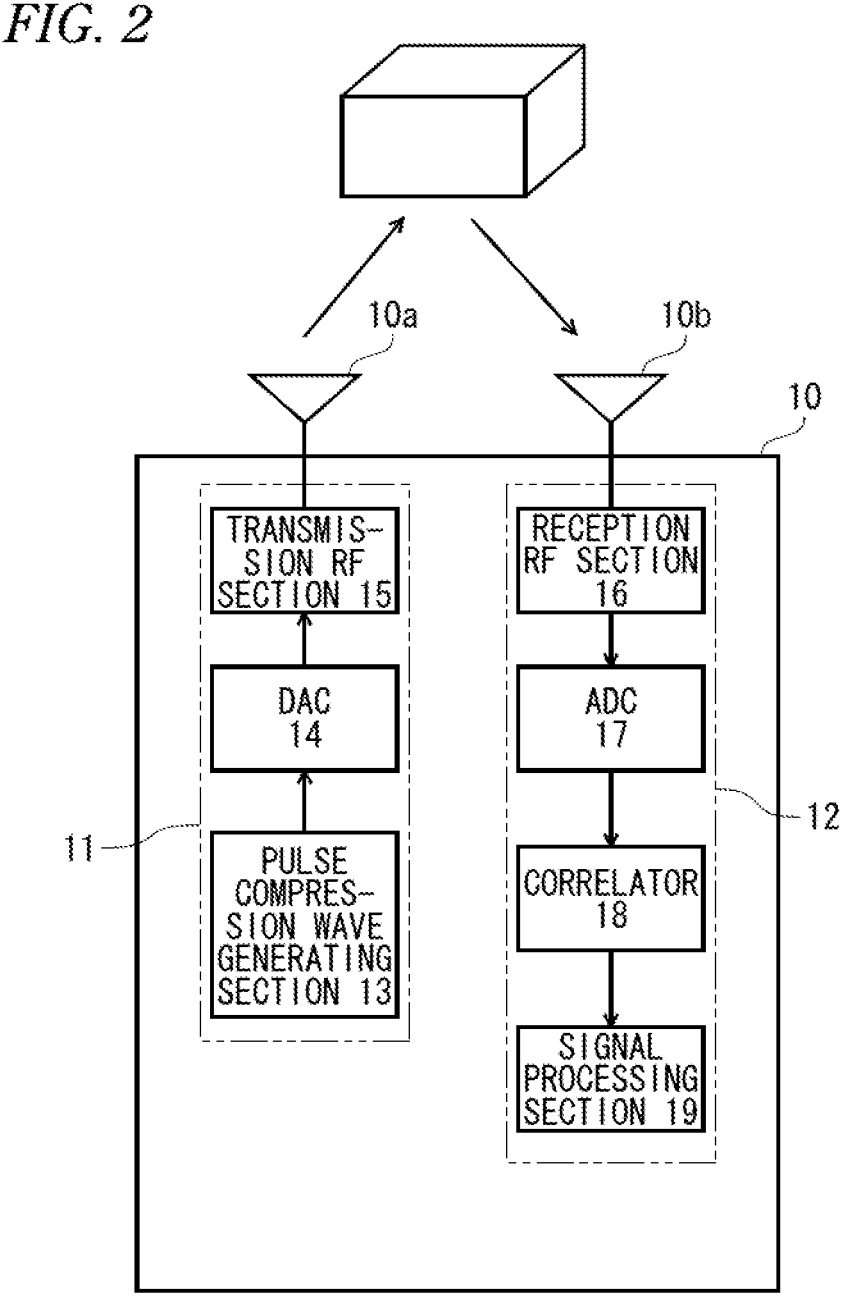
FIG. 2 is a block diagram illustrating an internal configuration of a sensor which measures an antenna radiation pattern of the wireless communication device illustrated in FIG. 1.

FIG. 2 is a block diagram illustrating an internal configuration of a sensor which measures an antenna radiation pattern of the wireless communication device illustrated in FIG. 1.

The sensor 10 illustrated in FIG. 2 receives a pulse compression signal transmitted by the WiGig wireless device 20 and measures a radiation pattern of a radio wave.

The sensor 10 illustrated in FIG. 2 has a configuration that includes a transmission section 11 and a reception section 12. A signal transmitted by the transmission section 11 is radiated from an antenna 10a. A direct wave of the radio wave radiated from the antenna 10a and reflected waves reflected on an any object reach the antenna 10b and are received in the reception section 12.

In the present embodiment, in a case where the sensor 10 measures an antenna radiation pattern of the WiGig wireless device 20, the sensor 10 receives the radio wave radiated from the WiGig wireless device 20 through an antenna 10b without using the transmission section 11.

The transmission section 11 has a configuration that includes a pulse compression wave generating section 13, a DAC 14, and a transmission RF section 15. The pulse compression wave generating section 13 generates a pulse compression wave (pulse compression signal) suitable for correlation detection of the reception section 12. The DAC 14 converts a signal generated by the pulse compression wave generating section 13 from a digital signal to an analog signal and outputs the analog signal to the transmission RF section 15. The transmission RF section 15 converts the analog signal which is output from the DAC 14 to a high frequency signal based on a local signal (not illustrated) in a sensor 10 and supplies the signal to the antenna 10a.

The reception section 12 has a configuration that includes a reception RF section 16, an Analog-Digital Converter (ADC) 17, a correlator 18, and a signal processing section 19.

The reception RF section 16 receives the high frequency signal of the radio wave received by the antenna 10b and converts the high frequency signal to an analog reception signal of a low frequency by a predetermined signal processing on a basis of a local signal (not illustrated) in the sensor 10. The ADC 17 converts the analog reception signal, which is output from the reception RF section 16, to a digital reception signal.

The correlator 18 performs a predetermined correlation processing on the digital reception signal which is output from the ADC 17. For example, in a case where pulse signals having a same time width, which repeatedly appear in a constant period as a pulse compression signal generated by the pulse compression wave generating section 13, are input as a digital reception signal, a sufficient self-correlation output is achieved.

Figure 8:
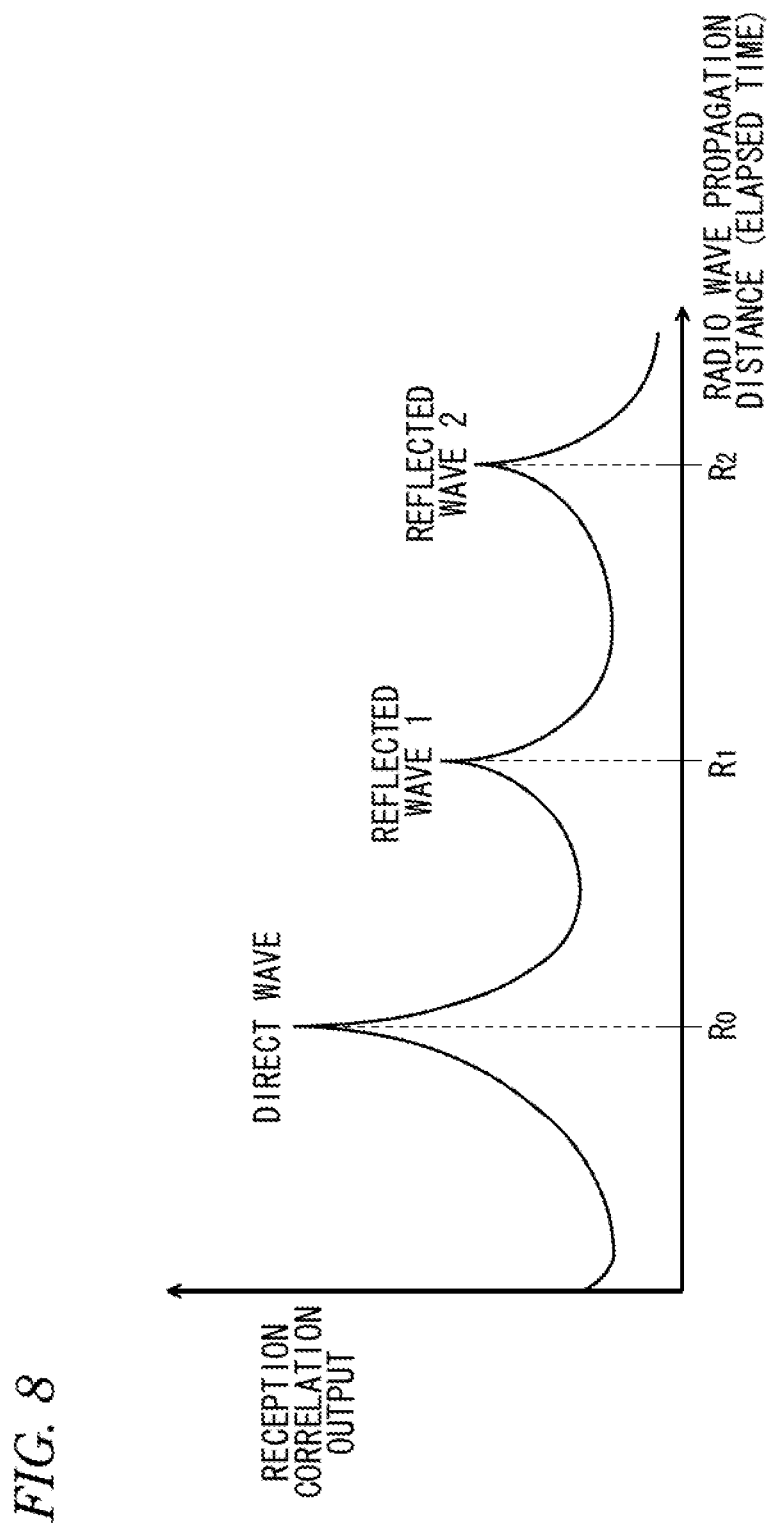
FIG. 8 is a graph illustrating a specific example of a reception correlation output characteristic of a sensor.

For example, the signal obtained at the output of the correlator 18 shows a characteristic illustrated in FIG. 8. FIG. 8 is a graph illustrating a specific example of a reception correlation output characteristic of a sensor 10. That is, the time elapsed from after the transmission section 11 transmits a radio wave until a received wave corresponding thereto appears at the output of the correlator 18 is different in a direct wave and each reflected wave due to a difference in a radio wave propagation distance. When the time difference between the direct wave and each reflected wave is small, separation of these waves becomes difficult.

However, since the correlator 18 performs a correlation processing, the time width of a peak waveform obtained as the output of the correlation processing is sufficiently shorter than the width of a transmitted pulse signal. Accordingly, even in a case of receiving a direct wave and a reflected wave which have a small time difference therebetween, it is possible to reliably separate the direct wave and the reflected wave in FIG. 8.

The signal processing section 19 acquires necessary information from the output signal (see FIG. 8) of the correlator 18. For example, the signal processing section 19 respectively specifies the direct wave and each reflected wave on a basis of a peak position of a signal which is input from the correlator 18 to the signal processing section 19 and detects a reception level of the direct wave and a reception level of each reflected wave.

(Form of a Communication Signal in a Wireless Device of WiGig Specification)

A packet of a high frequency signal to be transmitted has a configuration that includes the following various fields.
1. Short Training Field (STF)
2. Channel Estimation Field (CEF)
3. Header
4. Data
5. TRN-R/T sub-field Further, a common preamble is present in the packet to be transmitted. The preamble is used for the following applications.
1. Detection of a packet
2. Automatic Gain Control (AGC)
3. Frequency offset estimation
4. Clear statement of synchronous modulation
5. Channel estimation FIG. 3 illustrates a configuration of a preamble. FIG. 3 is a schematic diagram illustrating a format of a preamble of a signal frame transmitted by the WiGig wireless device in data communication. The preamble illustrated in FIG. 3 has a configuration that includes a Short Training Field (STF) and a Channel Estimation Field (CEF).

The STF of the preamble is configured by a sequence in which fourteen Golay codes $Ga_{128}(n)$, each of which has a length of 128 bits, are repeated and one Golay code $-Ga_{128}(n)$ is used. Accordingly, the entire length of the STF is 1920 bits (one unit is Tc). The waveform of the STF is represented by Expression (1).

[Expression 1]

$$r_{STF}(nT_c) = \begin{cases} (Ga_{128}(n \bmod 128))\exp\left(j\pi\frac{n}{2}\right) \\ n = 0, 1, \ldots, 14 \times 128 - 1 \\ (Ga_{128}(n \bmod 128))\exp\left(j\pi\frac{n}{2}\right) \\ n = 14 \times 128, \ldots, 15 \times 128 - 1 \end{cases} \quad (1)$$

The CEF of the preamble has a configuration in which Golay code sequences $Gu_{512}(n)$ and $Gv_{512}(n)$, a pair of two complementary codes, are connected. $Gu_{512}(n)$ and $Gv_{512}(n)$ are represented by Expression (2).

[Expression 2]

$$Gu_{512}(n) = [-Gb_{128} - Ga_{128} Gb_{128} - Ga_{128}]$$

$$Gv_{512}(n) = [-Gb_{128} Ga_{128} - Gb_{128} - Ga_{128}] \quad (2)$$

(Generation of a Pulse Compression Signal)

A known repetition signal suitable for correlation detection can be used as the pulse compression signal. The STF of the preamble illustrated in FIG. 3 includes a Golay code sequence in which Golay codes are repeated. In the present embodiment, the WiGig wireless device 20 can generate the pulse compression signal by extracting a part of the repeated Golay code sequence.

That is, the mask circuit section 30 performs a mask processing on the modulation output signal SSG1, extracts a part of the preamble, and outputs the mask circuit output signal SSG3 as the pulse compression signal. In other words, the mask circuit section 30 performs a mask processing on a part of the preamble, thereby allowing a pulse compression signal used in measuring the antenna radiation pattern to be generated.

In addition, in each of the embodiments including this embodiment, the WiGig wireless device 20 and the sensor 10 process the negotiation of communication in the measurement mode in advance. Accordingly, the sensor 10 knows timings at which the WiGig wireless device 20 transmits or receives the mask circuit output signal SSG3 as the pulse compression signal.

Figure 4:
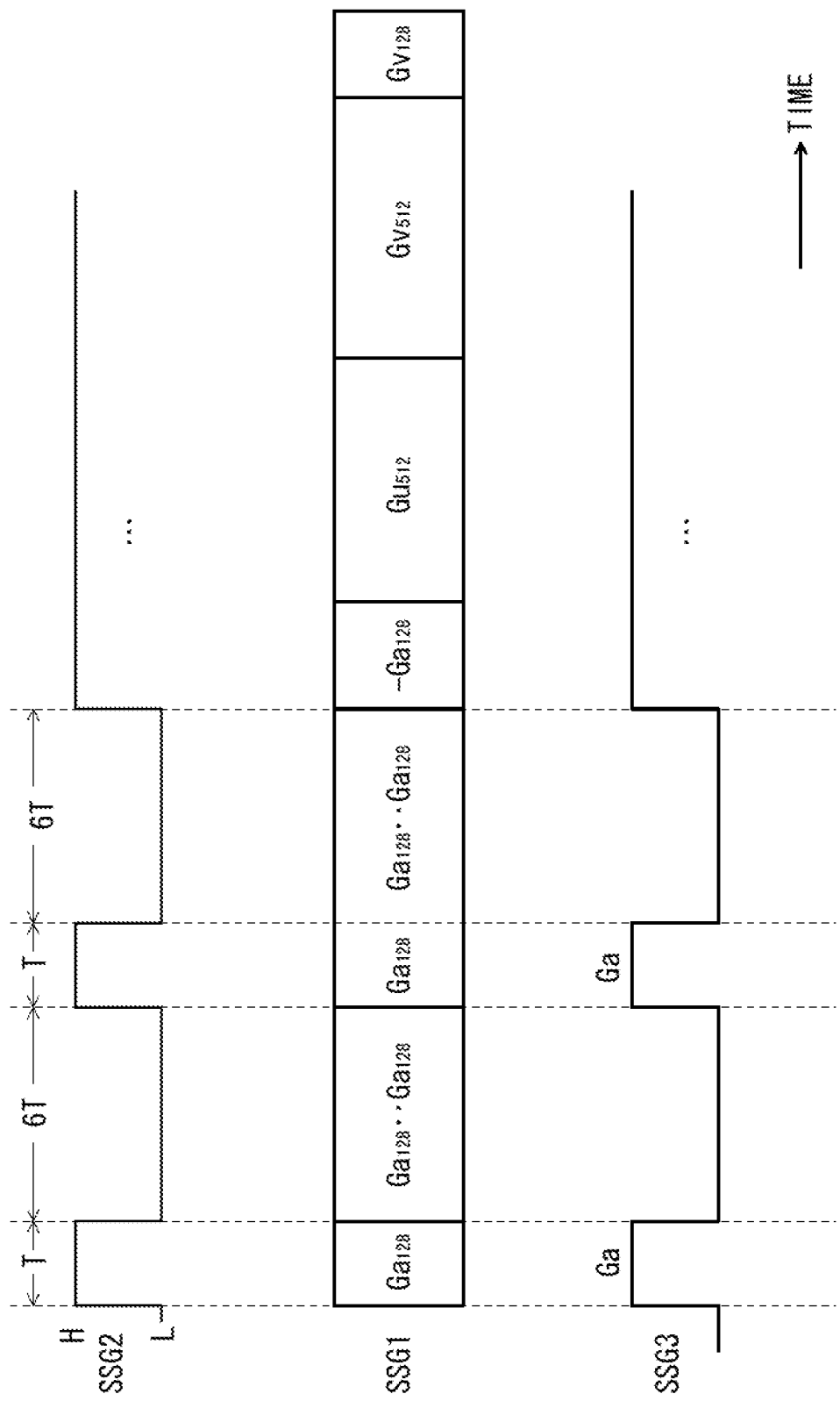
FIG. 4 is a time chart illustrating an operation of generating a pulse compression signal in the WiGig wireless device.

FIG. 4 is a time chart illustrating an operation in which the WiGig wireless device 20 generates a pulse compression signal. The operation illustrated in FIG. 4 is performed in the measurement mode of measuring the antenna radiation pattern by the external control signal CON1. That is, the mask timing generation section 31 generates the mask control signal SSG2 on a basis of the external control signal CON1. The mask circuit section 30 generates the mask circuit output signal SSG3 as the pulse compression signal in response to the mask control signal SSG2.

In FIG. 4, a high level (H) of the mask control signal SSG2 indicates a mask state, and a low level (L) of the mask control signal SSG2 indicates a mask release state. In the example illustrated in FIG. 4, the mask control signal SSG2 causes a part of the STF in the preamble of the modulation output signal SSGI to be intermittently subjected to the mask processing and parts other than the STF to be entirely subjected to the mask processing.

Thus, the mask circuit section 30 intermittently extracts Golay code sequences from the STF in the preamble. As a result, a plurality of same Golay codes $Ga_{128}(n)$ are repeated periodically in the mask circuit output signal SSG3. If the WiGig wireless device 20 transmits the signal, the sensor 10 obtains a correlation output illustrated in FIG. 8 with respect to the repetition pattern of the same Golay codes $Ga_{128}(n)$ in the correlator 18. That is, the WiGig wireless device 20 can transmit to the sensor 10 the pulse compression signal required for measuring the antenna radiation pattern.

In the example illustrated in FIG. 4, the mask release period and the mask period are alternately and repeatedly switched in the mask control signal SSG2, by regarding a period T of one cycle of Golay code $Ga_{128}(n)$ in the STF as a unit.

Mask release period (T)->mask period (6T)->mask release period (T)->mask period (6T)->mask release period (T)-> . . . .

The length (6T) of the mask period may be appropriately changed so as to obtain a suitable correlation output, in accordance with a distance between the WiGig wireless device 20 and the sensor 10 under actual measurement conditions.

The timing of the mask control signal SSG2 generated by the mask timing generation section 31 can be generated in synchrony with an operation timing of the control section (for example, the modulation section 24) that generates a signal frame for transmission of a WiGig specification.

(Measurement Method of an Antenna Radiation Pattern)

In FIG. 1, the sensor 10 is disposed in the vicinity of the WiGig wireless device 20. Here, the sensor 10 causes an operation of the transmission section 11 to stop and the reception section 12 to operate. Further, the sensor 10 switches the external control signal CON1 to be input to the WiGig wireless device 20, thereby switching the operation mode of the WiGig wireless device 20 from a data communication mode to a measurement mode of measuring an antenna radiation pattern.

The selector section 25 selects the parameter P2 for a sensor suitable for measuring an antenna radiation pattern on a basis of the external control signal CON1 and outputs the parameter P2 to the modulation section 24. The mask timing generation section 31 starts generation of the mask control signal SSG2 on a basis of the external control signal CON1. The mask circuit section 30 intermittently performs the mask processing on the modulation output signal SSG1 in response to the mask control signal SSG2 and intermittently outputs the Golay code sequence of the STF in the preamble as the mask circuit output signal SSG3.

Thus, the WiGig wireless device 20 can transmit a pulse compression signal suitable for correlation detection. Further, the sensor 10 detects a radio wave radiated from the WiGig wireless device 20. The reception section 12 of the sensor 10 obtains a pulse compression signal which is received as a repetition pattern, that is, a large correlation value for the mask circuit output signal SSG3 illustrated in FIG. 4 as an output of the correlator 18. As illustrated in FIG. 8, the correlation values for the direct wave and the respective reflected waves have peak values at different timings.

For this reason, the sensor 10 can respectively detect the direct wave and the reflected waves independently of each other.

That is, even in the measurement of the antenna radiation pattern in an environment such as a general laboratory in which reflected waves are generated, the sensor 10 can detect the direct wave of the radio wave radiated from the WiGig wireless device 20 in a state of being separated from the reflected wave. Accordingly, it is possible to measure the antenna radiation pattern without the WiGig wireless device 20 being brought into an anechoic chamber.

Further, since the WiGig wireless device 20 itself transmits the pulse compression signal, it is possible to measure an actual antenna radiation pattern of the entire WiGig wireless device 20 including the effect of a final shape and material of a case, rather than the characteristic of the antenna alone.

That is, the WiGig wireless device 20 illustrated in FIG. 1 can transmit a pulse compression signal suitable for measuring the antenna radiation pattern by adding a mask circuit section 30 and a mask timing generation section 31.

<Second Embodiment>

(Wireless Communication Device)

Figure 5:
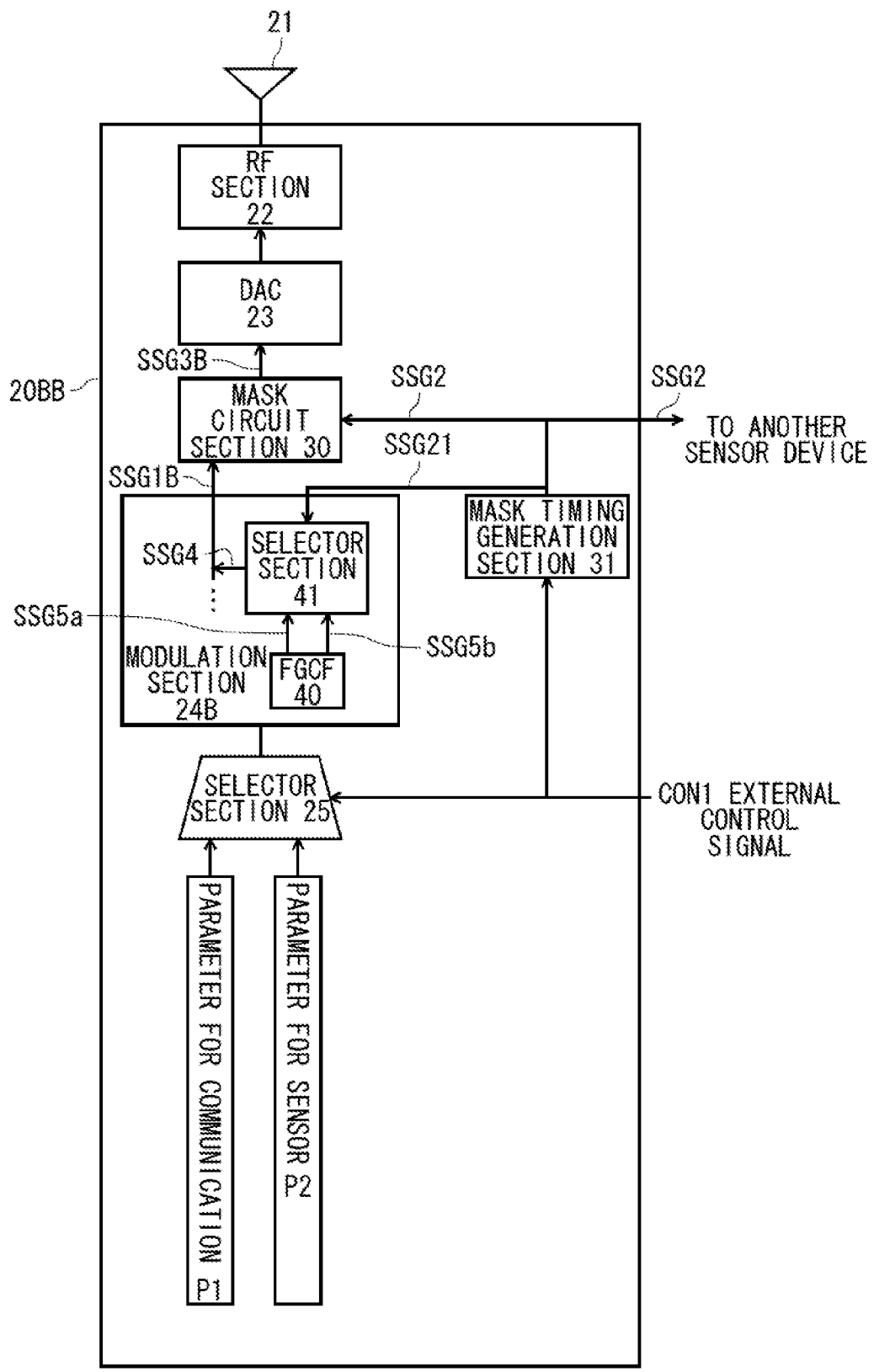
FIG. 5 is a block diagram illustrating an internal configuration of a WiGig wireless device as a wireless communication device of a second embodiment.

FIG. 5 is a block diagram illustrating an internal configuration of the WiGig wireless device 20BB as a wireless communication device of a second embodiment. The present embodiment is a modification example of the first embodiment. In the WiGig wireless device 20BB illustrated in FIG. 5, the components corresponding to the WiGig wireless device 20 of the first embodiment are denoted by the same reference numerals, and the description thereof will be omitted.

The WiGig wireless device 20BB illustrated in FIG. 5 has a configuration that includes an antenna 21, a RF section 22, a DAC 23, a modulation section 24B, a selector section 25, a mask circuit section 30, and a mask timing generation section 31. That is, the modulation section 24B is different from the modulation section 24 illustrated in the first embodiment.

The modulation section 24B has a configuration that includes a Golay signal generation section (referred to as "FGCF" in FIG. 5) 40 and a selector section 41.

Figure 7:
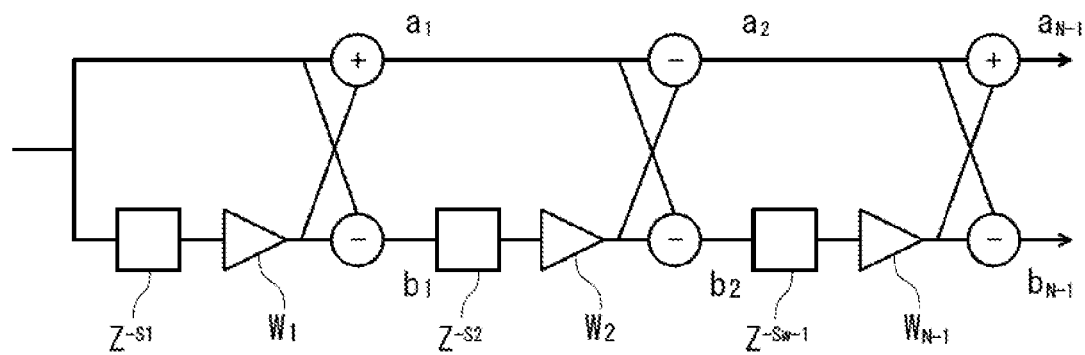
FIG. 7 is a block diagram illustrating a specific configuration of a Golay signal generation section.

The Golay signal generation section 40 is implemented as a modulation section of the wireless device that conforms to the WiGig specification. In order to efficiently generate a Golay signal, the Golay signal generation section 40 is configured by using for example, a Fast Golay Correlator Filter (FGCF), that is, a high-speed Golay correlator filter. An example of a circuit configuration of the Golay signal generation section 40 is illustrated in FIG. 7. FIG. 7 is a block diagram illustrating a specific configuration of a Golay signal generation section 40. Since a circuit configuration of FIG. 7 is described in detail, for example, in reference NPL 1, the description thereof will be omitted.

[NPL 1] "EFFICIENT PULSE COMPRESSOR FOR GOLAY COMPLEMENTARY SEQUENCES", ELECTRONICS LETTERS 31$^{st}$, Vol. 27 No. 3 p. 219-220, January 1991

The Golay signal generation section 40 simultaneously generates a pair of two complementary codes (Ga and Gb) as an output of two systems.

The selector section 41 selects the output of two systems which is output by the Golay signal generation section 40, that is, Golay codes Ga and Gb which are complementary codes that are in complementary relationship to each other in accordance with the timing of the mask control signal SSG2 which is output from the mask timing generation section 31.

Although the WiGig wireless device in the related art uses the Golay code Ga in the STF of the preamble, the selector section 41 of the WiGig wireless device 20BB of the present embodiment selectively uses the Golay code Gb that is generated by the Golay signal generation section 40 at the same time.

(Generation of a Pulse Compression Signal)

Figure 6:
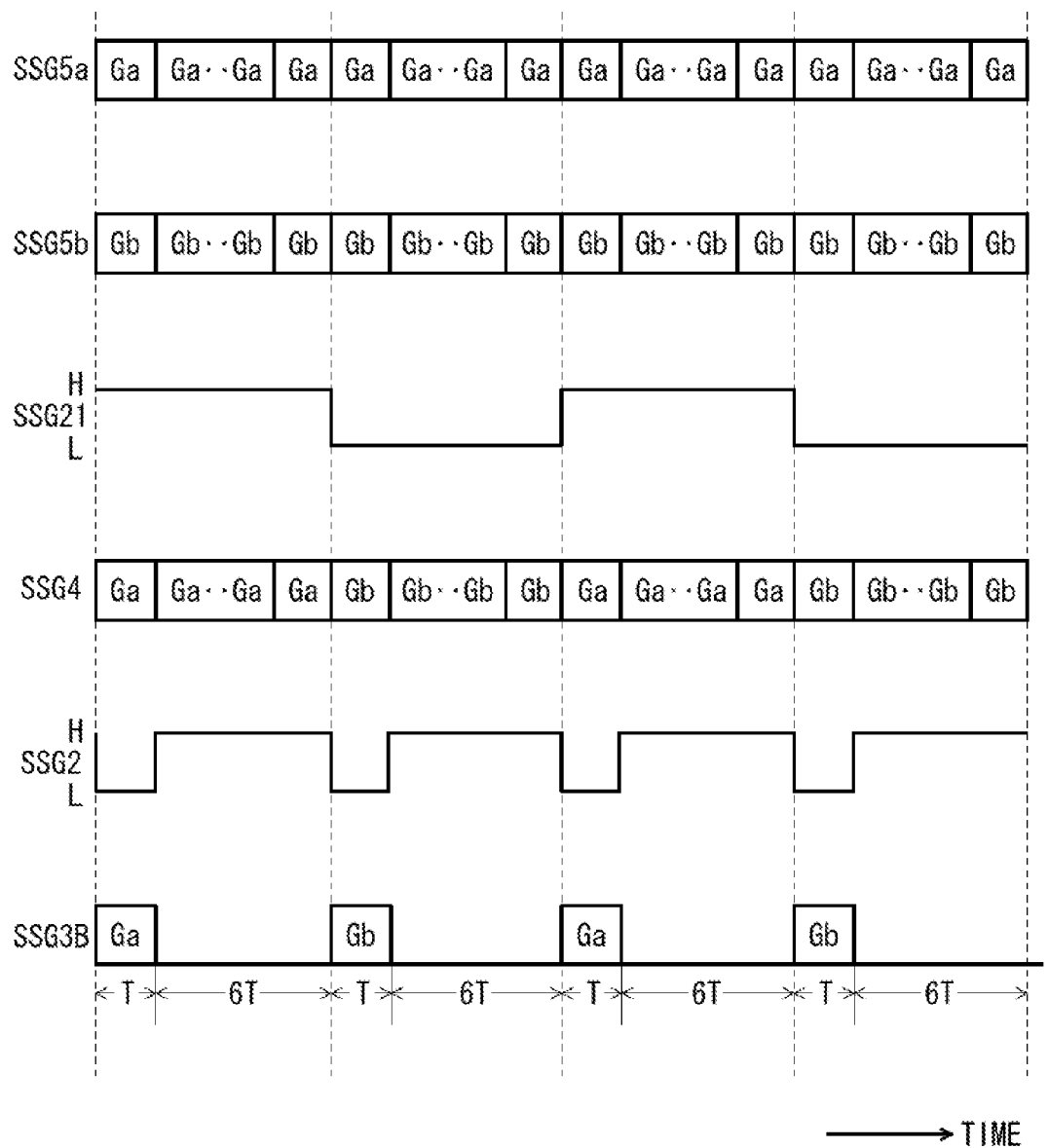
FIG. 6 is a time chart illustrating an operation in which the WiGig wireless device of FIG. 5 generates a pulse compression signal.

FIG. 6 is a time chart illustrating an operation in which the WiGig wireless device 20BB of FIG. 5 generates a pulse compression signal.

The selector section 41 alternately selects output signals SSG5*a* and SSG5*b* of two systems from the Golay signal generation section 40 in response to the control signal SSG21 from the mask timing generation section 31. The SSG5*a* corresponds to the output of the Golay code Ga, and the SSG5*b* corresponds to the output of the Golay code Gb.

The mask timing generation section 31 determines the content (H or L) of the control signal SSG21 on a basis of the mask control signal SSG2. The selector section 41 selects an output signal SSG5*a* indicating that the control signal SSG21 selects the Golay code Ga at a high level H (Hi) and outputs the Golay code Ga as a selector output signal SSG4 on a basis of the output signal SSG5*a*. The selector section 41 selects an output signal SSG5*b* indicating that the control signal SSG21 selects the Golay code Gb at a low level L (Low) and outputs the Golay code Gb as a selector output signal SSG4 on a basis of the output signal SSG5*b*.

The content (H or L) of control signal SSG21 is switched alternately at timings when the control signal SSG21 switches from a high level H to a low level L. That is, every time the mask timing generation section 31 releases a mask, the selector section 41 alternately switches between the Golay codes Ga and Gb for selection.

As a result, in FIG. 6, the Golay codes Ga and Gb which are in the complementary relationship to each other alternately and intermittently appear in the mask circuit output signal SSG3B. In the example illustrated in FIG. 6, the state (H or L) of the control signal SSG21 is switched, for example, at a time interval (7T) which is seven times one period (T) of the Golay code Ga or Gb. Accordingly, the state of the mask circuit output signal SSG3B repeatedly changes.

Mask release period (code Ga: T)->mask period (6T)->mask release period (code Gb: T)->mask period (6T)->mask release period (code Ga: T)->mask period ( 6T)->mask release period (code Gb: T)->mask period (6T)-> . . . .

The WiGig wireless device 20BB can alternately transmit the Golay codes Ga and Gb which are in the relationship of complementary codes to each other as a pulse compression signal in measuring the antenna radiation pattern.

The sensor 10 adds the signals of complementary codes, the Golay codes Ga and Gb, which are received by the sensing processing, that is, measurement of the antenna radiation pattern of a radio wave transmitted from the WiGig wireless device 20, thereby allowing a side lobe characteristic as a correlation characteristic to be cancelled. Therefore, in the present embodiment, a better correlation characteristic can be obtained compared with the first embodiment. In other words, in the present embodiment, the sensor 10 can detect the antenna radiation pattern of the WiGig wireless device 20BB with high accuracy.

Accordingly, the above described circuit is added to the WiGig wireless device 20BB, thereby allowing the wireless device itself to radiate the radio wave of the pulse compression signal. Accordingly, the radiation characteristic of a single antenna is not measured, but the final antenna radiation pattern of the overall WiGig wireless device can be measured. Further, the influence of the reflected waves at the time of measuring the antenna radiation pattern can be eliminated by using the pulse compression signal. That is, even in an environment other than the anechoic chamber, in which the reflected waves are generated, it is possible to measure the antenna radiation pattern.

In addition, the configuration of the preamble of a packet transmitted by the WiGig wireless device is not limited to the configuration of the preamble illustrated in FIG. 3, but the size of the preamble may be long in order to generate the pulse compression signal, and for example, the configuration of the preamble of a signal frame termed as CONTROL-PHY may be possible. CONTROL-PHY will be described with reference to FIGS. 9 and 10.

Figure 9:
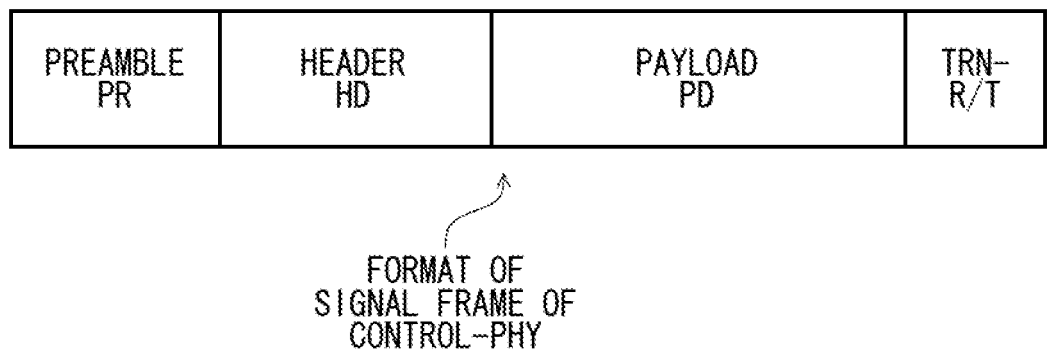
FIG. 9 is a schematic diagram illustrating a format of a signal frame of CONTROL-PHY.
Figure 10:
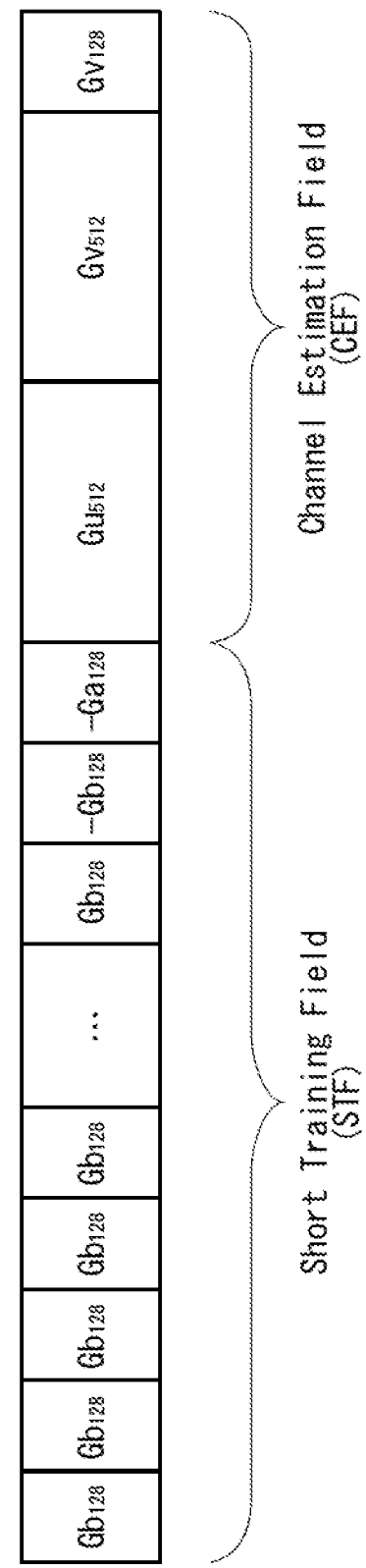
FIG. 10 is a schematic diagram illustrating a format of a preamble of the signal frame of CONTROL-PHY.

FIG. 9 is a diagram illustrating a format of a signal frame of CONTROL-PHY. The signal frame of the CONTROL-PHY illustrated in FIG. 9 has a configuration that includes respective areas of a preamble PR, a header HD, a payload PD, and a TRN-NT. The area of the TRN-NT is optional. FIG. 10 is a schematic diagram illustrating the format of the preamble of the signal frame of CONTROL-PHY.

The preamble PR illustrated in FIG. 10 has a configuration that includes STF and CEF. The STF of the preamble PR is configured by a sequence in which thirty eight Golay codes $Gb_{128}(n)$, each of which has a length of 128 bits, are repeated, one Golay code $-Gb_{128}(n)$ and one Golay code $-Ga_{128}(n)$. Accordingly, the entire length of the STF is 5120 bits and is longer than that of the STF of the preamble illustrated in FIG. 3. The waveform of the STF is represented by Expression (3). Since the CEF has the same configuration as that of the preamble illustrated in FIG. 3, the description thereof will be omitted.

[Expression 3]

$$r_{STF}(nT_c) = \begin{cases} (Gb_{128}(n \bmod 128))\exp\left(j\pi\frac{n}{2}\right) \\ n = 0, 1, \ldots, 37 \times 128 - 1 \\ (-Gb_{128}(n \bmod 128))\exp\left(j\pi\frac{n}{2}\right) \\ n = 37 \times 128, \ldots, 38 \times 128 - 1 \\ (-Ga_{128}(n \bmod 128))\exp\left(j\pi\frac{n}{2}\right) \\ n = 38 \times 128, \ldots, 39 \times 128 - 1 \end{cases} \quad (3)$$

Although the WiGig wireless device of each embodiment described above transmits the signal frame suitable for the WiGig specification one time, the WiGig wireless device may continue to transmit the signal frame suitable for the WiGig specification having a minimum payload continuously, without limiting the number of times of transmission to one.

Further, the WiGig wireless device of each embodiment described above may successively transmit only preamble or header of the signal frame suitable for the WiGig specification. Thus, the WiGig wireless device can transmit the pulse compression signal having a smaller size in which the size of the payload is reduced, and thus the measurement of the radiation pattern of the sensor can be simplified.

In addition, in FIG. 5, the WiGig wireless device 20BB may output the mask control signal SSG2 to the mask circuit section 30 and may transmit it to sensors other than the sensor 10 illustrated in FIG. 1 at the same time. Although the mask control signal SSG2 is a signal by which the mask circuit section 30 partially performs a mask processing, timings when the WiGig wireless device 20BB transmits the pulse compression signal may be also considered. In addition, other sensors and the WiGig wireless device 20BB may communicate in a wired or wireless manner.

If the WiGig wireless device 20BB knows timings of transmitting the mask control signal SSG2 in advance, other sensors can specify distances with the WiGig wireless device 20BB on a basis of times when the mask control signals transmitted by the WiGig wireless device 20BB are received.

Next, a wireless communication device which performs communication using a beam forming function will be described.

A beam forming function is a multi-antenna technology in order for a transmission terminal to transmit a radio wave in a direction in which a reception terminal is present and causes a transmission radio wave to have directivity in a specific direction. For example, by using a plurality of antennas, the transmission terminal can transmit the radio wave farther or can transmit the radio wave while an interference with radio waves transmitted from an adjacent base station or a reception terminal is suppressed. The beam forming function adjusts power or a phase of a signal (radio wave) transmitted by a plurality of antennas, thereby allowing the radio wave to be transmitted in a desired direction.

In a design or an operation test of a wireless communication device having a beam forming function, it is necessary to understand an antenna radiation pattern, that is, a radiation pattern of a radio wave, by using an actual wireless communication device for the sake of determination and improvement of performance.

In the related art, in a case of measuring the antenna radiation pattern of the wireless communication device using the beam forming function, the wireless communication device is brought into a anechoic chamber and the antenna radiation pattern thereof is measured. If the antenna radiation pattern is measured in an environment other than an anechoic chamber, reflected waves are generated from objects located in the vicinity of the wireless communication device. In particular, in a short-range communication, a distinction between the direct wave and the reflected waves is difficult due to a small time difference between the direct and the reflected waves which are to be detected, and thus the measurement of the correct antenna radiation pattern is difficult.

On the other hand, PTL 1 discloses a radio wave environment measuring device which can detect a radio wave condition in an environment other than the anechoic chamber in which the direct wave and the reflected waves are mixed. In PTL 1, the direct wave and the reflected waves are separated by a pulse compression signal.

In PTL 1 below, a pulse compression signal is used, and a reception device detects a correlation between a received pulse and a reference pulse. Thus, the radio wave environment measuring device of PTL 1 can compress a time width of a detected pulse to a range narrower than a pulse width of a pulse signal to be transmitted actually. Accordingly, due to an improvement in time resolution, the radio wave environment measuring device of PTL 1 can separate and detect the direct wave and the reflected waves, which have a small time difference, from each other.

[PTL 1] Japanese Patent No. 3112746

Problems in the Related Art

However, the beam forming function is not taken into account in PTL 1, so that in the beam forming of controlling the directivity of the antenna, if respective antenna radiation patterns are not optimal, a characteristic of a high frequency signal (for example, phase characteristic) varies. Accordingly, the radiation pattern of a radio wave (beam) is changed, and thus a communication performance of the wireless communication device is deteriorated.

In a case where in a wireless communication device has a beam forming function using a plurality of antennas, a sensor detects all beams actually radiated from the wireless communication device, a communication setting for communication negotiation between the wireless communication device and the sensor becomes complicated. That is, measurement times of radiation patterns of all beams become long.

In order to solve the above-described problems in the related art, an object of the present disclosure is to provide a wireless communication device which measures a radiation pattern of a beam having a desired directivity in a beam forming in a short time.

Solution to Problem

The present disclosure relates to a wireless communication device including a plurality of antenna system processing sections, in which each of the antenna system processing sections includes a code sequence selection section configured to select a code sequence of a transmission signal, a pulse compression signal generation section configured to perform a pulse compression processing on the selected code sequence, a phase shifter configured to adjust the phase of the signal subjected to the pulse compression processing in accordance with the selected code sequence, and a transmission RF section configured to convert the signal, of which phase is adjusted, to a high frequency signal and transmits the high frequency signal from a transmission antenna.

Advantageous Effects of Invention

According to the present disclosure, it is possible to measure a radiation pattern of a beam having a desired directivity in a beam forming in a short time.

Each embodiment of a wireless communication device according to the present disclosure will be described below with reference to drawings.

<Third Embodiment>

(Wireless Communication Device 2000)

Figure 11:
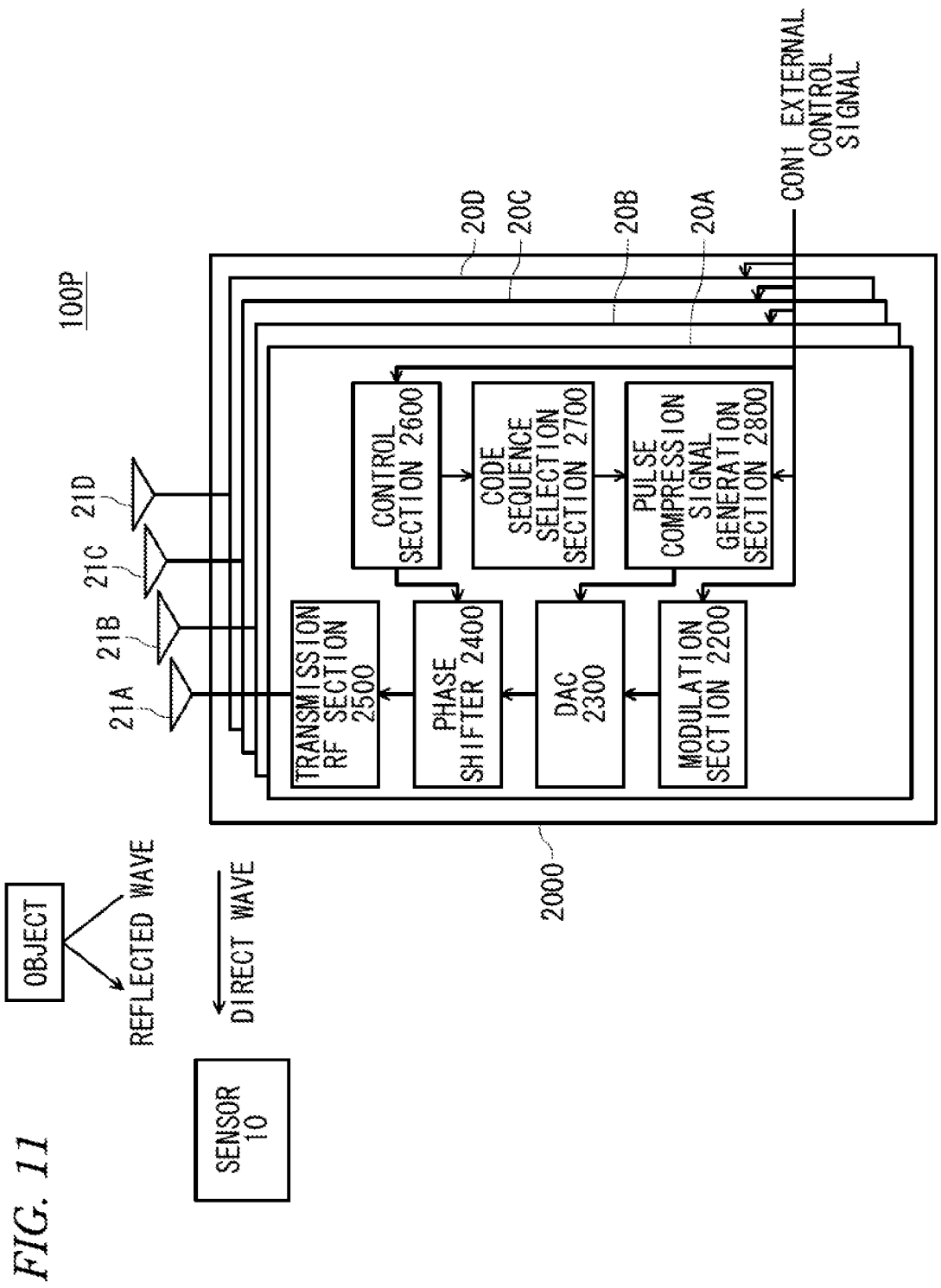
FIG. 11 is a block diagram illustrating a system configuration of a radiation pattern measurement system and an internal configuration of a wireless communication device in a third embodiment.

FIG. 11 is a block diagram illustrating a system configuration of a radiation pattern measurement system 100PPP and an internal configuration of a wireless communication device 2000 in a third embodiment. The frequency band used for wireless communication by the wireless communication device 2000 is a millimeter-wave band, for example, 60 GHz band. A wireless communication distance is about 10 m. Further, in FIG. 11, the main parts of the transmission system of the wireless communication device 2000 are illustrated, and other circuits are not illustrated.

The wireless communication device 2000 has a beam forming function and has a configuration that includes a plurality of antenna system processing sections (branches) 20A, 20B, 20C, and 20D. Hereinafter, the antenna system processing section is termed as a "branch". Although the wireless communication device 2000 illustrated in FIG. 11 is configured to include for example, four branches 20A, 20B, 20C, and 20D, the number of branches of the wireless communication device 2000 is not limited to four. Further, since each branch has the same configuration, in the following description, a branch 20A is described as an example.

The branch 20A illustrated in FIG. 11 has a configuration that includes a transmission antenna 21A, a modulation section 2200, a Digital Analog Converter (DAC) 2300, a phase shifter 2400, a transmission RF section 2500, a control section 2600, a code sequence selection section 2700 and a pulse compression signal generation section 2800. In addition, the modulation section 2200 may be included in each branch, or one modulation section 2200 may be included in the wireless communication device 2000 as a configuration in which the modulation section is independent of all branches.

The external control signal CON1 is a control signal which is input to each of the branches 20A to 20D and switches between a data communication mode and a measurement mode for measuring the radiation pattern of the transmission beam in the wireless communication device 2000. The content of the external control signal CON1 may be switched by a user's operation (for example, button operation) or may be switched by an input of a control command from outside.

Further, the external control signal CON1 may include control information for measuring the radiation pattern of a specific transmission beam, and a radiation pattern measurement system 100PP measures the radiation pattern of the specific transmission beam. The external control signal CON1 is input to the modulation section 2200, the control section 2600, the code sequence selection section 2700, and the pulse compression signal generation section 2800 in the branch 20A.

The modulation section 2200 receives the external control signal CON1, operates when the content of the external control signal CON1 is the data communication mode, and generates a modulation signal of a signal frame (for example, a signal frame suitable for the Wireless Gigabit (WiGig) specification) of a transmitted signal and outputs the modulation signal to the DAC 2300. In addition, a modulation method between the wireless communication device 2000 and the sensor 10 is assumed to be well-known. Further, the modulation section 2200 does not operate when the content of the external control signal CON1 is the measurement mode.

The DAC 2300 converts a digital modulation signal which is output from the modulation section 2200 in the data communication mode and a digital pulse compression signal which is output from the pulse compression signal generation section 2800 in the measurement mode to an analog signal and outputs the analog signal to the phase shifter 2400.

The phase shifter 2400 adjusts the phase of the analog signal which is output from the DAC 2300 in accordance with a phase parameter which is given from the control section 2600. The phase shifter 2400 outputs the analog signal of which the phase is adjusted to the transmission RF section 2500.

The transmission Radio Frequency (RF) section 2500 converts the analog signal which is output from the phase shifter 2400 to a high frequency signal and supplies the high frequency signal to a transmission antenna 21A. One transmission antenna 21A is provided for each branch and transmits (radiates) the high frequency signal (radio wave) which is output from the transmission RF section 2500 as an electromagnetic wave to a space.

In the present embodiment and the fourth embodiment, the wireless communication device 2000 uses a pulse compression signal in order to suppress the influence of a reflected wave and to measure a correct radiation pattern of a radio wave in an environment in which the reflected waves are generated, in measuring the radiation pattern of a radio wave radiated from the wireless communication device 2000. In order to use the pulse compression signal, the sensor 10 calculates a correlation value between a code sequence of a transmission beam which is held in the correlator and a received signal (received pulse) using the correlator. Accordingly, in order for the sensor 10 to detect a correlation, the wireless communication device 2000 transmits a pulse compression signal in the measurement mode.

Specifically, the wireless communication device 2000 transmits a signal in which pulses having a same time width repeatedly occur in a constant period as a pulse compression signal. Known codes are used in the pulse compression signal. The sensor 10 calculates a correlation value between a code sequence of a transmission beam and a received signal and determines that a beam of which code sequence was transmitted, on a basis of a maximum value (peak correlation value) of a correlation value. The time width of the pulse compression signal extracted by the correlation detection of the reception side is shorter than the time width of the pulse of the transmission beam transmitted by the wireless communication device 2000. Thus, separation of the direct wave and the reflected wave, which have a small arrival time difference from each other, becomes easy.

The control section 2600 receives the external control signal CON1 and gives a parameter for adjusting a phase of an analog signal which is output from the DAC 2300 to the phase shifter 2400, when the content of the external control signal CON1 is the data communication mode or the measurement mode.

Here, the parameter of a phase will be described with reference to FIG. 14. FIG. 14 is a table illustrating an example of a phase parameter in a phase shifter of each branch which is given to a transmission beam of each index in the third embodiment. The branches B1, B2, B3, and B4 illustrated in FIG. 14 respectively correspond to the branches 20A, 20B, 20C, and 20D illustrated in FIG. 11. In addition, it is preferable that the content of a table illustrated in FIG. 14 be stored in, for example, a storage area (not illustrated) of the control section 2600 in advance.

In the present embodiment, the code sequences used for respective transmission beams are predetermined and different from each other. For example, "code sequence F1" is used in a transmission beam 1 of an index 1 for identifying a transmission beam, "100 degrees" is set in the phase shifter of the branch 20A, "110 degrees" is set in the phase shifter of the branch 20B, "120 degrees" is set in the phase shifter of the branch 20C, and "130 degrees" is set in the phase shifter of the branch 20D.

In a similar manner, "code sequence F2", "code sequence F3", . . . , and "code sequence FN" are respectively used in a transmission beam 2, a transmission beam 3, . . . , and a transmission beam N, and the parameter of a corresponding phase is set in the phase shifter of each branch (see FIG. 14). N represents the number of code sequences and the number of branches of the wireless communication device.

In a case where the content of the external control signal CON1 is the measurement mode, the control section 2600 outputs a selection instruction to the code sequence selection section 2700, and specifically, causes the code sequence selection section 2700 to select the code sequence of the transmission beam in the measurement mode.

The code sequence selection section 2700 selects a code sequence corresponding to a transmission beam on a basis of a selection instruction from the control section 2600. Further, although it is preferable that the code sequence corresponding to each transmission beam be stored in the storage area of the code sequence selection section 2700 in advance, the wireless communication device 2000 may include a memory (not illustrated) storing a code sequence. The code sequence selection section 2700 outputs the selected code sequence to the pulse compression signal generation section 2800.

Figure 15:
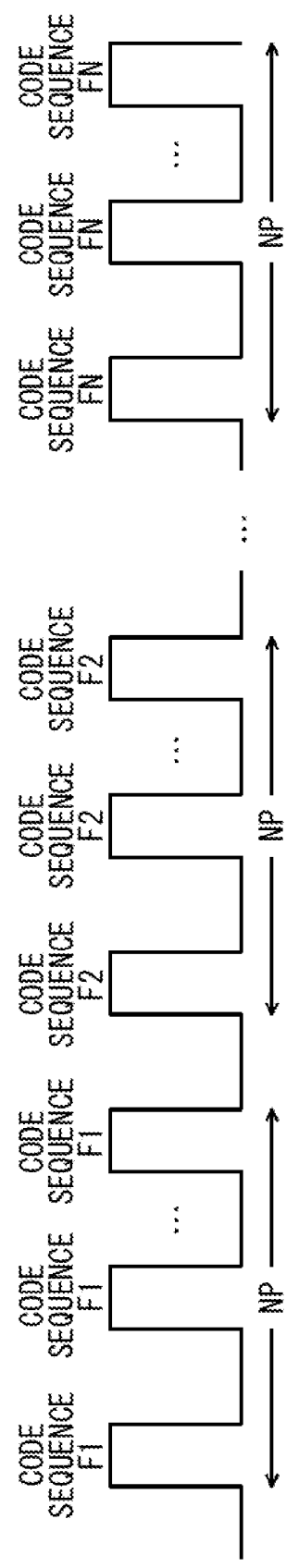
FIG. 15 is an explanatory view illustrating in time series, a transmission example of a case in which transmission beams of the same code sequence are successively transmitted, and thereafter, transmission beams of the subsequent code sequence are successively transmitted.
Figure 16:
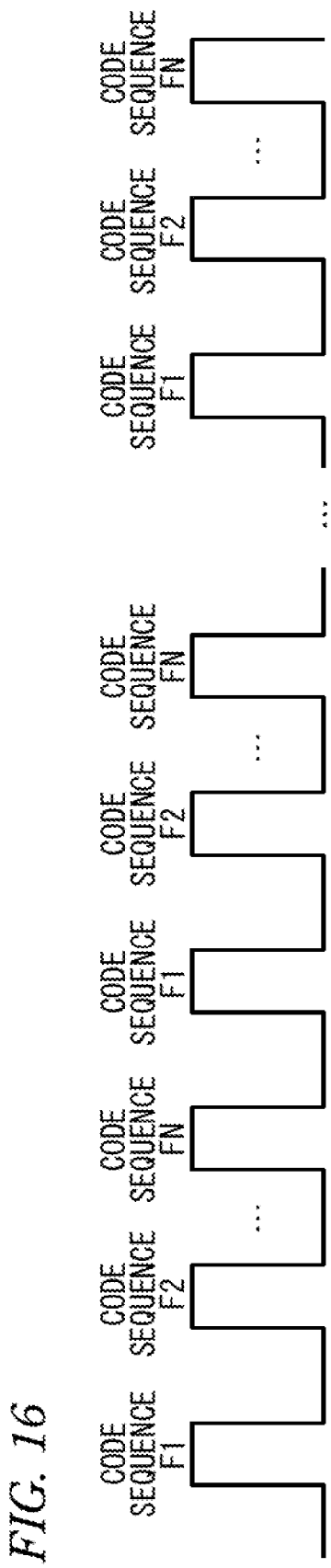
FIG. 16 is an explanatory view illustrating in time series, a transmission example of a case in which transmission beams of respective code sequences are transmitted in order one by one, and thereafter, transmission beams are sequentially transmitted in order from a transmission beam of a first code sequence.

Here, examples of a selection order of a code sequence of the code sequence selection section 2700 will be described with reference to FIGS. 15 and 16. FIG. 15 is an explanatory view illustrating in time series, a transmission example of a case in which transmission beams of a same code sequence are successively transmitted, and thereafter transmission beams of the subsequent code sequence are successively transmitted. FIG. 16 is an explanatory view illustrating in time series, a transmission example of a case in which transmission beams of respective code sequences are transmitted in order one by one, and thereafter transmission beams are sequentially transmitted in order from a transmission beam of a first code sequence again.

In FIG. 15, the code sequence selection section 2700 successively selects the same code sequence (for example, code sequence F1) a predetermined number of times (for example, NP), after continuous selection of NP number of times, successively transmits the subsequent code sequence (for example, code sequence F2) which is different from the code sequence that was already selected a predetermined number of times (for example, NP). In a similar manner, the code sequence selection section 2700 successively transmits the code sequence of the same sequence which is different from the code sequence that was already selected and successively selects a final code sequence (for example, code sequence FN) a predetermined number of times (for example, NP).

Otherwise, in FIG. 16, the code sequence selection section 2700 selects all code sequences (for example, code sequences F1, F2, F3, ..., FN) which are different from each other, in order, and after selecting the all code sequences which are different from each other, again selects the code sequences which are different from each other, in order. The code sequence selection section 2700 may repeat selections of the all code sequences which are different from each other in accordance with order, a predetermined number of times (for example, NP). In addition, in FIGS. 15 and 16, it is preferable that the order of selection of the code sequence be defined in the operation of the code sequence selection section 2700 in advance.

However, a selection method of a code sequence by the code sequence selection section 2700 is not limited to a selection method of a code sequence illustrated in FIG. 15 or 16. For example, the code sequence selection section 2700 may select any code sequence in any order.

The pulse compression signal generation section 2800 receives the external control signal CON1, and operates in a case where the content of the external control signal CON1 is the measurement mode. Specifically, the pulse compression signal generation section 2800 performs a known pulse compression processing on a basis of code sequences which are output from the code sequence selection section 2700. The pulse compression signal generation section 2800 outputs a pulse compression signal generated by the pulse compression processing to the DAC 2300.

(Sensor 10)

Figure 12:
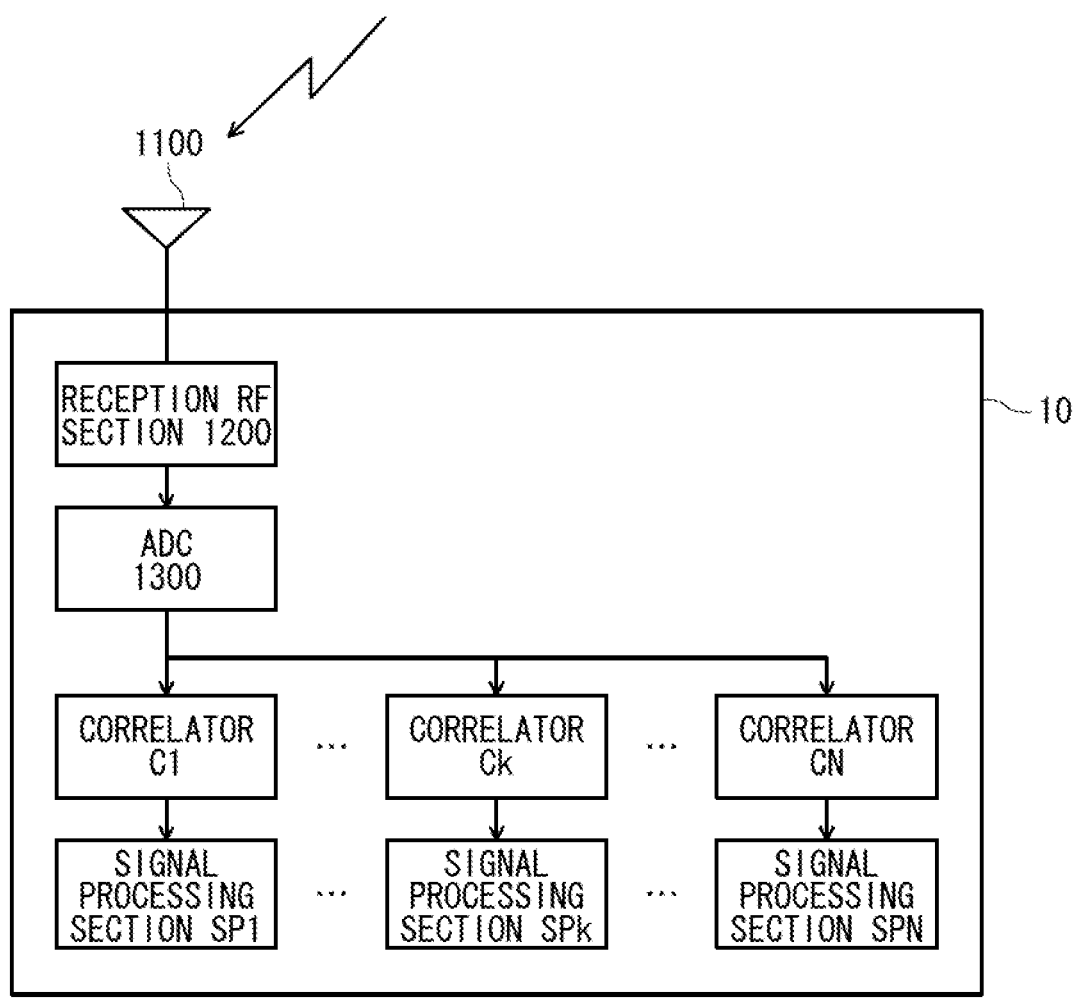
FIG. 12 is a block diagram illustrating an internal configuration of a sensor in the radiation pattern measurement system illustrated in FIG. 11.

FIG. 12 is a block diagram illustrating an internal configuration of a sensor 10 in the radiation pattern measurement system 100PP illustrated in FIG. 11. The sensor 10 illustrated in FIG. 12 receives a transmission beam as a pulse compression signal transmitted by the wireless communication device 2000 in the reception antenna 1100 and measures the radiation pattern of a radio wave. Further, FIG. 12 illustrates main parts of the reception system of the sensor 10 and does not illustrate other circuits.

The sensor 10 illustrated in FIG. 12 has a configuration that includes a reception antenna 1100, a reception RF section 1200, an Analog Digital Converter (ADC) 1300, a plurality of N correlators C1, ..., Ck, ..., and CN and signal processing sections SP1, ..., SPk, ..., and SPN. Here, k is an integer among 1 to N. N represents the number of the correlators and signal processing sections and is the same as the number of code sequences of the transmission beam which are transmitted from the wireless communication device 2000 and the number of branches of the wireless communication device 2000.

The reception RF section 1200 receives a high frequency signal of a radio wave that is received by the reception antenna 1100 and converts the high frequency signal to an analog reception signal of a low frequency, on a basis of a local signal (not illustrated) in the sensor 10. The ADC 1300 converts an analog reception signal, which is output from the reception RF section 1200, to a digital reception signal.

The operation of the correlators C1, ..., Ck, ..., and CN will be described by taking the correlator Ck as an example. The correlator Ck holds a code sequence of a transmission beam of an index k and calculates a correlation value of a digital reception signal which is output from the ADC 17 by a predetermined correlation processing. Specifically, the correlator Ck calculates a correlation value between a code sequence that the correlator Ck itself holds and a reception signal and obtains a sufficient correlation value, that is a peak correlation value, in a case where the transmission beam of the same code sequence as the code sequence that the correlator Ck holds is input as a reception signal (see FIG. 13).

Figure 13:
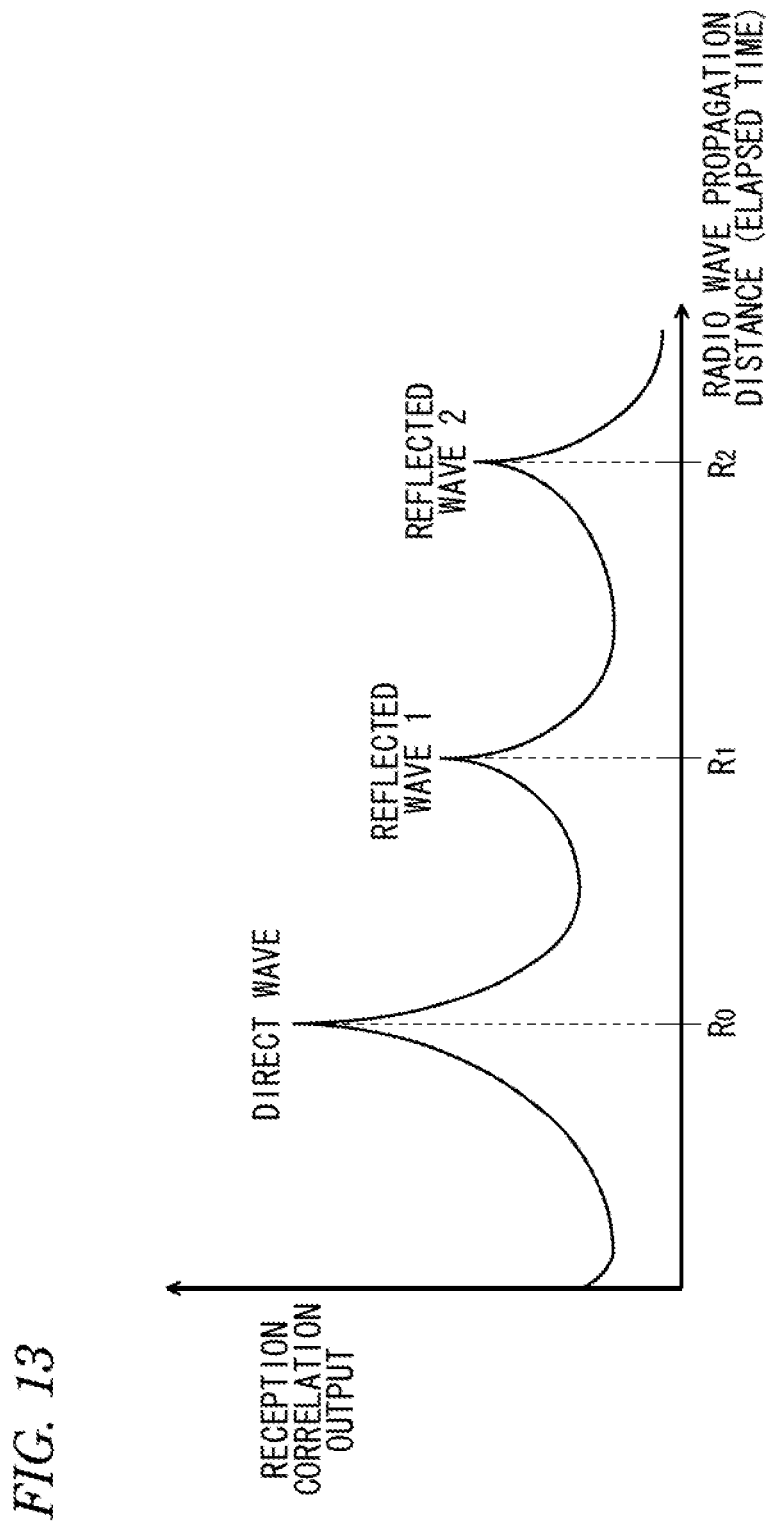
FIG. 13 is a graph illustrating a specific example of a reception correlation output characteristic of the sensor.

For example, the correlator C1 holds the code sequence F1 of the transmission beam BM1 of an index 1 illustrated in FIG. 14 and obtains a sufficient correlation value (correlation peak) in a case where the transmission beam of the same code sequence as the code sequence F1 that the correlator Ck holds is input from the wireless communication device 2000 as a reception signal (see FIG. 13). In a similar manner, the correlator CN holds the code sequence FN of the transmission beam BMN of an index N illustrated in FIG. 14 and obtains a sufficient correlation value (correlation peak) in a case where the transmission beam of the same code sequence as the code sequence FN that the correlator Ck holds is input from the wireless communication device 2000 as a reception signal (see FIG. 13).

In addition, the signal obtained at the output of the correlator Ck shows, for example, a characteristic illustrated in FIG. 13. FIG. 13 is a graph illustrating a specific example of a reception correlation output characteristic of the sensor 10. That is, a time elapsed from after the wireless communication device 2000 transmits a transmission beam until a corresponding reception signal occurs as an output of the correlator Ck is different in a direct wave and each reflected wave due to a difference in a radio wave propagation distance. In addition, a distinction between the direct wave and each reflected wave is difficult in a case where the time difference between the direct wave and each reflected wave is small.

However, in the present embodiment, a time width of a peak waveform which is obtained as an output of a correlation processing becomes sufficiently short with respect to the width of a pulse signal which is transmitted by a correlation processing of the correlator Ck. Accordingly, a reliable distinction between the direct wave and each reflected wave is possible in FIG. 13, even if the direct wave and the reflected wave are received with a small reception time difference.

The operations of the signal processing sections SP1, . . . , SPk, . . . , and SPN will be described by taking the signal processing section SPk as an example. The signal processing section SPk acquires necessary information on a basis of an output (correlation value) of the correlator Ck. For example, the signal processing section SPk respectively specifies a direct wave and each reflected wave on a basis of a peak position of a signal which is input from the correlator Ck to the signal processing section SPk and detects the reception level of the direct wave and the reception level of each reflected wave.

(Measurement Method of a Radiation Pattern)

Next, a measurement method of measuring a radiation pattern of a transmission beam in a radiation pattern measurement system 100PP illustrated in FIG. 11 will be described. In FIG. 11, a sensor 10 is disposed in the vicinity of the wireless communication device 2000. Further, the content of the external control signal CON1 to be input to the wireless communication device 2000 is switched, the operation mode of the wireless communication device 2000 being switched from the data communication mode to the measurement mode of measuring a radiation pattern, and the control information for measuring the radiation pattern of the transmission beam of an index k is input.

In addition, in the present embodiments and the fourth embodiment, the wireless communication device 2000 and the sensor 10 process the negotiation of communication in advance. Accordingly, the sensor 10 knows timings at which the wireless communication device 2000 transmits or receives the transmission beam as a pulse compression signal.

The control section 2600 causes the code sequence selection section 2700 to select a code sequence corresponding to the transmission beam in the measurement mode on a basis of the external control signal CON1. Further, the control section 2600 selects a phase parameter given to the transmission beam of the index k and gives the parameter to the phase shifter 2400.

The code sequence selection section 2700 selects a code sequence corresponding to a transmission beam of an index k on a basis of a selection instruction from the control section 2600 and outputs the selected code sequence to the pulse compression signal generation section 2800.

The pulse compression signal generation section 2800 generates a pulse compression signal on a basis of a code sequence which is output from the code sequence selection section 2700 and outputs the generated pulse compression signal to the DAC 2300. The DAC 2300 converts a digital pulse compression signal which is output from the pulse compression signal generation section 2800 to an analog signal and outputs the analog signal to the phase shifter 2400. The phase shifter 2400 adjusts the phase of the analog signal which is output from the DAC 2300 in accordance with the phase parameter which is given from the control section 2600.

The phase shifter 2400 outputs the analog signal of which the phase was adjusted to the transmission RF section 2500. The transmission RF section 2500 converts the analog signal which is output from the phase shifter 2400 into a high frequency signal and supplies the high frequency signal to the transmission antenna 21A. The transmission antenna 21A transmits (radiates) the high frequency signal (radio wave) which is output from the transmission RF section 2500 as an electromagnetic wave to a space. Thus, the wireless communication device 2000 can transmit a pulse compression signal suitable for correlation detection in the sensor 10.

In FIG. 12, the sensor 10 receives a radio wave, that is, a transmission beam of an index k which is radiated (transmitted) from the wireless communication device 2000, in the reception antenna 1100. The reception RF section 1200 receives a high frequency signal of the radio wave which is received by the reception antenna 1100 and converts the high frequency signal to an analog reception signal of low frequency. The ADC 1300 converts an analog reception signal which is output from the reception RF section 1200 to a digital reception signal. The digital reception signal which is output from the ADC 1300 is input to a plurality of N correlators C1, . . . , Ck, . . . , and CN.

N correlators C1, . . . , Ck, . . . , and CN calculate a correlation value between a code sequence corresponding to a transmission beam of an index that each correlator holds and a reception signal which is output from the ADC 1300. Among respective outputs of N correlators C1, . . . , Ck, . . . , and CN, the correlation calculation value of a correlator which does not hold the code sequence corresponding to a transmission beam of an index k becomes zero, and the correlation calculation value of the correlator Ck which holds a code sequence corresponding to a transmission beam of an index k becomes non-zero.

The signal processing section SPk detects the signal power (reception level) of a transmission beam of an index k on a basis of a correlation calculation value of the correlator Ck, for example, a peak value of a correlation value. Thus, the sensor 10 can measure the radiation pattern of the transmission beam of the index k.

Thus, the wireless communication device 2000 of the present embodiment performs a pulse compression processing on a transmission beam having a desired directivity by using a code sequence as an index and transmits the transmission beam. Thus, the sensor 10 can measure the radiation pattern of the transmission beam in a short time, on a basis of a result of the correlation calculation by a plurality of correlators. Accordingly, the wireless communication device 2000 can measure a radiation pattern of a beam having a desired directivity in a short time.

<Modification Example of Third Embodiment>

In the third embodiment, "code sequence" is used as an index of each transmission beam as a measurement object of a radiation pattern. In the modification example of the third embodiment, "transmission interval" is used as an index of each transmission beam as a measurement object of a radiation pattern. In addition, in the modification example of the third embodiment, since a configuration of the wireless communication device is the same as the wireless communication device 2000 of the third embodiment, the same reference numerals as the third embodiment are used in a description of the present modification example.

(Wireless Communication Device 2000)

Figure 17:
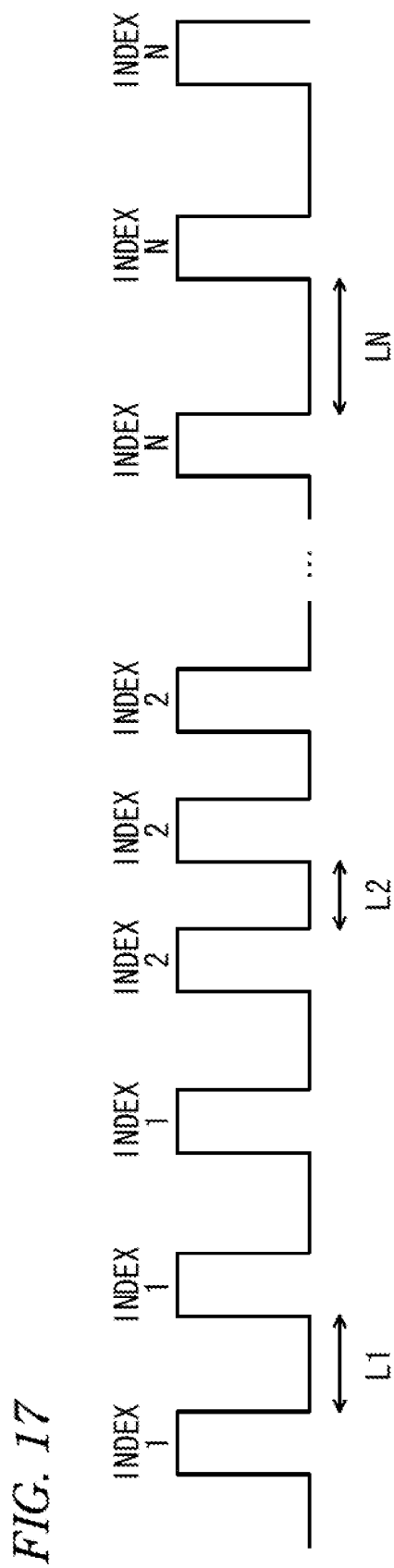
FIG. 17 is an explanatory view illustrating in time series, a transmission example of a case in which transmission beams are successively transmitted at different transmission intervals for respective transmission beams.

In the modification example, the code sequence selection section 2700 may store one code sequence (for example, code sequence F1). That is, the code sequence selection section 2700 selects one code sequence (for example, code sequence F1) as the code sequence of a transmission beam. Specifically, the code sequence selection section 2700 changes a selection interval in which one code sequence (for example, code sequence F1) is selected in accordance with the index of the transmission beam as a measurement object. FIG. 17 is an explanatory view illustrating in time series, a transmission example of a case in which transmission beams are successively transmitted at different transmission intervals for respective transmission beams.

In FIG. 17, the selection interval of a code sequence corresponding to a transmission beam of an index 1 is L1, and the code sequence selection section 2700 selects the code sequence corresponding to the transmission beam as a measurement object, each time the interval L1 has elapsed. The selection interval of a code sequence corresponding to a transmission beam of an index 2 is L2, and in a similar manner, the selection interval of a code sequence corresponding to a transmission beam of an index N is LN. Accordingly, the wireless communication device 2000 transmits the transmission beam of the index 1 at each interval L1, transmits the transmission beam of the index 2 at each interval L2, and transmits the transmission beam of the index N at each interval LN, in a similar manner.

However, a selection method of a code sequence by the code sequence selection section 2700 is not limited to a selection method of a code sequence illustrated in FIG. 17. That is, in the modification example, the wireless communication device 2000 may transmit the transmission beams of the code sequences corresponding to indexes in accordance with the orders illustrated in FIG. 17.

(Sensor 10)

In the modification example, the sensor 10 may have a configuration that includes at least one correlator and a signal processing section (for example, a correlator C1 and a signal processing section SP1). That is, the correlator C1 holds the code sequence F1, and thus calculates a correlation value between a reception signal of a transmission beam transmitted from the wireless communication device 2000 and the code sequence F1.

The signal processing section SP1 detects an interval in which a peak value of a correlation value calculated by the correlator C1 appears, that is, the interval between the peak correlation value corresponding to the transmission beam that is received at the previous time and the peak correlation value corresponding to the transmission beam that is received at this time and determines that a transmission beam of which index is received.

In addition, in the present modification example, it is preferable that a transmission interval of a transmission beam which is transmitted from the wireless communication device 2000, that is, a selection interval of a code sequence by the code sequence selection section 2700, be a sufficiently large value in consideration of reception of a reflected wave in addition to a direct wave.

Thus, the wireless communication device 2000 of the present modification example can measure a radiation pattern of a beam having a desired directivity in a short time in a similar manner with the third embodiment.

<Fourth Embodiment>

In the third embodiment or the modification example of the third embodiment, the parameter of the phase given by the phase shifter are searched for and determined in advance. In a fourth embodiment, a wireless communication device and a sensor search for and determine an optimal value of a parameter of a phase given by a phase shifter of each branch.

Specifically, the wireless communication device successively transmits transmission beams while changing the parameter of the phase in a specific branch as the search object and using N code sequences and candidate values of parameters of a total of N phases in which the parameters of the phases in other branches, which are not the search object or for which searches are already ended, are fixed.

The sensor determines an optimal value of the parameter of the phase in the phase shifter of the branch as the search object on a basis of a coherent addition value of a correlation value between a reception signal and a code sequence of a transmission beam. In a similar manner, the wireless communication device successively transmits transmission beams using candidate values of parameters of a total of N phases of a specific branch as the subsequent search object and N code sequences. In a similar manner, the sensor determines the optimal value of the parameter of the phase in the phase shifter of the branch as the search object on a basis of the coherent addition value of the correlation value between the reception signal and the code sequence of the transmission beam.

In this manner, the wireless communication device and the sensor search for and determine optimal values of parameters of the phases in the phase shifters of all branches of the wireless communication device. In addition, in the present embodiment, since the configuration of the wireless communication device is the same as the configuration of the wireless communication device 2000 of the first embodiment, the same reference numerals as the third embodiment are used in the description of the present embodiment. In the present embodiment, since a radio wave for radiation pattern measurement transmitted by the wireless communication device 2000 has directivity, it is preferable that the sensor be disposed in consideration of the directivity of the radio wave.

(Table of Candidate Values of Parameters of Phases)

FIG. 18 is a table illustrating an example of a candidate value of a phase parameter in a phase shifter of each branch which is given to a transmission beam of each index in the fourth embodiment. The branches B1, B2, B3, and B4 illustrated in FIG. 18 correspond to the branches 20A, 20B, 20C, and 20D illustrated in FIG. 11, respectively. In addition, it is preferable that the candidate values of parameters in the table illustrated in FIG. 18 be stored in advance, for example, in the storage area (not illustrated) of the control section 2600.

In the present embodiment, the code sequences used for respective transmission beams are determined in advance and are different from each other, such that unlike the code sequences in the third embodiment or the modification example of the third embodiment, in a case where a parameter in a phase shifter of each branch is not set to an optimal value, a description is given of a method of determining an optimal value in a sensor 10B. In the present embodiment, the sensor 10B illustrated in FIG. 19 can determine an optimal value of a phase parameter in a phase shifter of each branch of the wireless communication device 2000, on a basis of a correlation value between a code sequence of a transmission beam and a reception signal.

In addition, in the table illustrated in FIG. 18, with respect to the parameters of respective phase shifters of the branches B1, B2, and B3 (branches 20A, 20B, and 20C), "100", "110", "120" are searched for as optimal values or are temporarily set without being searched, and the optimal value of the parameter of the phase shifter of the branch B4 (branch 20D) is not searched for.

In other words, since FIG. 18 is a diagram illustrating a specific setting state in the middle of a search for an optimal phase parameter, it is assumed that the values capable of being taken as phase parameters are 0 to 200 in a temporal setting, and the phase parameters can be set in a unit of 10 steps.

The search starts when the phase parameters of all branches are set to zero, and FIG. 18 illustrates a state in which the search is finished for the branches B1 to B3, and thus 100 is allocated to the index 1 of the branch B4.

In order to determine the optimal value of the phase parameter in the phase shifter of the branch B4, the wireless communication device 2000 transmits a pulse compression signal of each code sequence, in which a phase parameter as a candidate value is set, by using a different code sequence for each transmission beam. That is, as the candidate value of the phase parameter and the code sequence in the phase shifter of the branch B4, "100" and "F1" are allocated to the transmission beam BM1 of the index 1, "120" and "F2" are allocated to the transmission beam BM2 of the index 2, "130" and "F3" are allocated to the transmission beam BM3 of the index 3, . . . , in a similar manner, "180" and "FN" are allocated to the transmission beam of the index N.

Figure 19:
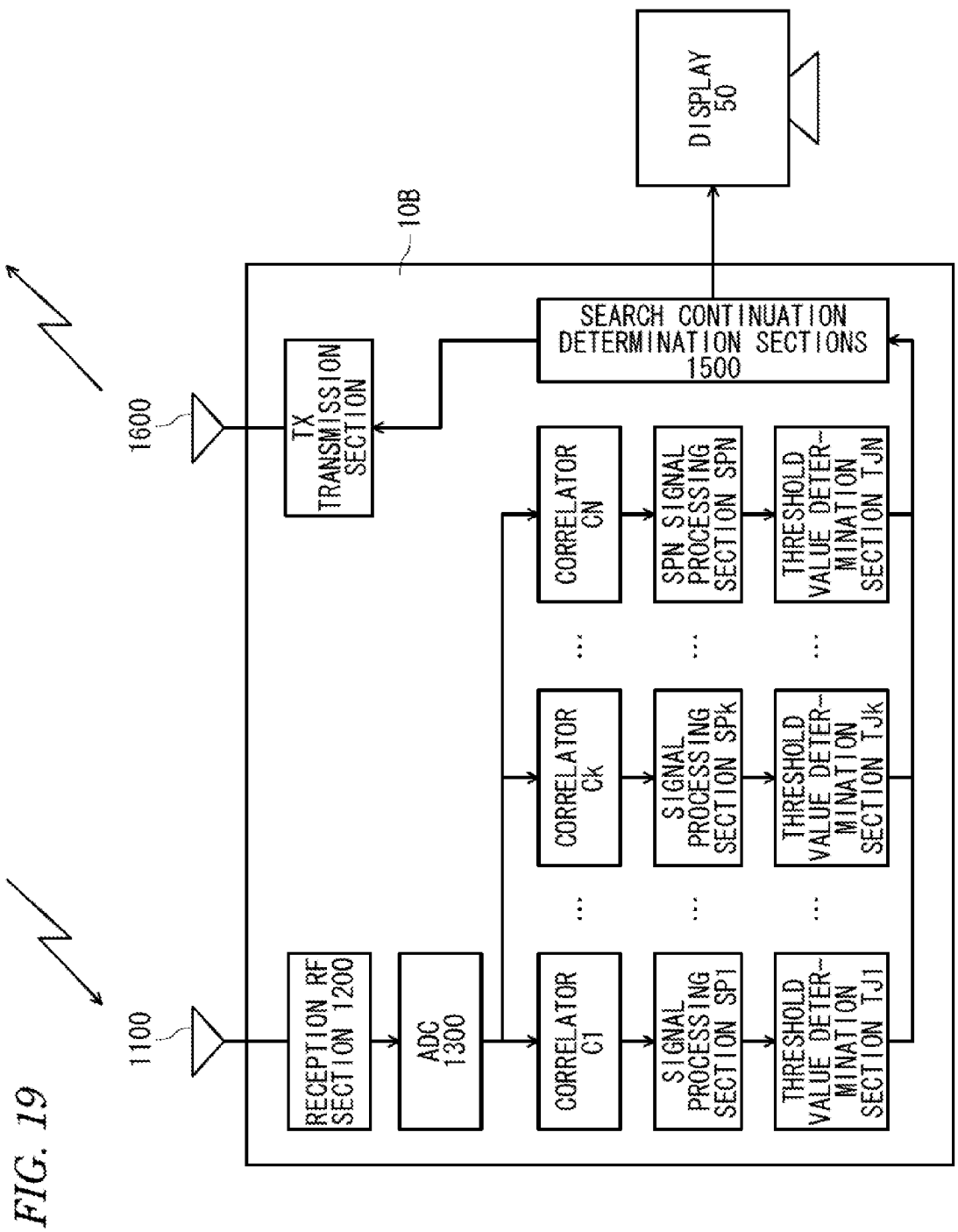
FIG. 19 is a block diagram illustrating an internal configuration of a sensor in the fourth embodiment.

In addition, the wireless communication device 2000 uses a different code sequence for each transmission beam such that the sensor 10B illustrated in FIG. 19 determines a transmission beam of which a phase parameter is an optimal value, on a basis of a coherent addition value of a plurality of N different correlation values.

(Sensor 10B)

FIG. 19 is a block diagram illustrating an internal configuration of a sensor 10B in the fourth embodiment. The sensor 10B illustrated in FIG. 19 receives a transmission beam as a pulse compression signal transmitted by the wireless communication device 2000 in the reception antenna 1100. Further, the sensor 10B determines that a candidate value of a parameter of which phase is an optimal value of the parameter of the phase in the phase shifter of the branch as the search object, on a basis of a coherent addition value of a correlation value of a code sequence of a transmission beam and a reception signal. In the sensor 10B illustrated in FIG. 19, the same reference numerals are given to the configuring components corresponding to the sensor 10 of the third embodiment, and thus the description thereof is omitted.

The sensor 10B illustrated in FIG. 19 has a configuration that includes a reception antenna 1100, a reception RF section 1200, an ADC 1300, a plurality of N correlators C1, . . . , Ck, . . . , and CN, signal processing sections SP1, . . . , SPk, . . . , and SPN, threshold value determination sections TJ1, . . . , TJk, . . . , and TJN, a search continuation determination section 1500, a transmission antenna 16, and a transmission section TX. In addition, for example, a display 50 which displays a determination result as to whether or not the determination result is an optimal value of a phase parameter may be connected to the sensor 10B.

The operations of the correlators C1, . . . , Ck, . . . , and CN, the signal processing section SP1, . . . , SPk, . . . , and SPN and the threshold value determination sections TJ1, . . . , TJk, . . . , and TJN will be described by taking the correlator Ck, the signal processing section SPk and the threshold value determination section TJk as an example.

The correlator Ck holds a code sequence corresponding to the transmission beam of an index k and calculates a correlation value by performing a predetermined correlation processing on a digital reception signal which is output from the ADC 1300. Specifically, the correlator Ck calculates a correlation value between a code sequence that the correlator Ck itself holds and a reception signal and obtains a sufficient correlation value, that is a peak correlation value, in a case where the transmission beam of the same code sequence as the code sequence that the correlator Ck holds is input as a reception signal. The correlator Ck outputs a calculated correlation value, that is, a peak correlation value or a non-peak correlation value, to the signal processing section SPk.

In addition, the code sequences of FIGS. 15 and 16 may be repeatedly transmitted a plurality of times (for example, M number of times). Since the code sequences of FIGS. 15 and 16 are repeatedly transmitted M number of times, the signal processing section SPk performs a coherent addition on a basis of M correlation values that are output from the correlator Ck. Thus, the signal processing section SPk improves a Signal to Noise Ratio (SNR) of N reception signals. The signal processing section SPk outputs the coherent addition value to the threshold value determination section TJk.

The threshold value determination section TJk compares the coherent addition value which is output from the signal processing section SPk with a predetermined threshold value and determines whether or not the coherent addition value exceeds a predetermined threshold value. The predetermined threshold value is determined in advance by the user who previously measures a radiation pattern, and the same is applied to each of the following embodiments. The threshold value determination section TJk outputs a comparison result of the coherent addition value and the predetermined threshold value, to the search continuation determination section 1500.

If the coherent addition value exceeds the predetermined threshold value, the search continuation determination section 1500 determines a phase parameter given to a transmission beam of the code sequence Sk held by the correlator Ck corresponding to the signal processing section SPk that performs a coherent addition, as the parameter of the phase in the phase shifter of the branch as the search object. In other words, in the table of FIG. 18, among unsearched phases of the branch B4, the most suitable phase can be selected.

In a case where the coherent addition value does not exceed the predetermined threshold value and an appropriate value (optimal value) is not present among 100 to 180, the search continuation determination section 1500 searches for a range by setting the phase parameter 190 in the index 1 and setting the phase parameter 200 in the index 2.

In addition, if all phase parameters are searched for, but the coherent addition value does not exceed the predetermined threshold value, the parameter of the phase given to the transmission beam of the code sequence Sk held by the correlator Ck corresponding to the signal processing section SPk that calculates a maximum coherent addition value is determined as the parameter of the phase in the phase shifter of the branch as the search object.

The transmission section TX transmits the determination result of the search continuation determination section 1500 from the transmission antenna 16 to the wireless communication device 2000. The transmission section TX transmits, for example, a search instruction of the parameter of the phase in the phase shifter of the branch as the search object or the parameter of the phase in the phase shifter of the branch as the subsequent search object, to the wireless communication device 2000. In addition, the above information may be informed to the wireless communication device 2000 by wired communication in addition to wireless communication.

(Search Method of Phase Parameter in Phase Shifter of Each Branch)

Figure 20:
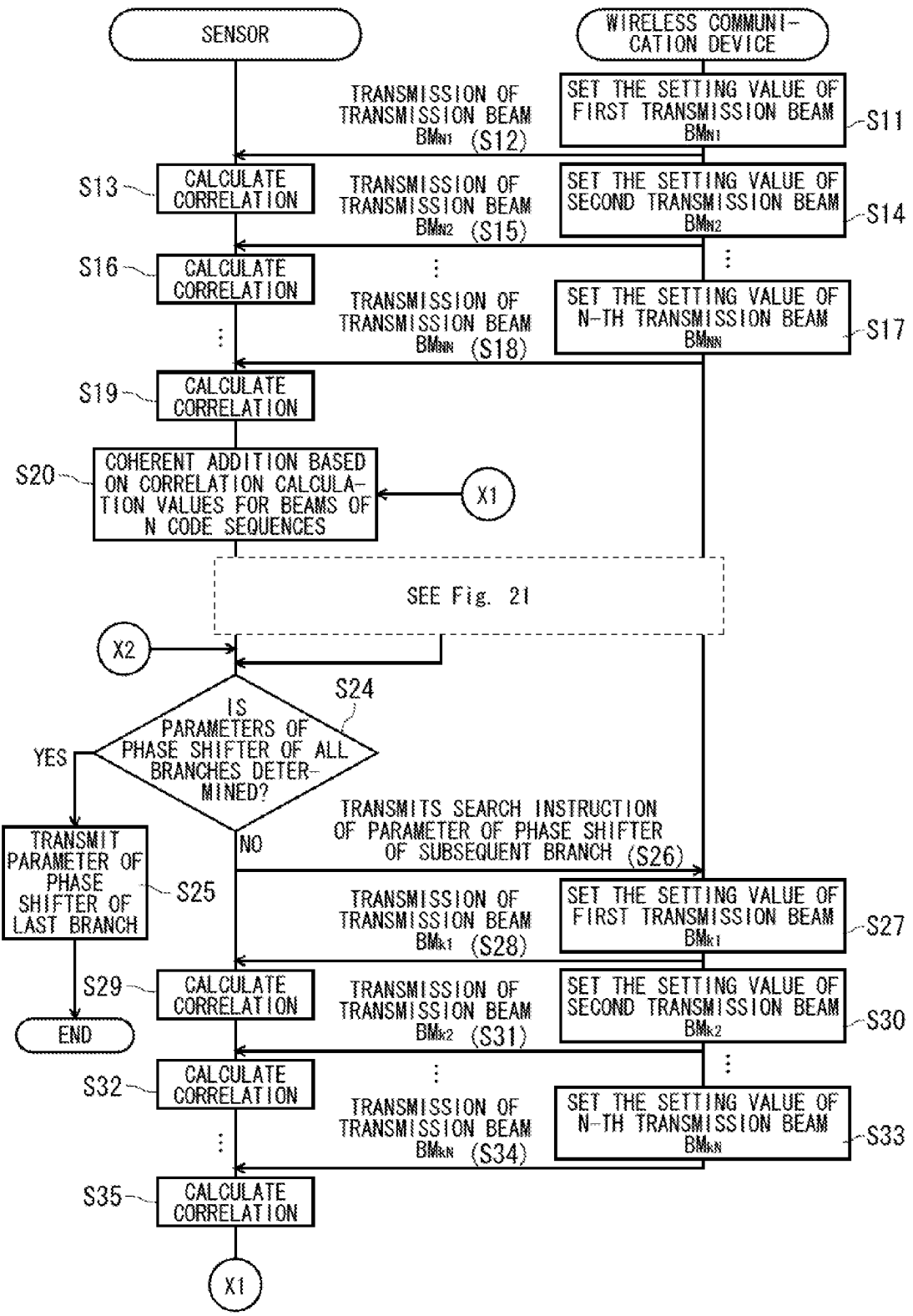
FIG. 20 is a sequence diagram illustrating operations of a wireless communication device and a sensor in the fourth embodiment.
Figure 21:
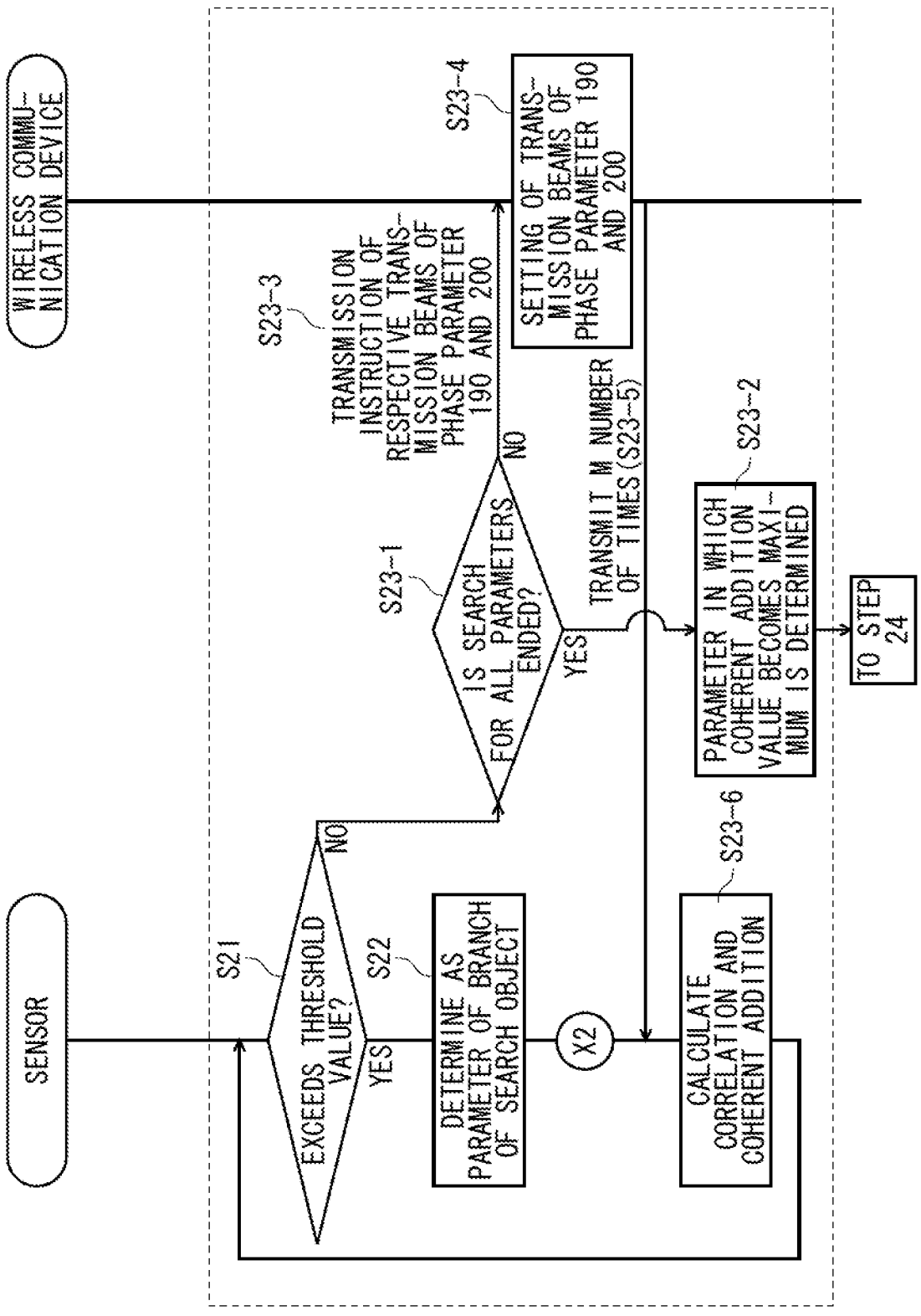
FIG. 21 is a sequence diagram illustrating operations of the wireless communication device and the sensor in the fourth embodiment.

A search method of a phase parameter in a phase shifter of each branch of the present embodiment will be described with reference to FIG. 20. FIG. 20 and FIG. 21 are sequence diagrams illustrating operations of the wireless communication device 2000 and the sensor 10B in the fourth embodiment. In the descriptions of FIGS. 20 and 21, the number of branches as the search object is assumed as N and the parameter of the phase in the phase shifter of an N-th branch is a first search object.

The wireless communication device 2000 sets, as a setting value of a first transmission beam $BM_{N1}$, a parameter having a fixed value of a phase in a phase shifter of each of first to (N−1)-th branches which are not the search object, a parameter (for example, 100) as a first candidate value of a phase in a phase shifter of the N-th branch as the search object, and a first code sequence F1 (S11). The wireless communication device 2000 transmits the first transmission beam $BM_{N1}$ in accordance with the setting value to the sensor 10B (S12). The sensor 10B calculates, in the correlators C1 to CN, the correlation value between the reception signal of the first transmission beam $BM_{N1}$ and the code sequence held by each of the correlators C1 to CN (S13).

In a similar manner, after transmission of step S12, the wireless communication device 2000 sets, as a setting value of a second transmission beam $BM_{N2}$, a parameter having a fixed value of a phase in a phase shifter of each of the first to (N−1)-th branches, which are not the search object, a parameter (for example, 110) as a second candidate value of a phase in a phase shifter of the N-th branch as the search object, and a second code sequence F2 (S14). The wireless communication device 2000 transmits the second transmission beam $BM_{N2}$ in accordance with the setting value to the sensor 10B (S15). The sensor 10B calculates, in the correlators C1 to CN, the correlation value between the reception signal of the second transmission beam $BM_{N2}$ and the code sequence held by each of the correlators C1 to CN (S16).

The wireless communication device 2000 repeats the same processing and sets, as a setting value of a N-th transmission beam $BM_{NN}$, a parameter having a fixed value of a phase in a phase shifter of each of the first to (N−1)-th branches which are not the search object, a parameter (for example, 180) as a N-th candidate value of a phase in a phase shifter of the N-th branch as the search object, and the N-th code sequence FN (S17). The wireless communication device 2000 transmits the N-th transmission beam $BM_{NN}$ in accordance with the setting value to the sensor 10B (S18). The sensor 10B calculates, in the correlators C1 to CN, the correlation value between the reception signal of the N-th transmission beam $BM_{NN}$ and the code sequence held by each of the correlators C1 to CN (S19).

Each of the signal processing sections SP1 to SPN of the sensor 10B coherently adds each correlation value that is calculated in the steps S13, S16, and S19 (S20), and outputs the coherent addition value to each of the threshold value determination sections TJ1 to TJN. In FIG. 21, the threshold value determination sections TJ1 to TJN compares the coherent addition value with the predetermined threshold value (S21) and outputs the comparison result to the search continuation determination section 1500.

In a case where the coherent addition value exceeds the predetermined threshold value (S21, YES), the search continuation determination section 1500 determines a phase parameter given to a transmission beam of a code sequence Sk held by the correlator Ck corresponding to the signal processing section SPk that performs the coherent addition as the parameter of the phase in the phase shifter of the branch as the search object (S22).

In a case where the coherent addition value does not exceed the predetermined threshold value (S21, NO), the search continuation determination section 1500 determines whether or not an optimal value of a phase parameter is searched for by using the parameters of all phases, that is, the values obtained by setting values of 100 to 200 in a 10-step unit (S23-1). In a case where the search is performed by using the parameters of all phases (S23-1, YES), the search continuation determination section 1500 determines a phase parameter given to a transmission beam of the code sequence Sk held by the correlator Ck corresponding to the signal processing section SPk which calculates a maximum coherent addition value as the parameter of the phase in the phase shifter of a branch as the search object (S23-2). Thereafter, it is followed by step S24.

In a case where the search is not performed by using the parameters of all phases (S23-1, NO), the search continuation determination section 1500 transmits a transmission instructions of a transmission beam in accordance with a setting value of a parameter "190" of a phase and the first code sequence F1, and a transmission beam in accordance with a setting value of a parameter "200" of a phase and the second code sequence F2, to the transmission section TX (S23-3).

The wireless communication device 2000 sets, as a setting value of the first transmission beam $BM_{N1}$, a parameter having a fixed value of a phase in a phase shifter of each of the first to (N−1)-th branches which are not the search object, a parameter (for example, 190) as a first candidate value of a phase in a phase shifter of the N-th branch as the search object, and the first code sequence F1 (S23-4).

Further, the wireless communication device 2000 sets, as a setting value of the second transmission beam $BM_{N2}$, a parameter having a fixed value of a phase in a phase shifter of each of the first to (N−1)-th branches which are not the search object, a parameter (for example, 200) as a second candidate value of a phase in a phase shifter of the N-th branch as the search object, and the second code sequence F2 (S23-4).

The wireless communication device 2000 transmits respectively a first and second transmission beams in accordance with the setting value, to the sensor 10B, M number of times (S23-5). The sensor 10B calculates a correlation value between a first transmission beam and a second reception signal and the code sequences held by respective correlators C1 to CN, in the correlators C1 to CN, and coherently adds respective correlation values that are calculated for each transmission beam transmitted M number of times (S23-6). Thereafter, it is followed by step S21.

In a case where it is determined that searches of parameters of the phases in the phase shifters of all branches of the wireless communication device 2000 are ended (S24, YES), the search continuation determination section 1500 transmits the parameter of the phase in the phase shifter of the last branch as the search object to the transmission section TX (S25). Thus, the operations of the wireless communication device 2000 and the sensor 10B of the present embodiment are ended.

In a case where it is determined that a search of parameter of the phase in the phase shifter of all branches of the wireless communication device 2000 is not ended (S24, NO), the search continuation determination section 1500 transmits a search instruction of the parameter of the phase in the phase shifter of the subsequent branch which is not searched to the transmission section TX (S26).

The wireless communication device 2000, on a basis of a search instruction that is transmitted from the sensor 10B, sets, as a setting value of a first transmission beam $BM_{k1}$, a parameter having a fixed value of a phase in a phase shifter of each branch which is not the search object or for which searching is already finished, a parameter as a first candidate value of a phase in a phase shifter of a branch as the subsequent search object, and a first code sequence F1 (S27). The wireless communication device 2000 transmits the first transmission beam $BMk_1$ in accordance with the setting value to the sensor 10B (S28). The sensor 10B calculates, in the correlators C1 to CN, the correlation value between the reception signal of the first transmission beam $BM_{k1}$ and the code sequence held by each of the correlators C1 to CN (S29).

In a similar manner, after transmission of step S28, the wireless communication device 2000 sets, as a setting value of a second transmission beam $BM_{k2}$, a parameter having a fixed value of a phase in a phase shifter of each branch which is not the search object or for which searching is already finished, a parameter as a second candidate value of a phase in a phase shifter of the N-th branch as the search object, and the second code sequence F2 (S30). The wireless communication device 2000 transmits the transmission beam $BM_{k2}$ of the second code sequence F2 in accordance with the setting value to the sensor 10B (S31). The sensor 10B calculates, in the correlators C1 to CN, the correlation value between the reception signal of the second transmission beam $BM_{k2}$ and the code sequence held by each of the correlators C1 to CN (S32).

The wireless communication device 2000 repeats the same processing and sets, as a setting value of a N-th transmission beam $BM_{kN}$, a parameter having a fixed value of a phase in a phase shifter of each branch which is not the search object or for which searching is already finished, a parameter as the N-th candidate value of a phase in a phase shifter of the N-th branch as the search object, and a N-th code sequence FN (S33). The wireless communication device 2000 transmits the N-th transmission beam $BM_{kN}$ in accordance with the setting value to the sensor 10B (S34). The sensor 10B calculates, in the correlators C1 to CN, the correlation value between the reception signal of the N-th transmission beam $BM_{kN}$ and the code sequence held by each of the correlators C1 to CN (S35). Since the processing following step S35 is the same as step S20, description thereof will be omitted. However, in the description of step S27 to step S35, k is in the range of 1 to (n−1).

The wireless communication device 2000 of the present embodiment successively transmits N number of times the transmission beams based on the candidate values of parameters of N phases in a phase shifter of the branch as the search object. The sensor 10B does not determine the optimal value of the parameter of the phase in the phase shifter of the branch as the search object each time a transmission beam transmitted by the wireless communication device 2000 is received. The sensor 10B determines the optimal value of the parameter of the phase in the phase shifter of a branch as the search object, on a basis of the coherent addition value of the correlation values of the transmission beam that is successively transmitted N number of times.

Thus, the wireless communication device 2000 of the present embodiment can transmit a transmission beam for searching for an optimal value of a phase parameter given by the phase shifter of each branch. In addition, the sensor 10B of the present embodiment can determine (search) the optimal value of the parameter of the phase given by the phase shifter of each branch of a wireless communication device, in a short time.

<Modification Example of Fourth Embodiment>

In the fourth embodiment, respective different "code sequences" are used as setting values of N transmission beams in the phase shifter of the branch as the search object. In the modification example of the fourth embodiment, "the transmission interval" of one code sequence (for example, code sequence F1) is used as a setting value of N transmission beams in the phase shifter of the branch as the search object. Therefore, the number of correlators in the sensor is one.

In addition, in the modification example of the fourth embodiment, since the configuration of the wireless communication device is the same as the configuration of the wireless communication device 2000 of the fourth embodiment, the same reference numerals as the fourth embodiment are used in the description of the present modification example.

(Wireless Communication Device 2000)

In the modification example, the code sequence selection section 2700 may store one code sequence (for example, code sequence F1). That is, the code sequence selection section 2700 does not select code sequences of a transmission beam as a radiation object, among a plurality of code sequences, as the second embodiment. The code sequence selection section 2700 selects a code sequence while changing a timing (selection interval) in which one code sequence (for example, code sequence F1) is selected in accordance with the transmission beam as the radiation object.

(Sensor 10C)

Figure 22:
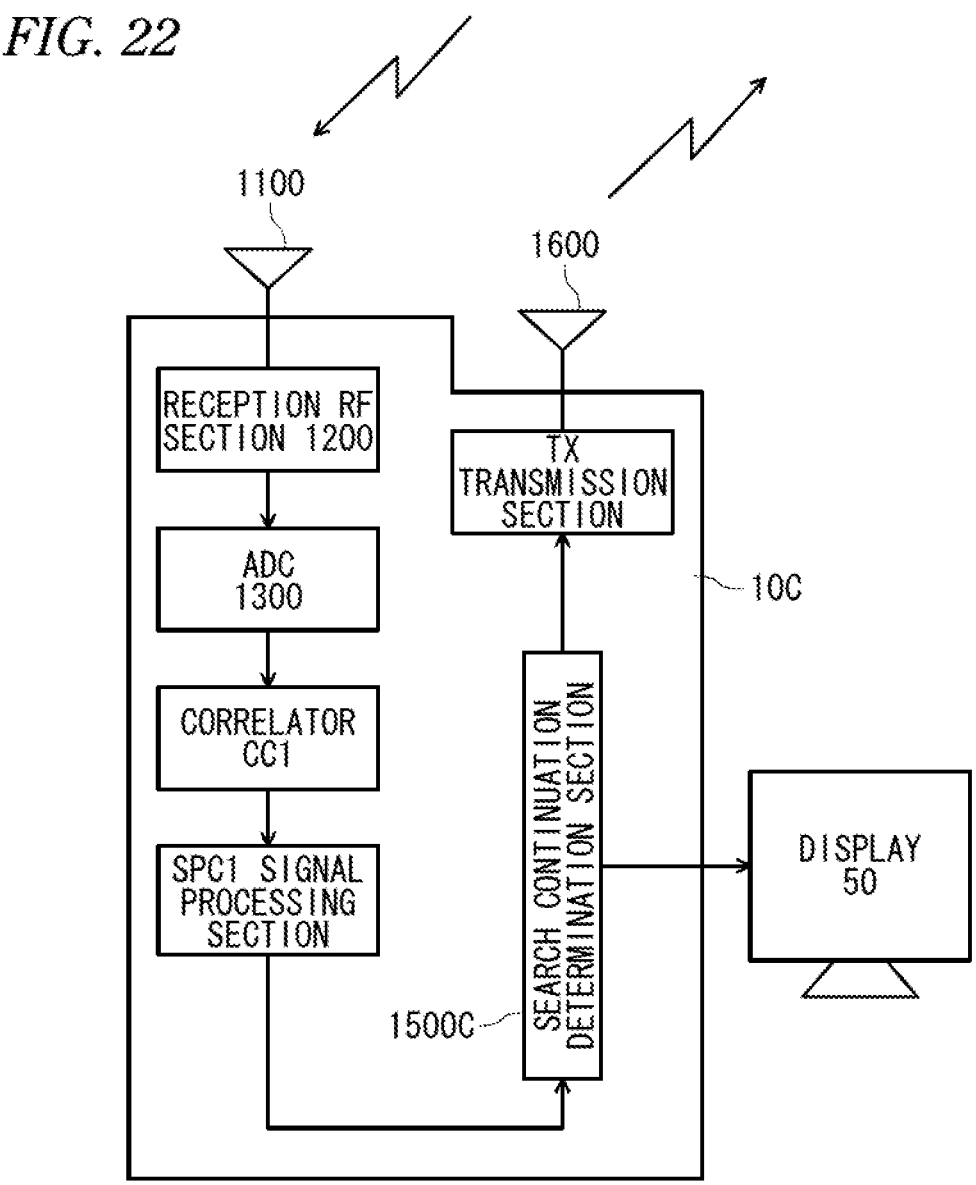
FIG. 22 is a block diagram illustrating an internal configuration of a sensor in a modification example of the fourth embodiment.

FIG. 22 is a block diagram illustrating an internal configuration of a sensor 10C in a modification example of the fourth embodiment. In the sensor 10C illustrated in FIG. 14, the same reference numerals are given to the configuring components corresponding to the sensor 10B of the fourth embodiment, and thus the description thereof is omitted.

The sensor 10C illustrated in FIG. 22 has a configuration that includes a reception antenna 1100, a reception RF section 1200, an ADC 1300, a correlator CC1, a signal processing section SPC1, a search continuation determination section 1500C, a transmission antenna 16, and a transmission section TX. In addition, for example, a display 50 which displays a determination result as to whether or not the determination result is an optimal value of a phase parameter may be connected to the sensor 10C.

The correlator CC1 holds a code sequence of a transmission beam of the index 1 and calculates a correlation value by performing a predetermined correlation processing on a digital reception signal which is output from the ADC 1300. Specifically, the correlator CC1 calculates a correlation value between a code sequence that the correlator CC1 itself holds and a reception signal and obtains a sufficient correlation value, that is, a peak correlation value, in a case where the transmission beam of the same code sequence as the code sequence that the correlator CC1 holds is input as a reception signal. The correlator CC1 outputs the calculated correlation value, that is, a peak correlation value or a non-peak correlation value to the signal processing section SPC1.

The signal processing section SPC1 detects an interval in which a peak value of a correlation value calculated by the correlator CC1 appears, that is, the interval between the peak correlation value corresponding to the transmission beam that is received at the previous time and the peak correlation value corresponding to the transmission beam that is received at this time and determines that a transmission beam of which index is received.

The signal processing section SPC1 compares the correlation value which is output from the correlator CC1 with a predetermined threshold value and determines whether the correlation value exceeds the predetermined threshold value. The signal processing section SPC1 processes the operations of the signal processing section (for example, signal processing section SP1) and threshold value determination section (for example, threshold value determination section TJ1) of the sensor 10B illustrated in FIG. 19. The signal processing section SPC1 outputs a comparison result to the search continuation determination section 15C.

In a case where the correlation value exceeds a predetermined threshold value, the search continuation determination section 1500C estimates parameter of a phase corresponding to the transmission beam determined by the signal processing section SPC1 as the parameter of the phase in the phase shifter of a branch as the search object.

The transmission section TX transmits a determination result of the search continuation determination section 1500C from the transmission antenna 16 to the wireless communication device 2000. The transmission section TX transmits, for example, a search instruction of parameter of the phase in the phase shifter of a branch as the search object or parameter of the phase in the phase shifter of the branch as the subsequent search object to the wireless communication device 2000.

(Table of Candidate Values of Parameter of a Phase)

FIG. 23 is a table illustrating an example of a phase parameter in a phase shifter of each branch which is given to a transmission beam of each index in a modification example of the fourth embodiment. The branches B1, B2, B3, and B4 illustrated in FIG. 23 correspond to the branches 20A, 20B, 20C, and 20D illustrated in FIG. 11, respectively. In addition, it is preferable that the candidate values of parameters in the table illustrated in FIG. 23 be stored in advance, for example, in the storage area (not illustrated) of the control section 2600.

In the modification example, the code sequence used for each transmission beam is determined in advance, and is for example, the code sequence F1, but in a similar way with the fourth embodiment, the parameter of the phase shifter of each branch is not set to an optimal value. Accordingly, in the modification example, the sensor 10C illustrated in FIG. 22 determines the optimal value of parameter of the phase in the phase shifter of each branch of the wireless communication device 2000 on a basis of a correlation value between a code sequence of a transmission beam and a reception signal.

In addition, in the table illustrated in FIG. 23, for the parameters of respective phase shifters of the branches B1, B2, and B3 (branches 20A, 20B, and 20C), "100", "110", "120" are searched as optimal values or temporarily set without being searched, and the optimal value of the parameter of the phase shifter of the branch B4 (branch 20D) is not searched.

In order to determine optimal values of parameter of the phase in the phase shifter of the branch B4, the wireless communication device 2000 changes a transmission interval for each transmission beam and transmits a pulse compression signal of each code sequence, in which parameter of a phase as candidate values is set. That is, as the candidate values of the parameter of a phase and the transmission interval in the phase shifter of the branch B4, "100" and "L1" are allocated to the transmission beam BM1 of the index 1, "120" and "L2" are allocated to the transmission beam BM2 of the index 2, "130" and "L3" are allocated to the transmission beam BM3 of the index 3, . . . , in a similar manner, and "180" and "LN" are allocated to the transmission beam BMN of the index N.

(Search Method of Parameter of Phase in the Phase Shifter of Each Branch)

Figure 24:
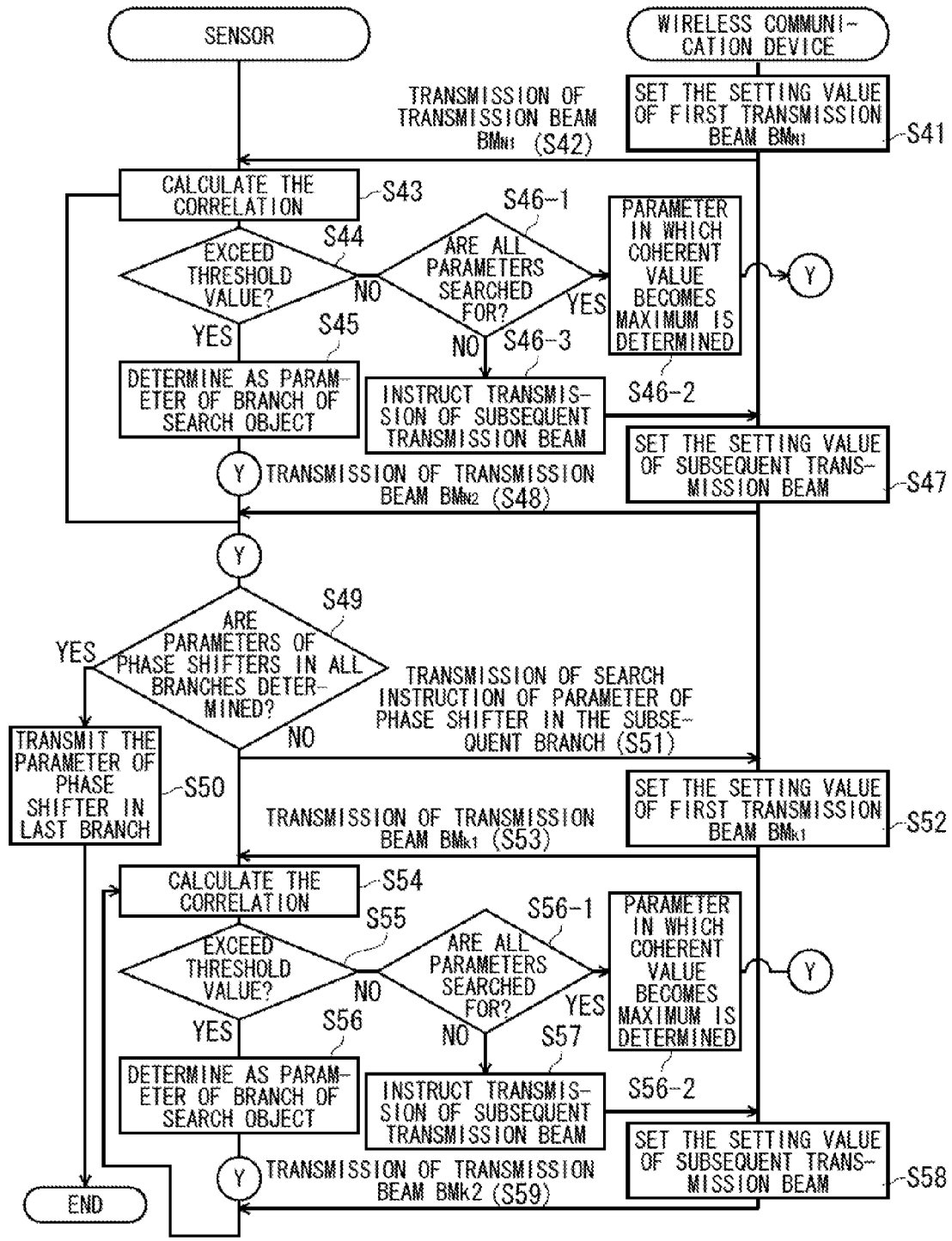
FIG. 24 is a sequence diagram illustrating operations of the wireless communication device and the sensor in a modification example of the fourth embodiment.

A search method of a phase parameter in a phase shifter of each branch of the present modification example will be described with reference to FIG. 24. FIG. 24 is a sequence diagram illustrating operations of the wireless communication device 2000 and the sensors 10C in a modification example of the fourth embodiment. In the description of FIG. 24, the number of branches to be the search object is assumed as N and the parameter of the phase in the phase shifter of the N-th branch is the first search object.

The wireless communication device 2000 sets, as a setting value of the first transmission beam $BM_{N1}$, a parameter having a fixed value of a phase in a phase shifter of each of the first to (N−1)-th branches which are not the search object, a parameter as a first candidate value of a phase in a phase shifter of the N-th branch as the search object, and a transmission interval L1 of a first transmission beam (S41). The wireless communication device 2000 transmits the first transmission beam $BM_{N1}$ in accordance with the setting value to the sensor 10C (S42). The sensor 10C calculates, in the correlators CC1, the correlation value between the reception signal of the first transmission beam $BM_{N1}$ and the code sequence held by the correlator CC1 (S43).

The correlator CC1 outputs the correlation value calculated in step S43 to the signal processing section SPC1. The signal processing section SPC1 compares the correlation value which is output from the correlator CC1 with a predetermined threshold value and determines whether or not the correlation value exceeds the predetermined threshold value (S44). The signal processing section SPC1 outputs the comparison result to the search continuation determination section 1500C.

In a case where the correlation value exceeds the predetermined threshold value (S44, YES), the search continuation determination section 1500C determines the parameter of the phase corresponding to the transmission beam determined by the signal processing section SPC1 as the parameter of the phase in the phase shifter of the branch as the search object (S45).

In a case where the correlation value does not exceed the predetermined threshold value (S44, NO), the search continuation determination section 1500C determines whether or not an optimal value of a phase parameter is searched by using the parameters of all phases, that is, by using values obtained by setting values of 100 to 200 in a 10-step unit (S46-1). In a case where the search is performed by using the parameters of all phases (S46-1, YES), the search continuation determination section 1500C determines a phase parameter given to the transmission beam corresponding to a maximum correlation value as the parameter of the phase in the phase shifter of the branch as the search object (S46-2). Thereafter, it is followed by step S49.

In a case where the search is not performed by using the parameters of all phases (S46-1, NO), the search continuation determination section 1500C transmits a transmission instruction of a transmission beam in which the parameter of the subsequent phase in the phase shifter of the branch as the search object is set (S46-3). In addition, in a case where values of "100" to "180" are already set in a 10-step unit as the parameters of phases in step S46-3, "190" is set by further increasing the parameter of the phase by a 10-step unit, and "200" is set as a maximum value.

The wireless communication device 2000 sets, as a setting value of the second transmission beam $BM_{N2}$, a parameter having a fixed value of a phase in a phase shifter of each of the first to (N−1)-th branches which are not the search object, a parameter as a second candidate value of a phase in a phase shifter of the N-th branch as the search object, and a transmission interval L2 of a second transmission beam (S47). The wireless communication device 2000 transmits the second transmission beam $BM_{N2}$ in accordance with the setting value to the sensor 10C (S48). The sensor 10C calculates, in the correlators CC1, the correlation value between the reception signal of the second transmission beam $BM_{N2}$ and the code sequence held by the correlator CC1 (S43).

In this manner, until it is determined that the correlation value exceeds a predetermined threshold value in step S44, the wireless communication device 2000 continuously transmits the transmission beam in which the parameter of the phase in the phase shifter of the N-th branch as the search object and the transmission interval are changed.

After the parameter of the phase in the phase shifter of the branch as the search object is determined in step S45, the search continuation determination section 1500C of the sensor 10C determines whether or not searches of parameters of phases in the phase shifters of all branches of the wireless communication device 2000 are ended (S49).

In a case where it is determined that the searches of parameters of phases in the phase shifters of all branches of the wireless communication device 2000 are ended (S49, YES), the search continuation determination section 1500C transmits the parameter of the phase in the phase shifter of the last branch as the search object to the transmission section TX (S50). Thus, the operations of the wireless communication device 2000 and the sensor 10C of the present embodiment are ended.

In a case where it is determined that the searches of parameters of phases in the phase shifters of all branches of the wireless communication device 2000 are not ended (S49, NO), the search continuation determination section 1500C transmits a search instruction of the parameter of the phase in the phase shifter of the subsequent branch which is not searched to the transmission section TX (S51).

The wireless communication device 2000, on a basis of a search instruction that is transmitted from the sensor 10C, sets, as a setting value of a first transmission beam $BM_{k1}$, a parameter having a fixed value of a phase in a phase shifter of each branch which is not the search object or for which searching is already finished, a parameter as a first candidate value of the phase in the phase shifter of the branch as the subsequent search object, and a first transmission interval L1 of a first transmission beam (S52). The wireless communication device 2000 transmits the first transmission beam $BM_{k1}$ in accordance with the setting value to the sensor 10C (S53). The sensor 10C calculates, in the correlator CC1, the correlation value between the reception signal of the first transmission beam $BM_{k1}$ and the code sequence held by the correlator CC1 (S54).

The correlator CC1 outputs the correlation value calculated in step S53 to the signal processing section SPC1. The signal processing section SPC1 compares the correlation value which is output from the correlator CC1 with a predetermined threshold value and determines whether or not the correlation value exceeds the predetermined threshold value (S55). The signal processing section SPC1 outputs the comparison result to the search continuation determination section 1500C.

In a case where the correlation value exceeds the predetermined threshold value (S55, YES), the search continuation determination section 1500C determines the parameter of the phase corresponding to the transmission beam determined by the signal processing section SPC1 as the parameter of the phase in the phase shifter of the branch as the search object (S56).

In a case where the correlation value does not exceed the predetermined threshold value (S55, NO), the search continuation determination section 1500C determines whether or not an optimal value of a phase parameter is searched by using the parameters of all phases, that is, by using values obtained by setting values of 100 to 200 in a 10-step unit (S56-1). In a case where the search is performed by using the parameters of all phases (S56-1, YES), the search continuation determination section 1500C determines a phase parameter given to the transmission beam corresponding to a maximum correlation value as the parameter of the phase in the phase shifter of the branch as the search object (S56-2). Thereafter, it is followed by step S49.

In a case where the search is not performed by using the parameters of all phases (S56-1, NO), the search continuation determination section 1500C transmits a transmission instruction of a transmission beam in which the parameter of the subsequent phase in the phase shifter of the branch as the search object is set (S57). In addition, in a case where values of "100" to "180" are already set in a 10-step unit as the parameters of phases in step S57, "190" is set by further increasing the parameter of the phase by a 10-step unit, and "200" is set as a maximum value.

The wireless communication device 2000 sets, as a setting value of the second transmission beam $BM_{N2}$, a parameter having a fixed value of a phase in a phase shifter of each branch which is not the search object or for which searching is already finished, a parameter as a second candidate value of the phase in the phase shifter of the branch as the present search object and the transmission interval L2 of the second transmission beam (S58). The wireless communication device 2000 transmits the second transmission beam $BM_{N2}$ in accordance with the setting value to the sensor 10C (S59). The sensor 10C calculates, in the correlator CC1, the correlation value between the reception signal of the second transmission beam $BM_{N2}$ and the code sequence held by the correlator CC1 (S54).

In this manner, until it is determined that the correlation value exceeds a predetermined threshold value in step S55, the wireless communication device 2000 continuously transmits the transmission beam in which the parameter of the phase in the phase shifter of the branch as the search object and the transmission interval are changed.

The wireless communication device 2000 of the present embodiment transmits the transmission beams based on the candidate values of parameters of N phases in a phase shifter of the branch as the search object, while changing a transmission interval for each transmission beam. The sensor 10C determines the optimal value of the parameter of the phase in the phase shifter of the branch as the search object, on a basis of the correlation value of each transmission beam that is transmitted over the transmission interval of each transmission beam.

Thus, the wireless communication device 2000 of the present embodiment can transmit a transmission beam for searching for an optimal value of a phase parameter given by the phase shifter of each branch. In addition, the sensor 10C of the present embodiment can determine (search) the optimal value of the parameter of the phase given by the phase shifter of each branch of the wireless communication device.

Further, the wireless communication device according to the present disclosure has the following configuration.

The present disclosure relates to a wireless communication device including a plurality of antenna system processing sections, in which each of the antenna system processing sections including:

a code sequence selection section that selects a code sequence of a transmission signal, a pulse compression signal generation section that performs a pulse compression processing on the selected code sequence, a phase shifter that adjusts the phase of the signal subjected to the pulse compression processing in accordance with the selected code sequence, and a transmission RF section that converts the signal, of which phase is adjusted, to a high frequency signal and transmits the high frequency signal from a transmission antenna.

Further, the present disclosure relates to the above described wireless communication device, in which each of the antenna system processing sections further including:

a control section causes the phase shifter to adjust a parameter of the phase in accordance with the selected code sequence.

Further, the present disclosure relates to the above described wireless communication device, in which the code sequence selection section successively selects a same code sequence a predetermined number of times and, after the aforesaid selection, successively selects a same code sequence which is different from the aforesaid code sequence a predetermined number of times.

Further, the present disclosure relates to the above described wireless communication device, in which the code sequence selection section sequentially selects all different code sequences, and after the selection, repeatedly selects the all different code sequences.

Further, the present disclosure relates to the above described wireless communication device, in which the code sequence selection section sets a different selection interval for each code sequence and successively selects a same code sequence a predetermined number of times.

Next, a description will be given of a distance measurement system, a sensor device, and a wireless communication device, which measure a distance with a wireless communication device.

A radar device has been known as a device capable of distance measurement. The radar device radiates a radio wave and receives a radio wave reflected by the detection target, that is, the reflected wave. The radar device receives a radio wave which travels back and forth linearly between the radar device itself and the detection target and measures a distance between the radar device and the detection target on a basis of a time difference between a time when the radio wave is received and a time when the reflected wave is received.

For example, PTL 2 below discloses a so-called one way distance measurement technology which measures a distance between a target and a measurement station on a basis of reception of a radio wave (direct wave) radiated in one direction without using the reflected wave. In PTL 2, a transmission device is provided in a flying object (for example, an aircraft, a rocket, and a radiosonde) of a distance measurement target, and a distance measurement device is disposed in a measurement station on the ground. For example, the transmission device periodically transmits a radio wave including the distance measurement pulse. The distance measurement device generates a reference pulse for distance measurement and calculates a distance between the transmission device and the distance measurement device, on a basis of a time difference between the distance measurement pulse from the transmission device and the reference pulse for distance measurement.

In the on way distance measurement method, since the transmission device and the distance measurement device operate independently of each other, it is necessary to adjust the operation timing before starting the distance measurement. In PTL 2, the distance measurement is performed at a point in which a flying distance is zero before a flying object is launched, a time difference between a distance measurement reference pulse and a received pulse received by the distance measurement device is obtained, and the time difference is stored in the distance measurement calculation section in advance.

[PTL 2] JP-A-7-234272

Problems in the Related Art

However, in the one way distance measurement method illustrated in above described PTL 2, it is necessary to synchronize an operation timing of transmission and reception of a signal between the transmission device (wireless communication device) and the distance measurement device (sensor device) before starting the distance measurement.

For example, synchronizing the operation timing between the wireless communication device and the sensor device by connecting the wireless communication device and the sensor device using a cable in a wired manner is considered as a synchronization method of an operation timing. However, a synchronization processing of the operation timing becomes complicated, and thus it is difficult to simply perform the synchronization processing.

Otherwise, it is considered that the wireless communication device and the sensor device perform wireless communication without being connected in a wired manner, and thus the operation timing between the wireless communication device and the sensor device is synchronized. However, since the distance between the wireless communication device and the sensor device is not constant in the wireless communication, a synchronization processing of the operation timing becomes complicated, and thus it is difficult to simply perform the synchronization processing.

In order to solve the above described problems in the related art, an object of the present disclosure is to provide a distance measurement system, a sensor device, and a wireless communication device, which simply measure a distance between the wireless communication device and the sensor device without informing in advance a sensor device of transmission timings of a signal from a wireless communication device.

Solution to Problems

The present disclosure relates to a distance measurement system which includes: a wireless communication device configured to transmit a wireless signal and a sensor device configured to measure a distance with the wireless communication device on a basis of the transmitted wireless signal, the wireless communication device including a terminal control section configured to switch the operation mode of the wireless communication device to a terminal normal mode of transmitting and receiving the wireless signal or to a continuous transmission mode of periodically transmitting the distance measurement pulse signal and the sensor device including a sensor control section configured to switch the operation mode of the sensor device to a sensor normal mode of transmitting and receiving a wireless signal or to a shortest distance estimation mode of estimating a time difference parameter between transmission timings and reception timings of the wireless signal on a basis of a wireless signal transmitted from the wireless communication device; a terminal-side mode control section configured to switch the operation mode of the wireless communication device from the terminal normal mode to the continuous transmission mode in a case where the wireless communication device receives a wireless signal having signal power of a first threshold value or more; and a sensor-side mode control section configured to switch the operation mode of the sensor device from the sensor normal mode to the shortest distance estimation mode in a case where the sensor device receives a wireless signal having signal power of a second threshold value or more.

Further, the present disclosure relates to a wireless communication device configured to transmit a wireless signal which includes a pulse compression signal generation section configured to periodically generate a pulse compression signal using a known code sequence suitable for correlation detection and a terminal control section configured to switch the operation mode of the wireless communication device to a terminal normal mode of transmitting and receiving the wireless signal or a continuous transmission mode of transmitting the pulse compression signal as a distance measurement pulse signal, the terminal control section switching the operation mode of the wireless communication device from the terminal normal mode to the continuous transmission mode in a case where the wireless communication device receives a wireless signal having signal power of a first threshold value or more.

Further, the present disclosure relates to a sensor device configured to measure a distance with a wireless communication device on a basis of reception timings when a wireless signal transmitted from the wireless communication device is received and which includes: a sensor reception section configured to receive the wireless signal transmitted from the wireless communication device; a sensor control section configured to switch the operation mode of the sensor device to a sensor normal mode of receiving a wireless signal or to a shortest distance estimation mode of estimating a time difference parameter between transmission timings and reception timings of the wireless signal on a basis of a wireless signal transmitted from the wireless communication device; and a sensor-side mode control section configured to switch the operation mode of the sensor device from the sensor normal mode to the shortest distance estimation mode in a case where a sensor-side reception section receives a wireless signal having signal power of a second threshold value or more.

Advantageous Effects of Invention

According to the present disclosure, it is possible to easily measure the distance between the wireless communication device and the sensor device without informing a sensor device of transmission timings of a signal from the wireless communication device in advance.

<Fifth Embodiment>

Hereinafter, a fifth embodiment of a distance measurement system, a sensor device, and a wireless communication device will be described with reference to drawings. The distance measurement system of the present embodiment is configured using a sensor device and a wireless communication device and can measure a distance between the wireless communication device and the sensor device in the sensor device. The distance measurement technology using the distance measurement system of the present embodiment is widely available in everyday life.

For example, inside a museum building, by implementing the sensor device in an entrance gate, if a visitor carrying the wireless communication device passes through the gate, it is possible to establish synchronization with the wireless communication device. Further, by implementing the sensor device at each exhibition, the sensor device can detect whether the visitor who owns the synchronized wireless communication device (for example, a mobile phone) approaches an exhibition and offer a special service (transmission of contents relevant to the exhibition) to the wireless communication device for the person who approaches the exhibition.

Further, for example, the sensor devices could be implemented in off-limits areas of railway station premises, detect whether a person carrying the wireless communication device (for example, mobile phone) approaches the off-limits areas, and cause the wireless communication device to output a warning sound to the person who approaches the off-limits areas.

Further, by implementing the sensor device in a ticket gate of a station, if a passenger who owns the wireless communication device passes through the ticket gate, the sensor device can establish synchronization. Because of this, a processing of synchronization establishment of the wireless communication device and a processing of using the wireless communication device as a ticket or a season ticket can be completed while the passenger passes through the ticket gate.

<Configuration of Distance Measurement System>
<Outline of Entire Distance Measurement System>

Figure 35:
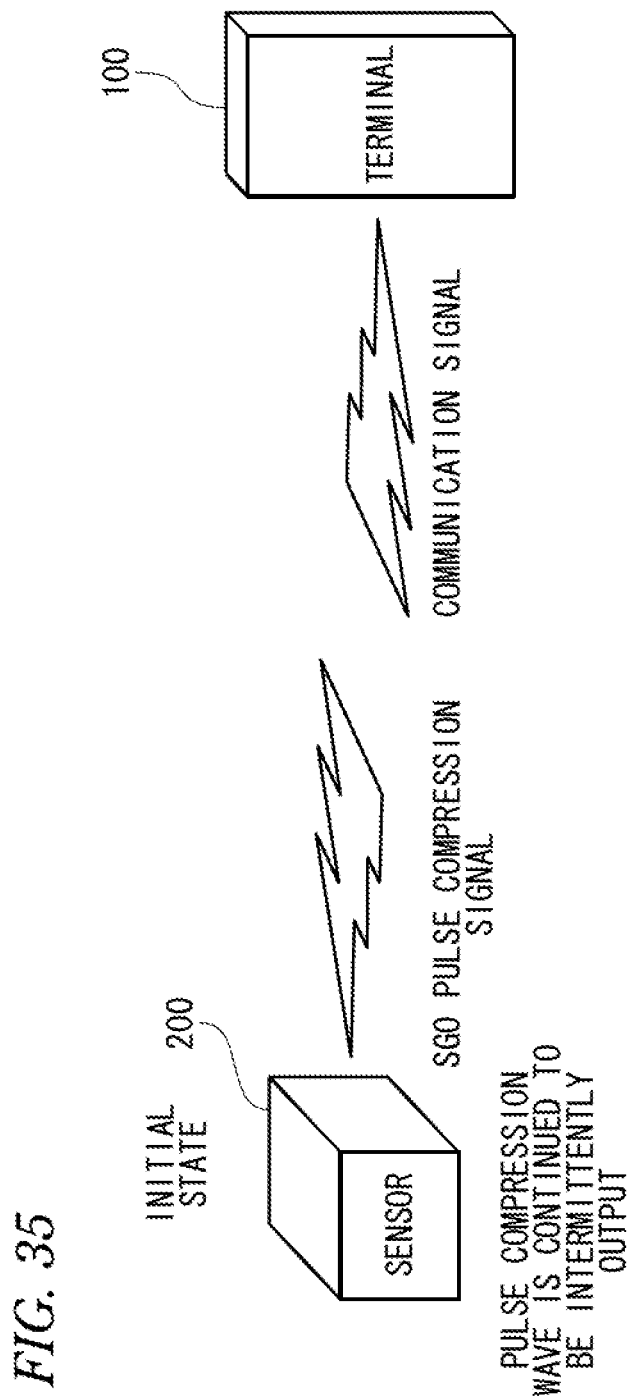
FIG. 35 is a schematic diagram conceptually illustrating an initial state of the distance measurement system.

The distance measurement system 1000 of the present embodiment includes, for example, a wireless communication device (terminal) 100 and a sensor device 200, illustrated in FIG. 35. FIG. 35 is a schematic diagram conceptually illustrating an initial state of the distance measurement system.

The wireless communication device 100 is a portable wireless device (for example, a mobile phone) capable of transmitting and receiving a wireless signal. For example, the wireless communication device 100 is a wireless terminal capable of transmitting and receiving a wireless signal in accordance with a Wireless Gigabit (WiGig) specification.

The sensor device 200 measures a distance between the wireless communication device 100 and the sensor device 200 itself by using a wireless signal. That is, the sensor device 200 measures a distance between the wireless communication device 100 and the sensor device 200 on a basis of a time difference from when the wireless communication device 100 transmits a wireless signal until when the sensor device 200 receives the wireless signal. However, since the wireless communication device 100 and the sensor device 200 operate independently of each other, it is necessary to adjust operation timings of the wireless communication device 100 and the sensor device 200 before detecting a time difference until the sensor device 200 receives a wireless signal from the wireless communication device 100.

<Configuration of Wireless Communication Device 100>

Figure 25:
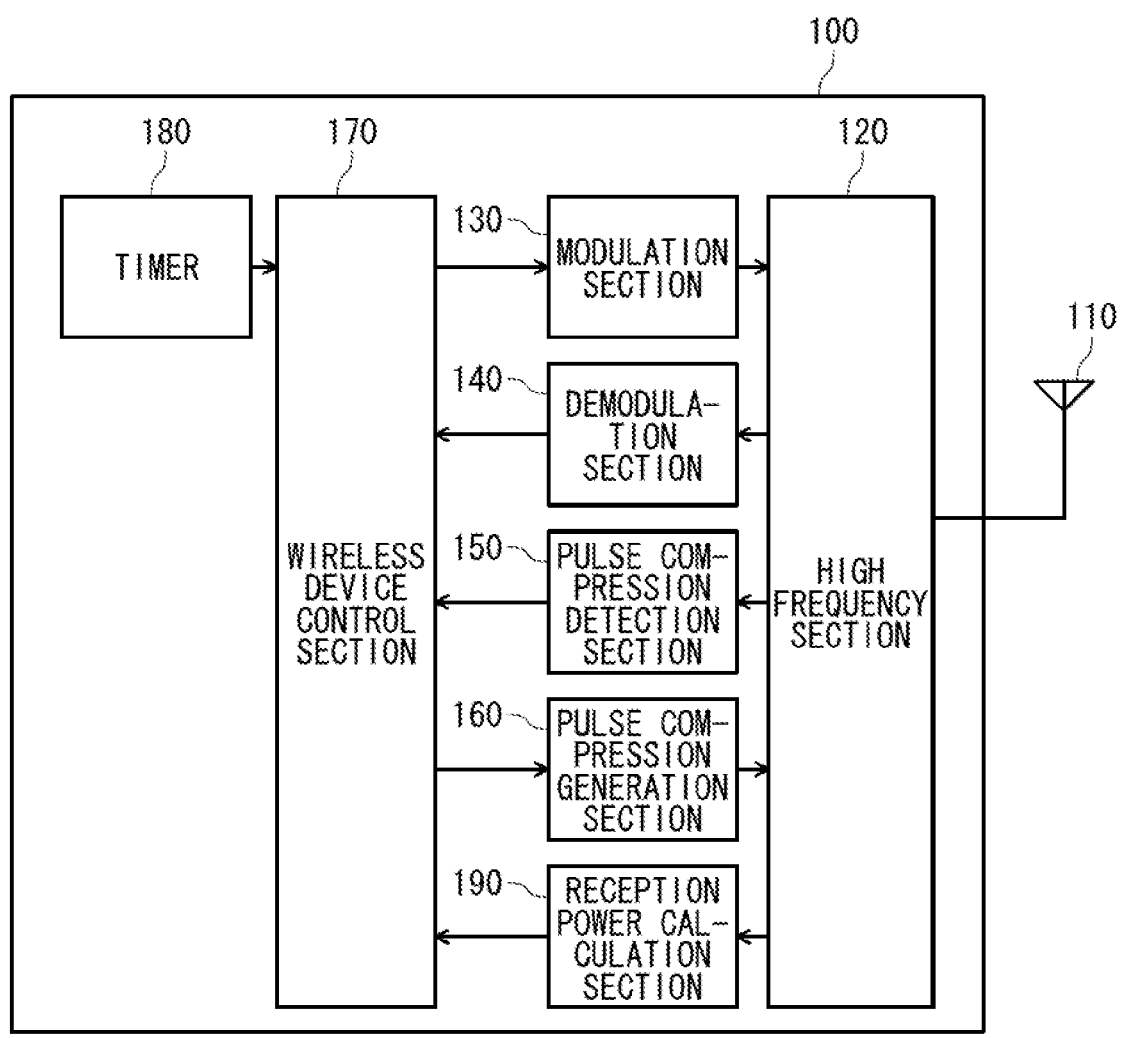
FIG. 25 is a block diagram illustrating a configuration example of a wireless communication device of a fifth embodiment.

FIG. 25 is a block diagram illustrating a configuration example of a wireless communication device 100. The wireless communication device 100 illustrated in FIG. 25 includes an antenna 110, a high frequency section 120, a modulation section 130, a demodulation section 140, a pulse compression detection section 150, a pulse compression generation section 160, a wireless device control section 170 as a terminal control section, a timer 180, and a reception power calculation section 190.

The wireless communication device 100 transmits and receives a wireless signal. That is, the data that is to be transmitted by the wireless communication device 100 is input from the wireless device control section 170 to the modulation section 130, modulated in the modulation section 130, and converted into an analog signal by a DAC (not illustrated, Digital Analog Converter) provided between the modulation section 130 and the high frequency section 120. The data converted into the analog signal is input to the high frequency section 120, converted into a high frequency signal, and amplified in the high frequency section 120, and then transmitted as a radio wave from the antenna 110. The frequency band of the high frequency signal is, for example, 60 GHz band, and the frequency band used in the sensor device 200 is the same.

Further, a radio wave not illustrated is transmitted from another wireless station, is received in the antenna 110, and is input to the high frequency section 120 as a reception signal. The reception signal of a high frequency, which is input to the high frequency section 120, is amplified and converted into a baseband signal in the high frequency section 120, and then converted into a digital signal by an ADC (not illustrated, Analog Digital Converter) provided between the high frequency section 120 and the demodulation section 140. The reception signal converted into a digital signal is input to and demodulated in the demodulation section 140 and input to the wireless device control section 170 as reception data.

The pulse compression detection section 150 and the pulse compression generation section 160 are provided in order for the sensor device 200 to measure a distance between the wireless communication device 100 and the sensor device 200. The pulse compression detection section 150 detects a distance measurement pulse signal (pulse compression signal) transmitted from the sensor device 200. The pulse compression generation section 160 generates the distance measurement pulse signal capable of being transmitted by the wireless communication device 100.

The distance measurement pulse signal detected by the pulse compression detection section 150 and the distance measurement pulse signal generated by the pulse compression generation section 160 are the following signals. That is, the distance measurement pulse signal is a pulse-shaped signal recurring periodically in a fixed period and a signal suitable for correlation detection. The distance measurement pulse signal is a signal modulated using a predetermined and known code sequence in the wireless communication device 100 and the sensor device 200. Although, for example, Golay code is used as a specific example of the code sequence, the code sequence is not limited to the Golay code.

Code sequences different from each other are used for the distance measurement pulse signal transmitted by the sensor device 200 and the distance measurement pulse signal generated by the pulse compression generation section 160 of the wireless communication device 100. Accordingly, the wireless communication device 100 or the sensor device 200 determines the code sequence of the distance measurement pulse signal, thereby distinguishing a plurality of kinds of distance measurement pulse signals. The pulse compression detection section 150 includes a correlator for detecting the code sequence of the distance measurement pulse signal.

The wireless device control section 170 generally controls the operation of the wireless communication device 100. For example, the wireless device control section 170 switches a plurality of predetermined operation modes in accordance with a communication state with the sensor device 200. The switching of the operation modes will be described in detail.

The timer 180 is used for time measurement. The reception power calculation section 190 monitors the output signal of the high frequency section 120 and calculates the size of signal power of radio waves received by the antenna 110 from another station (for example, sensor device 200).

<Configuration of Sensor Device 200>

Figure 26:
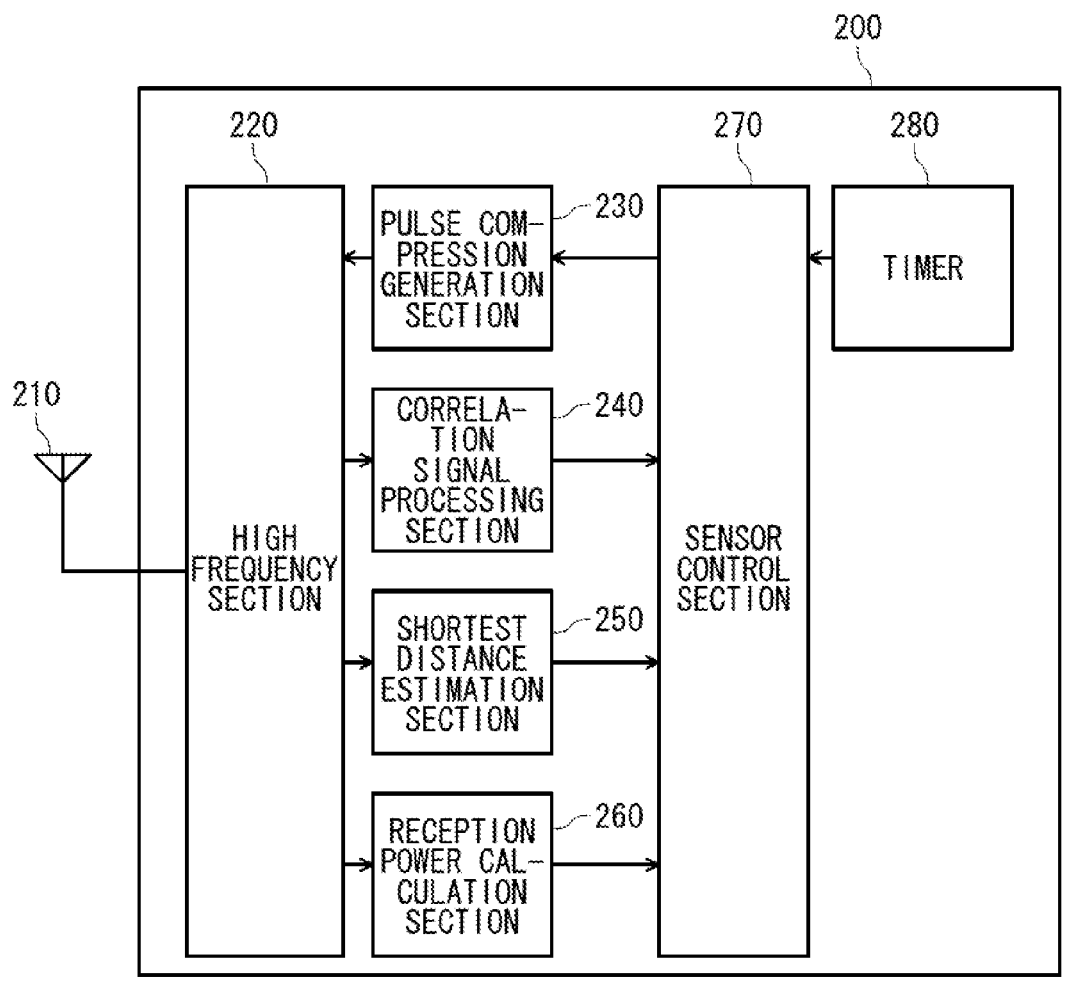
FIG. 26 is a block diagram illustrating a configuration example of a sensor device of the fifth embodiment.

FIG. 26 is a block diagram illustrating a configuration example of a sensor device 200. The sensor device illustrated in FIG. 26 includes an antenna 210 as a sensor reception section, a high frequency section 220, a pulse compression generation section 230, a correlation signal processing section 240 as a correlation detection section, a shortest distance estimation section 250, a reception power calculation section 260, a sensor control section 270, and a timer 280.

The pulse compression generation section 230 generates the above described distance measurement pulse signal (pulse compression signal). The distance measurement pulse signal generated by the pulse compression generation section 230 is converted into an analog signal by a DAC (not illustrated) provided between the pulse compression generation section 230 and the high frequency section 220. Data converted into the analog signal is input to the high frequency section 220, converted into a high frequency signal and amplified in the high frequency section 220, and then transmitted as a radio wave from the antenna 210.

On the other hand, a radio wave transmitted from another station (for example, wireless communication device 100) is received in the antenna 210 and is input to the high frequency section 220 as a reception signal. The reception signal of a high frequency, which is input to the high frequency section 220, is amplified and converted into a baseband signal in the high frequency section 220.

The correlation signal processing section 240 includes a correlator and obtains a peak correlation value as an output from the correlator at a timing in which a signal including a code sequence that matches the predetermined code sequence is received. Accordingly, in a case where a distance measurement pulse signal generated on a basis of the predetermined code sequence is received, the sensor device 200 can detect the reception timing of the distance measurement pulse signal on a basis of an output (peak correlation value) from the correlation signal processing section 240. Further, the correlation signal processing section 240 can detect a signal having a pulse width compressed compared to the pulse width of the distance measurement pulse signal transmitted from the wireless communication device 100 by the detection of the peak correlation value. That is, the correlation signal processing section 240 uses a pulse compression technology, thereby detecting timings in which each distance measurement pulse signal is received with high accuracy.

The shortest distance estimation section 250 estimates a shortest state of a distance between the wireless communication device 100 and the sensor device 200 and adjusts distance measurement timings on a basis of the estimation result. For measuring the distance, the shortest distance estimation section 250 measures a time difference between a timing in which the wireless communication device 100 transmits the distance measurement pulse signal and a timing in which the sensor device 200 receives the distance measurement pulse signal from the wireless communication device 100.

However, since the operation timing of the sensor device 200 is not synchronous with the operation timing of the wireless communication device 100, it is difficult for the sensor device 200 to understand the time difference between the operation timing of the wireless communication device 100 and the operation timing of the sensor device 200 in an initial state (see FIG. 35). The shortest distance estimation section 250 performs an estimation processing in order to understand the time difference between the operation timing of the wireless communication device 100 and the operation timing of the sensor device 200. Specific operations will be described below.

The reception power calculation section 260 monitors the output signal of the high frequency section 220 and calculates the size of signal power of a radio wave received by the antenna 210 from another station (for example, wireless communication device 100).

The sensor control section 270 generally controls the operation of the sensor device 200. For example, the sensor control section 270 switches a plurality of predetermined operation modes in accordance with a communication state with the wireless communication device 100. The switching of the operation modes will be described below. The timer 280 is used for time measurement.

<Distance Measurement Method>
<Transmission and Reception Timing of a Distance Measurement Pulse Signal>

Figure 27:
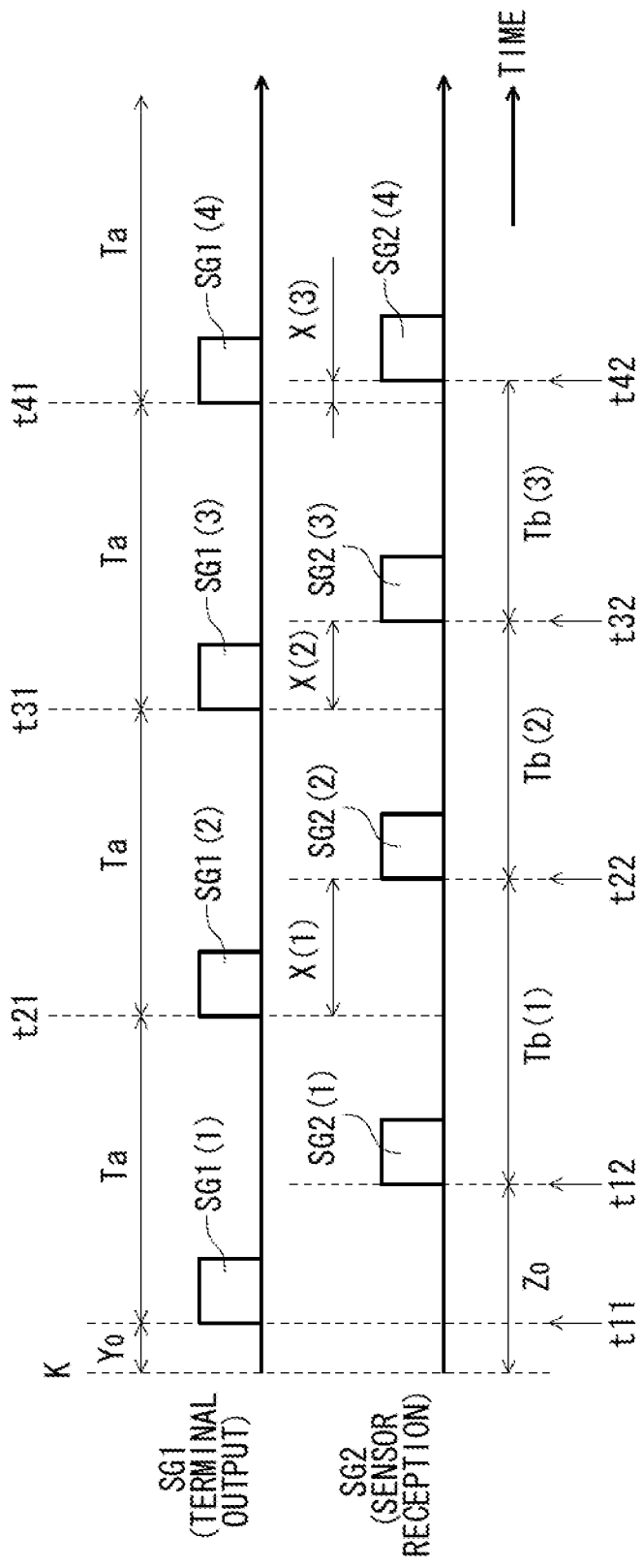
FIG. 27 is a time chart illustrating a specific example (1) of transmission timings and reception timings of a distance measurement pulse signal transmitted as a wireless signal from a wireless communication device.

FIG. 27 is a time chart illustrating a specific example (1) of transmission timings and reception timings of a distance measurement pulse signal transmitted as a wireless signal from a wireless communication device 100.

The distance measurement pulse signal SG1 illustrated in FIG. 27 denotes a wireless signal transmitted by the wireless communication device 100. The distance measurement pulse signal SG2 illustrated in FIG. 27 denotes the distance measurement pulse signal SG1 that the sensor device 200 actually receives. That is, since a time delay occurs in accordance with the distance between the wireless communication device 100 and the sensor device 200 until the distance measurement pulse signal SG1 reaches the sensor device 200 after the wireless communication device 100 transmits the distance measurement pulse signal SG1, a time difference occurs between the distance measurement pulse signals SG1 and SG2. Further, in an initial state of communication between the wireless communication device 100 and the sensor device 200, the operation timing of the wireless communication device 100 and the operation timing of the sensor device 200 are not synchronous with each other.

In FIG. 27, the distance measurement pulse signal SG1 is a signal in which distance measurement pulse signals SG1(1), SG1(2), SG1(3), . . . are repeatedly transmitted from the wireless communication device 100 at a constant time period Ta. The distance measurement pulse signal SG2(1) corresponds to the distance measurement pulse signal SG1(1), that is, a signal obtained when the sensor device 200 receives the distance measurement pulse signal SG1. In a similar manner, distance measurement pulse signals SG2(2), SG2(3), SG2(4), . . . respectively correspond to the distance measurement pulse signals SG1(2), SG1(3), SG1(4), . . . , in other words, the distance measurement pulse signals SG2(1), SG2(2), SG2(3), SG2(4), . . . are signals received in the sensor device 200.

Accordingly, the first distance measurement pulse signal SG1(1) transmitted from the wireless communication device 100 at time t11 is received as the distance measurement pulse signal SG2(1) by the sensor device 200 at time t12. In a similar manner, the second distance measurement pulse signal SG1(2) transmitted from the wireless communication device 100 at time t21 is received as the distance measurement pulse signal SG2(2) by the sensor device 200 at time t22. The third distance measurement pulse signal SG1(3) transmitted from the wireless communication device 100 at time t31 is received as the distance measurement pulse signal SG2(3) by the sensor device 200 at time t32.

In FIG. 27, a time difference between a second transmitted distance measurement pulse signal SG1(2) and a second received distance measurement pulse signal SG2(2) is denoted as X(1). A time difference between a third transmitted distance measurement pulse signal SG1(3) and a third received distance measurement pulse signal SG2(3) is denoted as X(2). A time difference between a fourth transmitted distance measurement pulse signal SG1(4) and a fourth received distance measurement pulse signal SG2(4) is denoted as X(3).

The time interval between a distance measurement pulse signal SG2(1) that the sensor device 200 first receives and a distance measurement pulse signal SG2(2) that the sensor device 200 second receives is denoted as Tb(1). The time interval between a distance measurement pulse signal SG2(2) that the sensor device 200 second receives and a distance measurement pulse signal SG2(3) that the sensor device 200 third receives is denoted as Tb(2). The time interval between a distance measurement pulse signal SG2(3) that the sensor device 200 third receives and a distance measurement pulse signal SG2(4) that the sensor device 200 fourth receives is denoted as Tb(3).

In a case where a distance between the wireless communication device 100 and the sensor device 200 changes, time differences X(1), X(2), X(3), . . . illustrated in FIG. 27 change. Further, the time intervals Tb(1), Tb(2), Tb(3), . . . of the distance measurement pulse signals received by the sensor device 200 change.

Further, in FIG. 27, based on a certain time K, the first distance measurement pulse signal SG1(1) is transmitted from the wireless communication device 100 after time Y0 has elapsed from the time K, and the first distance measurement pulse signal SG2(1) is received in the sensor device 200 after the time Z0 has elapsed from the time K.

<Operation of Sensor Device 200: Measurement of Time Interval Tb(n)>

The sensor control section 270 monitors the output of the correlation signal processing section 240 so as to understand the reception timing of the distance measurement pulse signal SG2 at each distance measurement pulse signal and measures time intervals Tb(1), Tb(2), Tb(3), . . . of the distance measurement pulse signal received after the reference time K to store all of them in a memory, not illustrated.

Accordingly, for example, after the reference time K, in a case where first to n-th distance measurement pulse signals transmitted from the wireless communication device 100 are received, the sensor device 200 obtains a total of (n−1) data of time intervals Tb(1) to Tb(n−1). The sensor device 200 causes the operation timing of the sensor device 200 to be synchronous with the operation timing of the wireless communication device 100 by using a total of (n−1) data.

<Description of P Value>

In FIG. 27, after the reference time K, the time tn1 in which the wireless communication device 100 transmits the n-th distance measurement pulse signal SG1(n) is represented by Expression (4). The time tn2 in which the sensor device 200 receives the n-th distance measurement pulse signal SG2(n) is represented by Expression (5). In Expression (5), Tb(0)=0.

[Expression 4]

$$tn1 = Yo + (n-1) \times Ta \quad (4)$$

[Expression 5]

$$tn2 = Zo + \sum_{k=1}^{n} Tb(k-1) \quad (5)$$

Accordingly, the time difference X(n−1) between the time tn2 in which the sensor device 200 receives the n-th distance measurement pulse signal SG2(n) and the time tn1 is represented by Expression (6).

[Expression 6]

$$X(n-1) = \left[ Zo + \sum_{k=1}^{n-1} Tb(k-1) \right] - [Yo + (n-1) \times Ta] \quad (6)$$

In Expression (6), the period Ta is constant and information known to the sensor device 200. Further, the sensor device 200 counts the number of distance measurement pulse signals which are received, thereby understanding the number n of the distance measurement pulse signal which is received last. Further, the sensor device 200 can understand a value of (k−1)-th time interval Tb(k) for the first to (n−1)-th distance measurement pulse signals.

In Expression (6), times Z0 and Y0 are unknown numbers. However, the sensor device 200 may understand the relative value of the time difference X(n−1) and may not understand times Z0 and Y0 separately. Here, for convenience, in a state where the wireless communication device 100 and the sensor device 200 are most adjacent to each other, that is, in a case where Z0−Y0=0, the sensor device 200 obtains a P value corresponding to the time difference X(n−1). The P value in a case where the sensor device 200 receives the (n−1)-th distance measurement pulse signal, that is, P(n−1) is represented by Expression (7).

[Expression 7]

$$P(n-1) = \sum_{k=1}^{n-1} Tb(k-1) - (n-1) \times Ta \quad (7)$$

In a case where the distance between the wireless communication device 100 and the sensor device 200 does not change, the P value represented by Expression (7) is a constant value. Further, in a case where the wireless communication device 100 is approaching the sensor device 200, the P value is reduced, whereas in a case where the wireless communication device 100 is moving away from the sensor device 200, the P value is increased.

Figure 28:
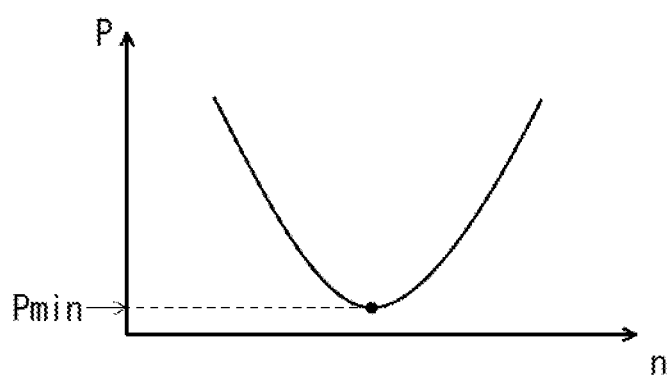
FIG. 28 is a graph illustrating a specific example (1) of a change of P value.

FIG. 28 is a graph illustrating a specific example (1) of a change of P value. That is, in a case where the wireless communication device 100 approaches and moves away from the sensor device 200, the change characteristic curve of P value illustrated in FIG. 28 is observed. The minimum value of the P value as an extreme value of the change characteristic curve illustrated in FIG. 28 means a state where the wireless communication device 100 is closest to the sensor device 200, that is, the distance between the wireless communication device 100 and the sensor device 200 is shortest.

The shortest distance estimation section 250 calculates the P value represented by Expression (7) and understands the extreme value of the change characteristic curve illustrated in FIG. 28, and thus estimates the shortest distance between the wireless communication device 100 and the sensor device 200. However, in a case where the change characteristic curve of the P value is not the change characteristic curve having one extreme value illustrated in FIG. 28 but a change characteristic curve having a plurality of extreme values, there is also a possibility of erroneously determining any one of extreme value in the characteristic curve as a shortest distance state.

The shortest distance estimation section 250 considers as a condition, whether or not the signal power of a distance measurement pulse signal received by the sensor device 200 exceeds a predetermined threshold value in the estimation of the shortest distance, thereby avoiding an erroneous determination of the extreme value in the characteristic curve.

<Understanding of Time Difference>

The time that the sensor device 200 can detect using the above method is the time in a case of where the distance between the wireless communication device 100 and the sensor device 200 are adjacent to each other in a shortest distance. As a real situation, in the present embodiment, when the wireless communication device 100 is close to or in contact with the sensor device 200, the sensor device 200 observes the change characteristic curve of the P values illustrated in FIG. 28.

A distance L (for example, 10 cm) is treated as a known value in a position state in which the wireless communication device 100 and the sensor device 200 are expected to be in contact with each other in a case where the wireless communication device 100 is in contact with the sensor device 200. That is, in a case where a m-th P value P(m) is a shortest distance, Expression (8) is established. In Expression (8), C is a light speed.

[Expression 8]

$$P(m) + Zo - Yo = \frac{L}{C} \quad (8)$$

$$(Zo - Yo) = \frac{L}{C} - P(m)$$

Z0 and Y0 which were unknown numbers are not still known, but the value (Z0−Y0) of the difference as a relative value is found by Expression (8). Accordingly, a time difference X(j) can be specified by Expression (9) with respect to a distance measurement pulse signal which is received in the j-th time among the first to (n−1)-th distance measurement pulse signals based on Expression (6). In Expression (9), Tb(k) can be acquired as data of a observed value, (Z0−Y0) is calculated from Expression (8), and period Ta is known.

[Expression 9]

$$X(j) = \sum_{k=1}^{j-1} Tb(k-1) - (j-1) \times Ta + (Zo - Yo) \quad (9)$$

The sensor device 200 can calculate a distance between the wireless communication device 100 and the sensor device 200 by using a time difference X(j) and a light speed C. Further, since the time difference X(j) is known, the sensor device 200 knows the transmission times t21, t31, t41, . . . of the wireless communication device 100, thereby establishing synchronization with the wireless communication device 100.

<(Modification Example): Measurement of Time Difference Tc(n)>

Figure 29:
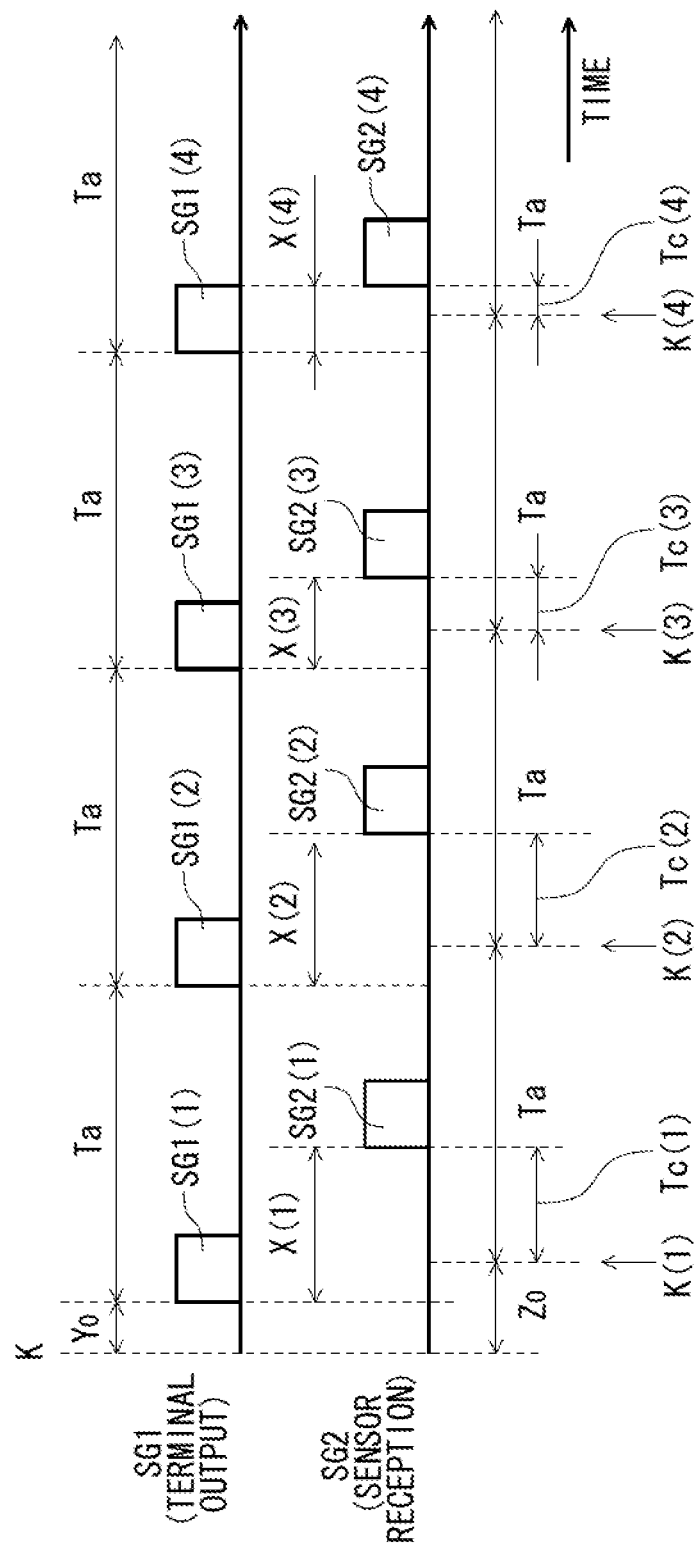
FIG. 29 is a time chart illustrating a specific example (2) of transmission timings and reception timings of a wireless signal.

Next, a modification example regarding a time measurement operation will be described. FIG. 29 is a time chart illustrating a specific example (2) of transmission timings and reception timings of a wireless signal.

Similar to FIG. 27, the distance measurement pulse signal SG1 illustrated in FIG. 29 indicates a wireless signal transmitted by the wireless communication device 100. The distance measurement pulse signal SG2 illustrated in FIG. 29 indicates the distance measurement pulse signal SG1 that the sensor device 200 actually receives.

In FIG. 29, the distance measurement pulse signal SG1 is a signal in which distance measurement pulse signals SG1(1), SG1(2), SG1(3), . . . are repeatedly transmitted from the wireless communication device 100 at a constant time period Ta. The distance measurement pulse signal SG2(1) corresponds to the distance measurement pulse signal SG1(1), that is, a signal obtained when the sensor device 200 receives the distance measurement pulse signal SG1. In a similar manner, distance measurement pulse signals SG2(2), SG2(3), SG2(4), . . . respectively correspond to the distance measurement pulse signals SG1(2), SG1(3), SG1(4), . . . , that is, the distance measurement pulse signals SG2(1), SG2(2), SG2(3), SG2(4), . . . are signals that are received in the sensor device 200.

In FIG. 29, a time difference between the first distance measurement pulse signal SG1(1) transmitted by the wireless communication device 100 and the distance measurement pulse signal SG2(1) received by the sensor device 200 is denoted as X(1). A time difference between the second distance measurement pulse signal SG1(2) transmitted by the wireless communication device 100 and the distance measurement pulse signal SG2(2) received by the sensor device 200 is denoted as X(2). A time difference between the third distance measurement pulse signal SG1(3) transmitted by the wireless communication device 100 and the distance measurement pulse signal SG2(3) received by the sensor device 200 is denoted as X(3).

Further, a time difference between the reception time of the first distance measurement pulse signal SG2(1) received by the sensor device 200 and the first reference time K(1) is denoted as Tc(1). A time difference between the reception time of the second distance measurement pulse signal SG2(2) received by the sensor device 200 and the second reference time K(2) is denoted as Tc(2). A time difference between the reception time of the third distance measurement pulse signal SG2(3) received by the sensor device 200 and the third reference time K(3) is denoted as Tc(3).

In FIG. 29, based on a certain time K, the wireless communication device 100 transmits the first distance measurement pulse signal SG1(1) after time Y0 has elapsed from the time K, and the sensor device 200 receives the first distance measurement pulse signal SG2(1) after the time Z0 has elapsed from the time K and the time difference Tc(1) has elapsed.

In addition, since the time Z0 and time Y0 are unknown, the sensor device 200 sets a time when time Z0 has elapsed from the reference time K as a first reference time K(1).

Further, since the transmission period Ta of the distance measurement pulse signal transmitted from the wireless communication device 100 is known and is constant, the sensor device 200 sets a time when the same time as the period Ta has elapsed from the first reference time K(1) as a second reference time K(2).

In a similar manner, the sensor device 200 sets a time when the same time as the period Ta has elapsed from the second reference time K(2) as a third reference time K(3) and sets a time when the same time as the period Ta has elapsed from the third reference time K(3) as a fourth reference time K(4).

In a modification example 1, the sensor device 200 sets each of reference times K(1), K(2), K(3), . . . , sequentially measures and stores the reception timing of the n-th distance measurement pulse signal SG2(n) as a time difference Tc(n) from the n-th reference time K(n) to when the n-th distance measurement pulse signal SG2(n) is received. In addition, the time difference Tc(n) may have a negative value.

Accordingly, the n-th time difference X(n) illustrated in FIG. 29 is represented by Expression (10).

[Expression 10]

$$X(n) = \left[ Zo + Ta \times (n-1) + \sum_{k=1}^{n} Tc(k) \right] - [Yo + Ta \times (n-1)] \quad (10)$$

$$= (Zo - Yo) + \sum_{k=1}^{n} Tc(k)$$

Accordingly, in the modification example, the sensor device 200 measures a time difference Tc(n) illustrated in FIG. 29, thereby understanding the n-th time difference X(n), in a similar manner with a case of measuring a time interval Tb(n) illustrated in FIG. 27.

In a case of measuring a time interval Tb(n) illustrated in FIG. 27, since the number value is calculated for summing times from the reference time K, if a reception time of the distance measurement pulse signal is longer than the reference time, it is necessary to handle the large number value in the calculation process, and thus the circuit scale of the sensor device 200 is increased. However, in a case of measuring a time difference Tc (n) in the present modification example, since difference information from the n-th reference time K(n) may be added, it is possible to suppress increase in the number value to be handled and to reduce the circuit scale of the sensor device 200.

<Operation of System>

The wireless communication device 100 illustrated in FIG. 25 performs communication with other reception devices (not illustrated) in general, in addition to transmitting the distance measurement pulse signal for measuring a distance in the distance measurement system 1000. Further, the operation timing of the sensor device 200 illustrated in FIG. 26 is not synchronous with the operation timing of the wireless communication device 100 illustrated in FIG. 25, in an initial state of the distance measurement system 1000.

<Operation Sequence of Distance Measurement System 1000>

Figure 31:
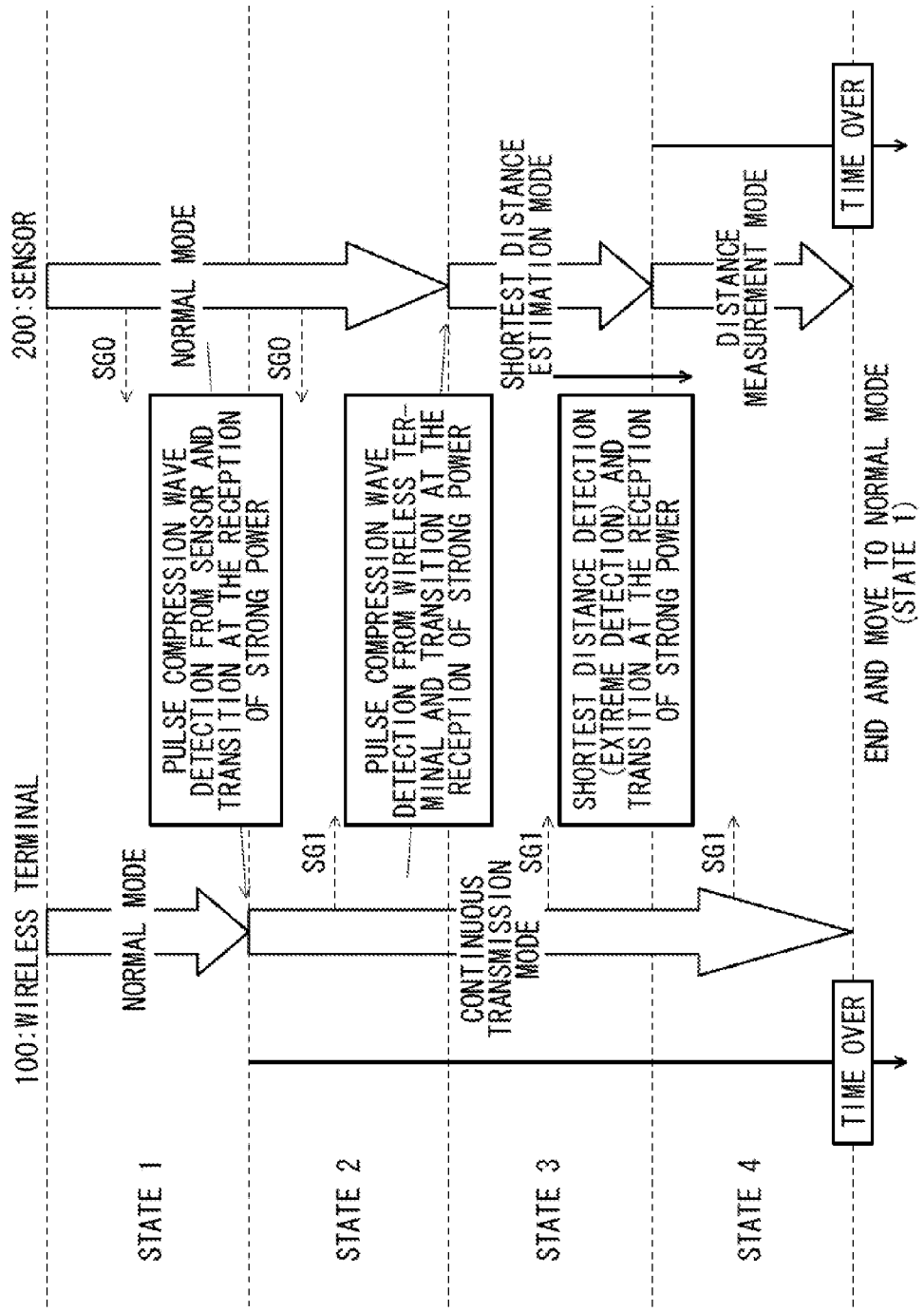
FIG. 31 is a sequence diagram illustrating an overview of an operation of a distance measurement system of the fifth embodiment.
Figure 36:
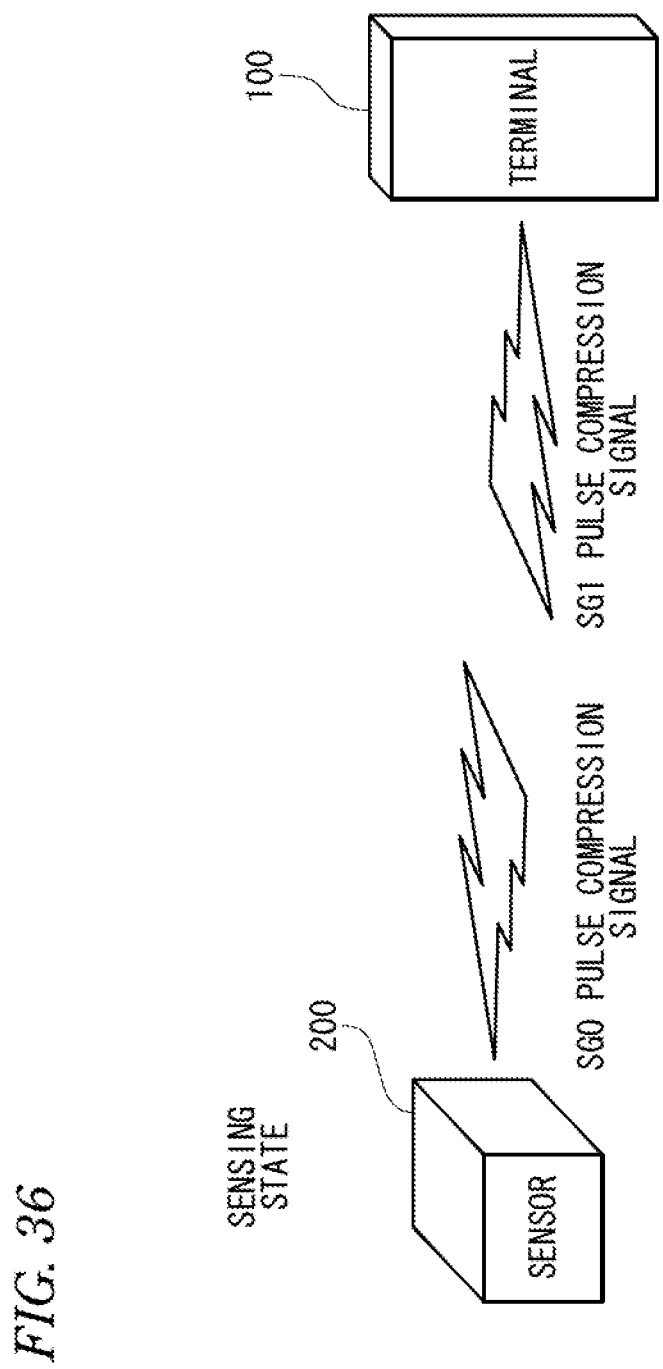
FIG. 36 is a schematic diagram conceptually illustrating a sensing state of the distance measurement system.

FIG. 31 is a sequence diagram illustrating an overview of an operation of a distance measurement system 1000 of the fifth embodiment. FIG. 35 is a schematic diagram conceptually illustrating an initial state of a distance measurement system 1000. FIG. 36 is a schematic diagram conceptually illustrating a sensing state of the distance measurement system 1000. FIG. 37 is a schematic diagram conceptually illustrating a measurement state of the distance measurement system 1000.

In a case where a normal communication state (normal mode) is transited to a distance measurement state (distance measurement mode), the wireless communication device 100 and the sensor device 200 of the distance measurement system 1000 sequentially switch respective operation modes. That is, in FIG. 31, respective states of the wireless communication device 100 and the sensor device 200 are changed from "state 1" to "state 4".

The "state 1" is, for example, in FIG. 35, an initial state in which the distance between the wireless communication device 100 and the sensor device 200 is substantially far from each other. In the "state 1", the wireless communication device 100 and the sensor device 200 respectively operate as the normal mode.

That is, the wireless communication device 100 transmits and receives packets suitable for a predetermined wireless specification as a wireless signal. The sensor device 200 transmits a predetermined distance measurement pulse signal SG0 and monitors the presence or absence of the reception of a predetermined distance measurement pulse signal SG1.

As the wireless communication device 100 approaches the sensor device 200, a transition to the sensing state illustrated in FIG. 36 is started, so that the wireless communication device 100 and the sensor device 200 detect the wireless signals of each other. In fact, after the wireless communication device 100 approaches and is in contact temporarily with the sensor device 200, the wireless communication device 100 moves away from the sensor device 200.

The wireless communication device 100 determines whether or not the received wireless signal is a predetermined distance measurement pulse signal SG0 and whether or not the reception power of the received signal exceeds a specific threshold value. The wireless communication device 100 switches the operation mode of the wireless communication device 100 from the normal mode to the continuous transmission mode on a basis of the determination result. Thus, the "state 1" corresponding to the initial state illustrated in FIG. 35 is transited to the "state 2" corresponding to the sensing state illustrated in FIG. 36.

If the transition to the "state 2" occurs, the wireless communication device 100 operates as the continuous transmission mode. That is, the wireless communication device 100 temporarily stops the normal communication state and successively transmits the distance measurement pulse signal (SG1). That is, the wireless communication device 100 in FIG. 27 or FIG. 29 repeatedly transmits the distance measurement pulse signal (SG1) at a constant period Ta.

In the "state 2", the sensor device 200 keeps the normal mode and receives the distance measurement pulse signal SG1 transmitted by the wireless communication device 100 as the distance measurement pulse signal SG2. That is, in the sensing state illustrated in FIG. 36, the wireless communication device 100 detects the distance measurement pulse signal SG0 transmitted by the sensor device 200, and the sensor device 200 detects the distance measurement pulse signal SG1 transmitted by the wireless communication device 100.

In "state 2", the sensor device 200 determines whether or not the signal power of the received distance measurement pulse signal SG2 is sufficiently large and exceeds a predetermined threshold value. In a case where the signal power exceeds the threshold value, the sensor device 200 switches the operation mode of the sensor device 200 from the normal mode to the shortest distance estimation mode. Thus, the "state 2" corresponding to the sensing state illustrated in FIG. 36 is transited to the "state 3" corresponding to the measurement state illustrated in FIG. 37.

In addition, in the "state 2", the sensor device 200 receives the distance measurement pulse signal SG0 transmitted by the sensor device 200 itself and the distance measurement pulse signal SG1 transmitted by the wireless communication device 100. In a case of receiving the distance measurement pulse signals SG0 and SG1, the sensor device 200 receives the distance measurement pulse signal SG1 having greater signal power than the distance measurement pulse signal SG0.

Accordingly, the sensor device 200 can distinguish two distance measurement pulse signals SG0 and SG1 on a basis of a difference of a size of signal power. Further, the sensor device 200 identifies the code sequence in a case where the code sequence corresponding to the distance measurement pulse signal SGI and the code sequence corresponding to the distance measurement pulse signal SG0 are different, thereby distinguishing two distance measurement pulse signals SG0 and SG1.

In the "state 3", the wireless communication device 100 continues the operation of the continuous transmission mode, and the sensor device 200 operates as the shortest distance estimation mode. In the shortest distance estimation mode, in the measurement state illustrated in FIG. 37, the sensor device 200 stops transmission of the distance measurement pulse signal SG0 from the sensor device 200 itself and continues reception of the distance measurement pulse signal SG1 from the wireless communication device 100. The shortest distance estimation section 250 of the sensor device 200 estimates a shortest distance between the wireless communication device 100 and the sensor device 200 in accordance with the above described shortest distance measurement method, and the sensor control section 270 of the sensor device 200 compares the size of the signal power of the received distance measurement pulse signal with a predetermined threshold value. If it is determined that the signal power of the received distance measurement pulse signal exceeds the threshold value and the shortest distance measurement is successful after the determination, the sensor device 200 is transited to the "state 4" corresponding to the measurement state illustrated in FIG. 37.

In the "state 4", the wireless communication device 100 continues the operation of the continuous transmission mode, and the sensor device 200 operates as the distance measurement mode. In the distance measurement mode, the sensor device 200 in the measurement state illustrated in FIG. 37 continues reception of the distance measurement pulse signal SG1 from the wireless communication device 100. The sensor device 200 succeeds in the shortest distance measurement in the "state 3" and already understands the transmission timing of the wireless communication device 100, so that the sensor device 200 detects the time difference $X(n-1)$ between the distance measurement pulse signals SG1 and SG2 and calculates a distance between the wireless communication device 100 and the sensor device 200 on a basis of the detected time difference X(n−1).

Further, after a certain predetermined time has elapsed from the starting time of the continuous transmission mode in which the "state 1" is transited to "state 2", the wireless communication device 100 is transited to the normal mode, that is, the operation mode corresponding to the "state 1". In the similar manner, after a certain predetermined time has elapsed from the starting time of the distance measurement mode in which the "state 3" is transited to "state 4", the sensor device 200 is transited to the normal mode, that is, the operation mode corresponding to the "state 1".

<Operation of Wireless Communication Device 100>

Figure 32:
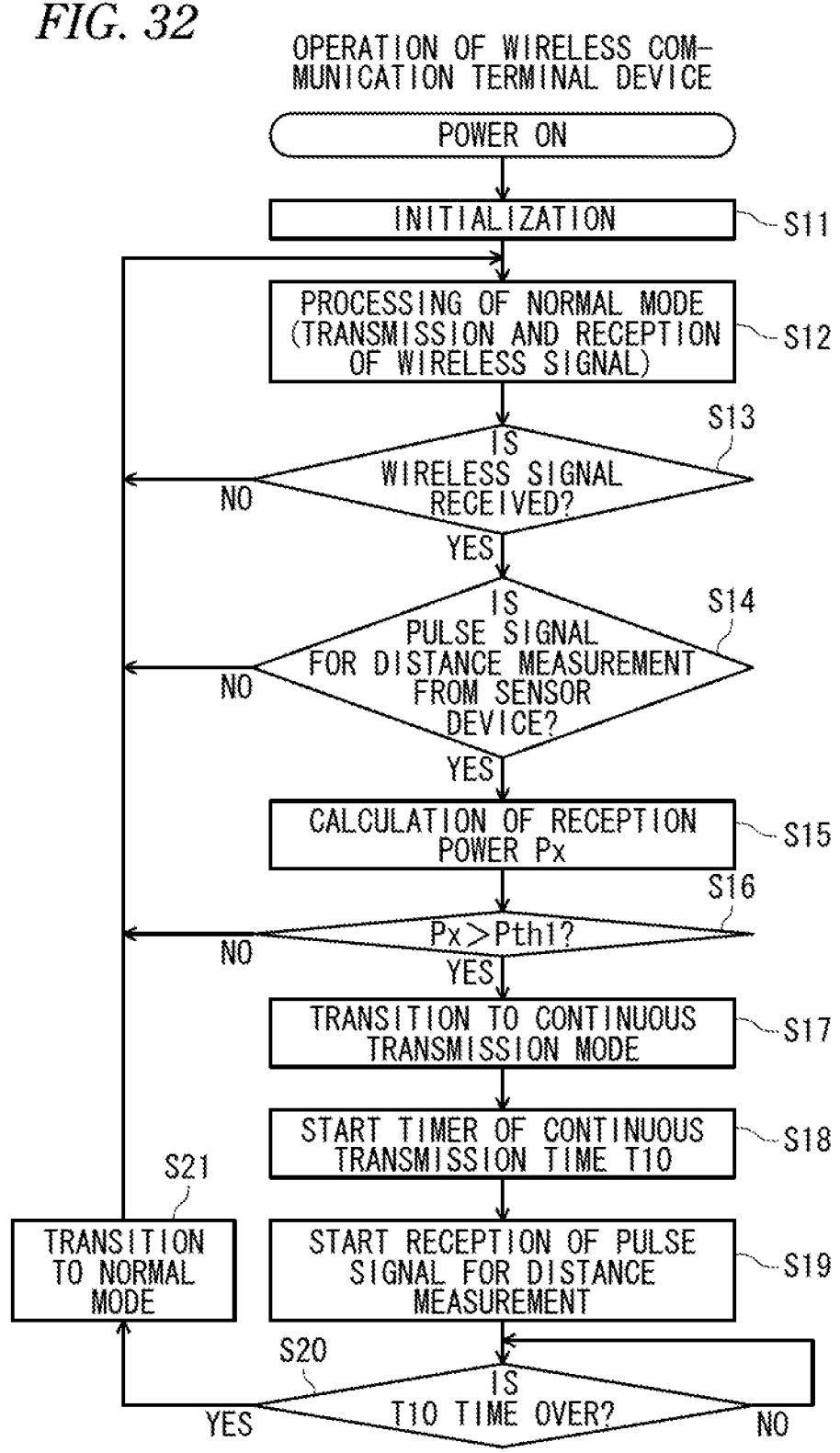
FIG. 32 is a flowchart illustrating details of an operation of the wireless communication device of the fifth embodiment.

FIG. 32 is a flowchart illustrating details of an operation of a wireless communication device 100 of the fifth embodiment.

If the power of the wireless communication device 100 is turned on, the wireless device control section 170 initializes the operation of the wireless communication device 100 (S11) and selects the normal mode as the operation mode. In the normal mode, the wireless communication device 100 transmits and receives a wireless signal (S12).

Further, in a case where a wireless signal is received in the normal mode (S13), the wireless device control section 170 determines whether or not the wireless signal is the distance measurement pulse signal SG0 transmitted from the sensor device 200 (S14). For example, since the pulse compression detection section 150 determines whether or not the code sequence contained in the received wireless signal is consistent with the predetermined code sequence, the wireless device control section 170 can distinguish between the distance measurement pulse signal SG0 and the other wireless signals.

In a case where the wireless communication device 100 receives the distance measurement pulse signal SG0 (S14, YES), the reception power calculation section 190 calculates the size PX of the signal power of the distance measurement pulse signal SG0 (S15) and compares the size PX of the signal power with a predetermined threshold value Pth1 (S16). In addition, the wireless device control section 170 may perform the comparison of step S16.

If the condition of "Px>Pth1" is satisfied (S16, YES), that is, in a case where the wireless communication device 100 is close to the sensor device 200 to some extent, the wireless device control section 170 of the wireless communication device 100 switches the operation mode from the normal mode to the continuous transmission mode (S17). Accordingly, it is transited to the sensing state illustrated in FIG. 36.

If the operation mode is transited to the continuous transmission mode, the wireless device control section 170 starts the timer 180 that measures the continuous transmission time T10 (S18). The wireless device control section 170 controls the pulse compression generation section 160 to start transmission of the distance measurement pulse signal SG1 (S19).

Further, if the continuous transmission time T10 in accordance with the output of the timer 180 exceeds a predetermined time (S20, YES), time is over (S20), and the operation mode of the wireless communication device 100 is transited to the normal mode (S21).

<Operation (1) of Sensor Device>

Figure 33:
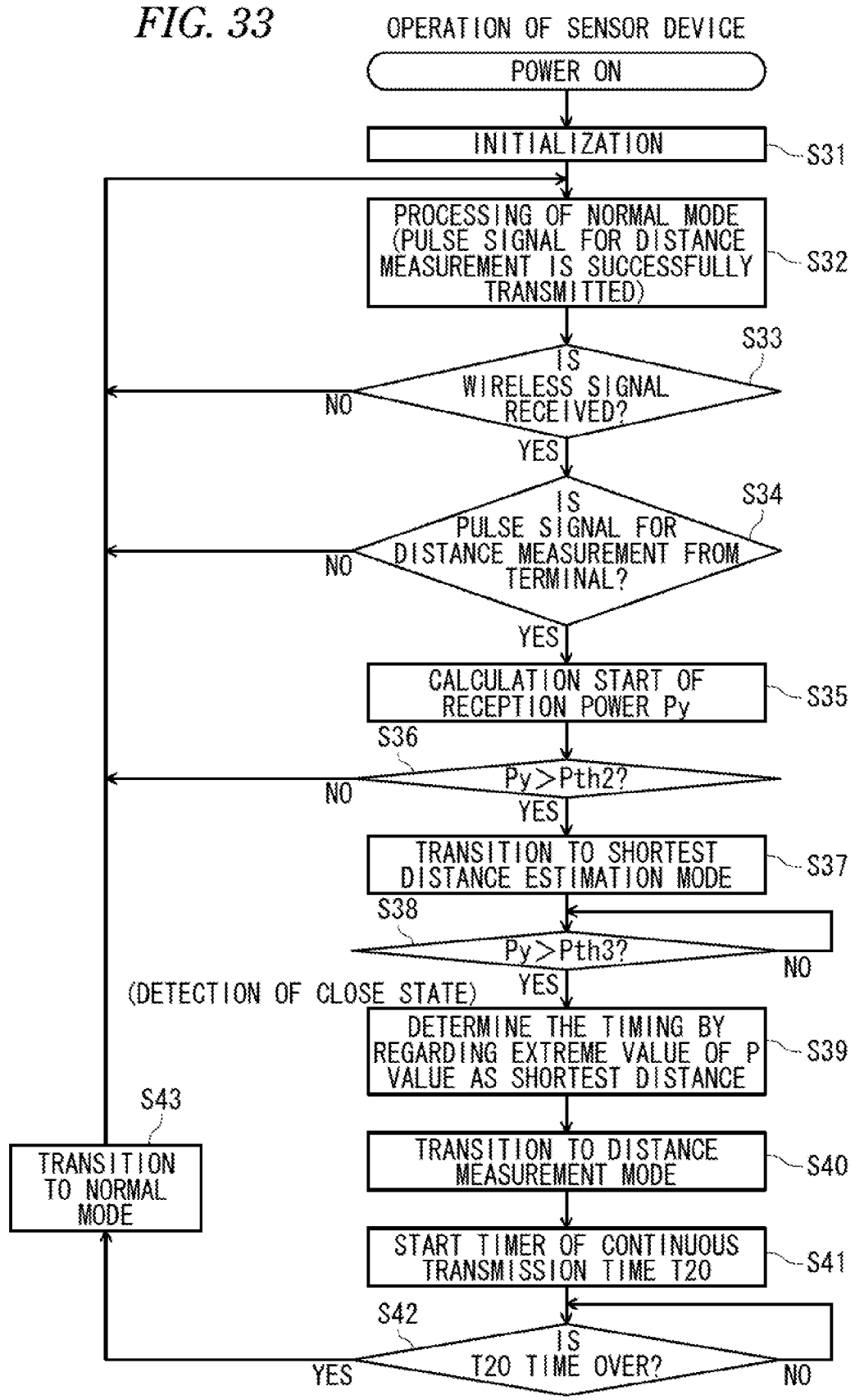
FIG. 33 is a flowchart illustrating details of an operation (1) of the sensor device of the fifth embodiment.

FIG. 33 is a flowchart illustrating details of an operation (1) of a sensor device 200 of the fifth embodiment.

If the power of the sensor device 200 is turned on, the sensor control section 270 initializes the operation of the sensor device 200 (S31) and selects the normal mode as the operation mode. In the normal mode, the sensor device 200 successively transmits the distance measurement pulse signal SG0 that the pulse compression generation section 230 generates at a constant period (S32).

Further, the sensor device 200 receives a wireless signal transmitted from another station in the normal mode (S33). In a case where the wireless signal from another station is received (S33, YES), the sensor control section 270 determines whether or not the wireless signal is the predetermined distance measurement pulse signal SG1 (S34). For example, the sensor control section 270 determines whether or not the code sequence contained in the received wireless signal is consistent with the predetermined code sequence, and thus the sensor control section 270 can distinguish between the distance measurement pulse signal SG1 and the other wireless signals.

In a case where the sensor device 200 receives the distance measurement pulse signal SG1 (S34, YES), the reception power calculation section 260 calculates the size Py of the signal power of the distance measurement pulse signal SG1 (S35) and compares the size Py of the signal power of the calculated distance measurement pulse signal SGI with a predetermined threshold value Pth2 (S36). In addition, the sensor control section 270 may perform the comparison of step S36.

In a case where the wireless communication device 100 is located in a position close to the sensor device 200 to some extent (for example, the distance is within 50 cm), the size Py of the signal power of the distance measurement pulse signal is increased, so that the condition of "Py>Pth2" is established, and the sensor control section 270 switches the operation mode from the normal mode to the shortest distance estimation mode (S37). In the shortest distance estimation mode, the shortest distance estimation section 250 of the sensor device 200 estimates the shortest distance between the wireless communication device 100 and the sensor device 200 in accordance with the above described shortest distance measurement method.

After the transition to the shortest distance estimation mode, the sensor control section 270 compares the size Py of the signal power of the distance measurement pulse signal SGI with a predetermined threshold value Pth3 (S38). However, the threshold value Pth2 in step S36 is smaller than the threshold value Pth3 in step S38. In other words, in step S38, the sensor control section 270 determines whether or not the wireless communication device 100 is located in a position closer to the sensor device 200 compared to step S36 (for example, the distance is within 20 cm).

In a case where a condition of "Py>Pth3" is established (S38, YES), the wireless communication device 100 is in a state of being close enough to the sensor device 200, so that the sensor device 200 can obtain the data of P value of the change characteristic curve illustrated in FIG. 33 for the change in the distance.

Accordingly, the shortest distance estimation section 250 regards the extreme value (minimum value) of the P value as the shortest distance and outputs the estimation result (S39). That is, the shortest distance estimation section 250 determines the time difference parameter (Z0−Y0) between the transmission timing and the reception timing of the distance measurement pulse signal SG1 (S39).

If the time difference parameter (Z0−Y0) between the transmission timing and the reception timing of the distance measurement pulse signal SG1 is determined, it is possible to measure the distance between the wireless communication device 100 and the sensor device 200, and thus the sensor control section 270 of the sensor device 200 switches the operation mode from the shortest distance estimation mode to the distance measurement mode (S40).

After the transition to the distance measurement mode, the sensor control section 270 starts the timer of the continuous transmission time T20 (S41). The sensor control section 270 continues the measurement of the distance until the timer of the continuous transmission time T20 is time-over. That is, the sensor control section 270 calculates the time difference X(j) between the transmission timing and the reception timing of the distance measurement pulse signal SG1 for each received distance measurement pulse signal (see Expression (9) or Expression (10)) and calculates the distance between the wireless communication device 100 and the sensor device 200 on a basis of the calculated time difference.

If the continuous transmission time T20 exceeds the predetermined time (S42, YES), time is over (S42), and the operation mode of the sensor device 200 is transited to the normal mode (S43).

<Operation (2) of Sensor Device 200>

Figure 34:
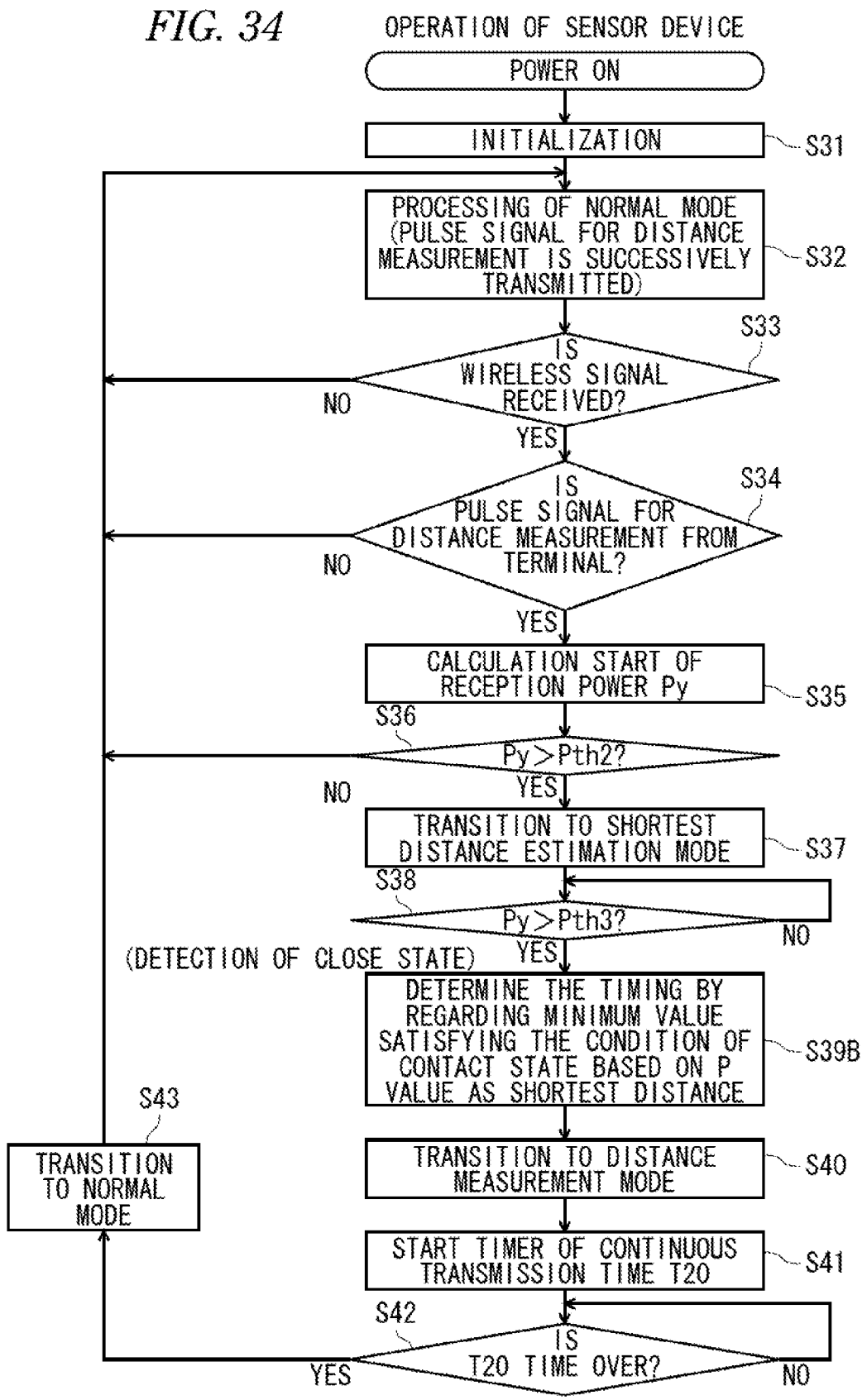
FIG. 34 is a flowchart illustrating details of an operation (2) of the sensor device of the fifth embodiment.

FIG. 34 is a flowchart illustrating an operation (2) of the sensor device 200. In FIG. 34, since the operation content of each step other than step S39B is the same as the content of the FIG. 9, the description thereof is omitted.

In the operation (2) illustrated in FIG. 34, the wireless communication device 100 is in contact with the sensor device 200, in order to adjust the respective operation timings of the wireless communication device 100 and the sensor device 200.

Figure 30A:
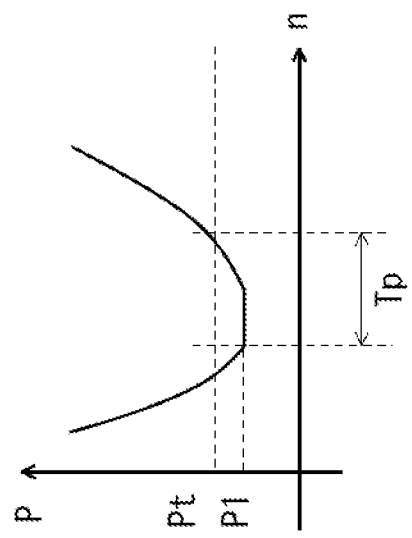

The P value changes as the change characteristic curve illustrated in FIG. 30A. In other words, as the wireless communication device 100 gradually approaches the sensor device 200, the wireless communication device 100 comes into contact with the sensor device 200. The wireless communication device 100 keeps the state of being contacted for a predetermined time Tp or more, and then the wireless communication device 100 gradually moves away from the sensor device 200 after the contact continues for a predetermined time Tp or more. FIG. 30A is a graph illustrating a change of P value when a state in which the wireless communication device 100 is in contact with the sensor device 200 continues for a predetermined time Tp or more.

In FIG. 30A, in the change characteristic curve of the P value, a state in which the P value hardly changes in the minimum value P0, that is, a state appears in which the contact state continues over a certain time. Thus, it is possible to estimate that the wireless communication device 100 is in contact with the sensor device 200.

Figure 30B:
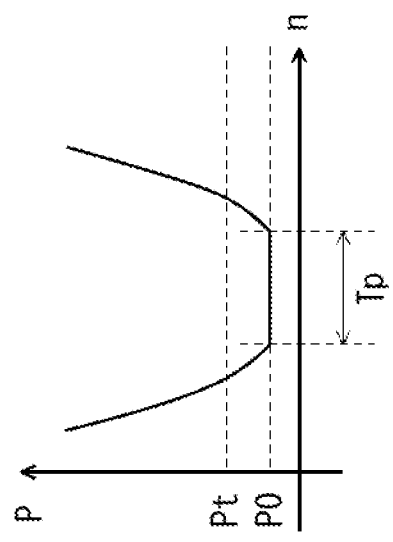

However, in FIG. 30B, in a case where the wireless communication device 100 may gradually move away from the sensor device 200 after a time less than a predetermined time Tp has elapsed, it may be estimated that the wireless communication device 100 is separated from the sensor device 200 before the wireless communication device 100 comes into contact with the sensor device 200. Therefore, P1 that is not expected originally is detected as the minimum distance. FIG. 30B is a graph illustrating a change of P value when the wireless communication device 100 is in contact with the sensor device 200 for less than a predetermined time Tp.

In contrast, in step S39B of FIG. 34, the sensor control section 270 regards the state of minimum value as the state of the shortest distance among P values satisfying the conditions of the contact state to determine the timing. For example, in the change characteristic curve of the detected P value, a case where a state in which the P value remains unchanged with a minimum value continues for a predetermined time Tp or more, but the P value is a predetermined threshold value (for example, 10 cm) or less is defined as a condition of a contact state in advance.

The predetermined time Tp corresponds to a time period when the wireless communication device 100 is kept in a contact state with the sensor device 200. The greater the predetermined time Tp is, the smaller the occurrence of the erroneous detection of the condition of the contact state is. However, since the wireless communication device 100 and the sensor device 200 should be kept in the contact state during a certain time, the detection easiness decreases.

The erroneous detection of the shortest distance can be reduced by estimating the state of the shortest distance on a basis of the P value satisfying the condition of the contact state as illustrated in FIGS. 30A and 30B.

Thus, in the distance measurement system 1000 of the present embodiment, the wireless communication device 100 performs normal wireless communication in the normal communication state (normal mode) in which the distance measurement is not necessary and can switch the operation mode in a case where the distance measurement is necessary.

Further, the wireless communication device 100 periodically generates a signal modulated using a known code sequence suitable for a correlation detection as the distance measurement pulse signal SG1 in the pulse compression generation section 160. Further, the sensor device 200 performs the correlation detection on the received distance measurement pulse signal SG1 in the correlation signal processing section 240.

Accordingly, the sensor device 200 can detect the reception timing of a distance measurement pulse signal from the wireless communication device 100 with high accuracy using a pulse compression technology. Further, the sensor device 200 determines a code sequence, thereby distinguishing a plurality of distance measurement pulse signals transmitted from a plurality of wireless communication devices.

Further, in a case of being switched to the shortest distance estimation mode, the sensor device 200 repeatedly detects the reception timing of the received distance measurement pulse signal in the shortest distance estimation section 250 and calculates the time difference parameter (Z0−Y0) of the transmission timing and the reception timing of a distance measurement pulse signal from the wireless communication device 100 in a case where the wireless communication device 100 is close to the sensor device 200. In addition, the sensor device 200 estimates the time difference parameter based on a minimum value of the P value in response to the change in the time difference parameter.

Accordingly, the wireless communication device 100 is close to the sensor device 200, so that the sensor device 200 can simply calculate the time difference parameter necessary for the distance measurement and simply calculate a distance between the wireless communication device 100 and the sensor device 200.

Further, the sensor device 200 can estimate the time difference parameter based on a state in which the minimum value of the P value in response to the change in the time difference parameter is a constant value over a predetermined certain period of time.

Accordingly, since the wireless communication device 100 is in contact with the sensor device 200, the sensor device 200 can suppress an erroneous determination of the time difference parameter necessary for the distance measurement and can simply calculate the distance between the wireless communication device 100 and the sensor device 200.

Further, after the shortest distance estimation section 250 completes the estimation of the time difference parameter, the sensor control section 270 switches the operation mode of the sensor device 200 from the shortest distance estimation mode to the distance measurement mode and calculates the distance between the wireless communication device 100 and the sensor device 200 on a basis of the reception timing and the time difference parameter of the distance measurement pulse signal SG1.

Accordingly, after the sensor device 200 obtains the time difference parameter necessary for the distance measurement, the distance measurement between the wireless communication device 100 and the sensor device 200 can be reliably started.

In addition, a meaning that the distance between the wireless communication device 100 and the sensor device 200 is close is considered as an operation, for example, in which the user who owns the wireless communication device 100 approaches the sensor device 200, the user-owned wireless communication device 100 is directly brought into contact with the sensor device 200, or the user-owned wireless communication device 100 is brought into a certain part of the sensor device 200.

Further, a plurality of sensor devices 200 are disposed and connected to a network, so that a synchronization established by other sensor devices can be shared in the plurality of sensor devices.

Further, the distance measurement system, the wireless communication device and the sensor device according to the present disclosure have the following configurations.

The present disclosure relates to a distance measurement system including a wireless communication device that transmits a wireless signal and a sensor device that measures a distance with the wireless communication device on a basis of the transmitted wireless signal, in which the wireless communication device includes:

a terminal control section that switches the operation mode of the wireless communication device to a terminal normal mode of transmitting and receiving the wireless signal or to a continuous transmission mode of periodically transmitting the distance measurement pulse signal and in which the sensor device includes:

a sensor control section that switches the operation mode of the sensor device to a sensor normal mode of transmitting and receiving a wireless signal or to a shortest distance estimation mode of estimating a time difference parameter between transmission timings and reception timings of the wireless signal on a basis of a wireless signal transmitted from the wireless communication device, in which a terminal-side mode control section switches the operation mode of the wireless communication device from the terminal normal mode to the continuous transmission mode in a case where the wireless communication device receives a wireless signal having signal power of a first threshold value or more and in which a sensor-side mode control section switches the operation mode of the sensor device from the sensor normal mode to the shortest distance estimation mode in a case where the sensor device receives a wireless signal having signal power of a second threshold value or more.

Further, the present disclosure relates to the above described distance measurement system, in which the wireless communication device further includes:

a pulse compression generation section that periodically generates a pulse compression signal using a known code sequence suitable for correlation detection as the distance measurement pulse signal and in which the sensor device further includes:

a correlation detection section that detects a correlation of the distance measurement pulse signal transmitted from the wireless communication device.

Further, the present disclosure relates to the above scribed distance measurement system, in which the sensor device further includes:

a shortest distance estimation section that repeatedly detects the reception timing of the distance measurement pulse signal in the shortest distance estimation mode, in a case where the wireless communication device is close to the sensor device, and estimates the time difference parameter between the transmission timing and the reception timing of the wireless signal.

Further, the present disclosure relates to the above described distance measurement system, in which the shortest distance estimation section repeatedly detects the reception timing of the distance measurement pulse signal in the shortest distance estimation mode, in a case where the wireless communication device is in contact with the sensor device, calculates the distance parameter between the wireless communication device and the sensor device on a basis of the reception timing, and in a case where the distance parameter is a predetermined value over a constant period of time, estimates the time difference parameter between the transmission timing and the reception timing of the wireless signal.

Further, the present disclosure relates to the above described distance measurement system, in which after the shortest distance estimation section estimates the time difference parameter between the transmission timing and the reception timing of the wireless signal, the sensor control section switches the operation mode of the sensor device from the shortest distance estimation mode to the measurement mode and calculates the distance between the wireless communication device and the sensor device on a basis of the reception timing of the distance measurement pulse signal and the time difference parameter.

Further, the present disclosure relates to a wireless communication device which transmits the above described wireless signal, including:

a pulse compression generation section that periodically generates a pulse compression signal using a known code sequence suitable for correlation detection and a terminal control section that switches the operation mode of the wireless communication device to a terminal normal mode of transmitting and receiving the wireless signal or a continuous transmission mode of transmitting the pulse compression signal as a distance measurement pulse signal, in which the terminal control section switches the operation mode of the wireless communication device from the terminal normal mode to the continuous transmission mode in a case where the wireless communication device receives a wireless signal having signal power of a first threshold value or more.

Further, the present disclosure relates to a sensor device which measures a distance with a wireless communication device on a basis of reception timings when a wireless signal transmitted from the above wireless communication device is received, including:

a sensor reception section that receives the wireless signal transmitted from the wireless communication device and a sensor control section that switches the operation mode of the sensor device to a sensor normal mode of transmitting and receiving a wireless signal or to a shortest distance estimation mode of estimating a time difference parameter between transmission timings and reception timings of the wireless signal on a basis of a wireless signal transmitted from the wireless communication device, in which a sensor-side mode control section switches the operation mode of the sensor device from the sensor normal mode to the shortest distance estimation mode in a case where a sensor-side reception section receives a wireless signal having signal power of a second threshold value or more.

Although the foregoing has described various embodiments with reference to the drawings, the present disclosure is not limited to these embodiments. It may be conceived that various variations and modifications will be apparent to those skilled in the art within the scope described in the claims and these belong to the technical scope of the present disclosure.

In addition, the present application is based on Japanese patent application filed on Feb. 8, 2012 (Japanese patent application No. 2012-025492), Japanese patent application filed on Feb. 27, 2012 (Japanese patent application No. 2012-040451), and Japanese patent application filed on Mar. 29, 2012 (Japanese patent application No. 2012-078307), and the contents thereof are incorporated as reference herein.

INDUSTRIAL APPLICABILITY

The present disclosure is useful as a wireless communication device that generates a pulse compression signal for measuring the radiation pattern from the antenna by a simple configuration.

The present disclosure is useful as a wireless communication device that measures the radiation pattern of a beam having a desired directivity in a beam forming in a short time.

The present disclosure is useful as a distance measurement system, a sensor device, and a wireless communication device which simply measure a distance between the wireless communication device and the sensor device, without informing in advance a sensor device of transmission timings of a signal from a wireless communication device.

REFERENCE SIGNS LIST 10, 10B, 10C sensor
10a, 10b, 21 antenna
11 transmission section
12 reception section
13 pulse compression wave generating section
14, 23 DAC
15 transmission RF section
16 reception RF section
17 ADC
18 correlator
19 signal processing section
20, 20BB WiGig wireless device
20A, 20B, 20C, 20D antenna system processing section (branch)
21A, 21B, 21C, 21D transmission antenna
22 RF section
24 modulation section
25 selector section
30 mask circuit section
31 mask timing generation section
40 Golay signal generation section
41 selector section
100 radiation pattern measurement system
120, 220 high frequency section
130 modulation section
140 demodulation section
150 pulse compression detection section
160 pulse compression generation section
170 wireless device control section
180, 280 timer
190, 260 reception power calculation section
200 sensor device
230 pulse compression generation section
240 correlation signal processing section
250 shortest distance estimation section
270 sensor control section
1000 wireless communication device
1200 reception RF section
1300 ADC
1500, 1500C search continuation determination section
2000 wireless communication device
2200 modulation section
2300 DAC
2400 phase shifter
2500 transmission RF section
2600 control section
2700 code sequence selection section
2800 pulse compression signal generation section
C1, CC1, Ck, CN correlator
SP1, SPC1, SPk, SPN signal processing section
TJ1, TJk, TJN threshold value determination section
TX transmission section

The invention claimed is:

1. A wireless communication device comprising:
modulation circuitry which, in operation, generates a first signal frame including a data main body and a preamble based on a Wireless Gigabit (WiGig) specification;
mask timing generation circuitry which, in operation, determines a control timing of a plurality of preamble transmission periods and a plurality of preamble transmission stops periods in measuring an antenna radiation pattern;
signal masking circuitry which, in operation, generates a second signal frame by applying the plurality of preamble transmission periods and the plurality of preamble transmission stop periods based on the control timing in measuring the antenna radiation pattern, wherein the signal masking circuitry outputs the second signal frame, which is a pulse compression signal; and
transmission circuitry which, in operation, transmits the first signal frame in transmitting data, and transmits the second signal frame in measuring the antenna radiation pattern, a preamble of the second signal frame being transmitted during the plurality of preamble transmission periods and not being transmitted during the plurality of preamble transmission stop periods.

2. The wireless communication device according to claim 1,
wherein the modulation circuitry includes:
correlator circuitry, which, in operation, generates two complementary codes in a pair; and
selector circuitry which, in operation, alternately selects the two complementary codes in the pair in accordance with the control timing.

3. The wireless communication device according to claim 1, wherein the modulation circuitry further includes:
a parameter selection circuitry which, in operation, provides to the modulation circuitry a parameter for suppressing a data length of at least the data main body, when the operation mode used in measuring the antenna radiation pattern is specified.

* * * * *